US012627529B2

(12) United States Patent
Abdoli et al.

(10) Patent No.: US 12,627,529 B2
(45) Date of Patent: May 12, 2026

(54) SYSTEMS AND METHODS FOR ENHANCING EFFICIENT UPLINK MIMO PERFORMANCE AND IMPLEMENTATION FOR O-RAN-BASED RADIO ACCESS NETWORKS

(71) Applicant: Mavenir Systems, Inc., Richardson, TX (US)

(72) Inventors: Javad Abdoli, Plano, TX (US); Ali Fatih Demir, Plano, TX (US); Wessam Afifi Ahmed, Plano, TX (US); Young-Han Nam, Plano, TX (US)

(73) Assignee: Mavenir Systems, Inc., Richardson, TX (US)

( * ) Notice: Subject to any disclaimer, the term of this patent is extended or adjusted under 35 U.S.C. 154(b) by 790 days.

(21) Appl. No.: 17/946,516

(22) Filed: Sep. 16, 2022

(65) Prior Publication Data

US 2023/0155864 A1     May 18, 2023

Related U.S. Application Data

(60) Provisional application No. 63/300,108, filed on Jan. 17, 2022, provisional application No. 63/257,811, (Continued)

(51) Int. Cl.
| | |
|---|---|
| *H04L 25/02* | (2006.01) |
| *H04B 7/06* | (2006.01) |
| *H04L 5/00* | (2006.01) |

(52) U.S. Cl.
CPC ....... *H04L 25/0204* (2013.01); *H04B 7/0617* (2013.01); *H04L 5/0051* (2013.01)

(58) Field of Classification Search
None
See application file for complete search history.

(56) References Cited

U.S. PATENT DOCUMENTS

2019/0116524 A1* 4/2019 Isogawa ................ H04W 28/18
2020/0235788 A1 7/2020 Rajagopal et al.
(Continued)

OTHER PUBLICATIONS

ORAN-WG4.MP.0-v06.00: O-RAN Fronthaul Working Group "Management Plane Specification", Release 06.00; Mar. 22, 2021.
(Continued)

*Primary Examiner* — Scott M Sciacca
(74) *Attorney, Agent, or Firm* — Ruggiero, McAllister & McMahon LLC

(57) ABSTRACT

A system and method of operating an Open Radio Access Network (O-RAN, in which O-RAN the system includes: a baseband unit (BBU) having an O-RAN centralized unit (O-CU) and an O-RAN distributed unit (O-DU); an O-RAN radio unit (O-RU) remote from the BBU; and a fronthaul interface between the O-RU and the BBU. A functional split of O-RAN functions respectively assigned to O-RU and O-DU for the fronthaul interface between the BBU and the O-RU is different for downlink (DL) and uplink (UL) so that at least one of i) demodulation reference signal (DM-RS)-based channel estimation is performed by the O-DU in the DL and by the O-RU in the UL, ii) equalization is performed by the O-DU in the DL and by the O-RU in the UL, and iii) demodulation is performed by the O-DU in the DL and by the O-RU in the UL.

13 Claims, 41 Drawing Sheets

Related U.S. Application Data filed on Oct. 20, 2021, provisional application No. 63/244,774, filed on Sep. 16, 2021.

(56) References Cited

U.S. PATENT DOCUMENTS

| | | | | |
|---|---|---|---|---|
| 2020/0260471 A1* | 8/2020 | Jeon | | H04L 47/22 |
| 2021/0136790 A1* | 5/2021 | Bidkar | | H04W 72/569 |
| 2022/0131580 A1* | 4/2022 | Kuchi | | H04B 7/0452 |
| 2022/0394737 A1* | 12/2022 | Liu | | H04B 7/15542 |
| 2023/0247688 A1* | 8/2023 | Bucknell | | H04W 76/20 |
| | | | | 370/329 |
| 2023/0262474 A1* | 8/2023 | Shim | | H04W 72/04 |
| | | | | 370/329 |

OTHER PUBLICATIONS

ORAN-WG4.CUS-plane.0-v06.00: O-RAN Fronthaul Working Group "Control, User, and Synchronization Plane Specification" Release 06.00; Mar. 11, 2021.

Extended European Search Report and Written Opinion for corresponding European application EP22196116.2, 12 pages, dated Jan. 30, 2023.

Chih-Lin et al "NGFI, the xHaul", 2015 IEEE Globecome Workshops, IEEE, Dec. 6, 2015.

Chang et al "A Prefiltering C-RAN Architecture with Compressed Link Data Rate in Massive MIMO", 2016 IEEE 83rd Vehicular Technology Conference (VTC Spring), IEEE , May 15, 2016.

O-RAN Working Group 6. AAL-GAnP-v01.01 Technical Specification "O-RAN Acceleration Abstraction Layer General Aspects and Principles" O-RAN Alliance, Mar. 4, 2021.

* cited by examiner

Figure 1A:
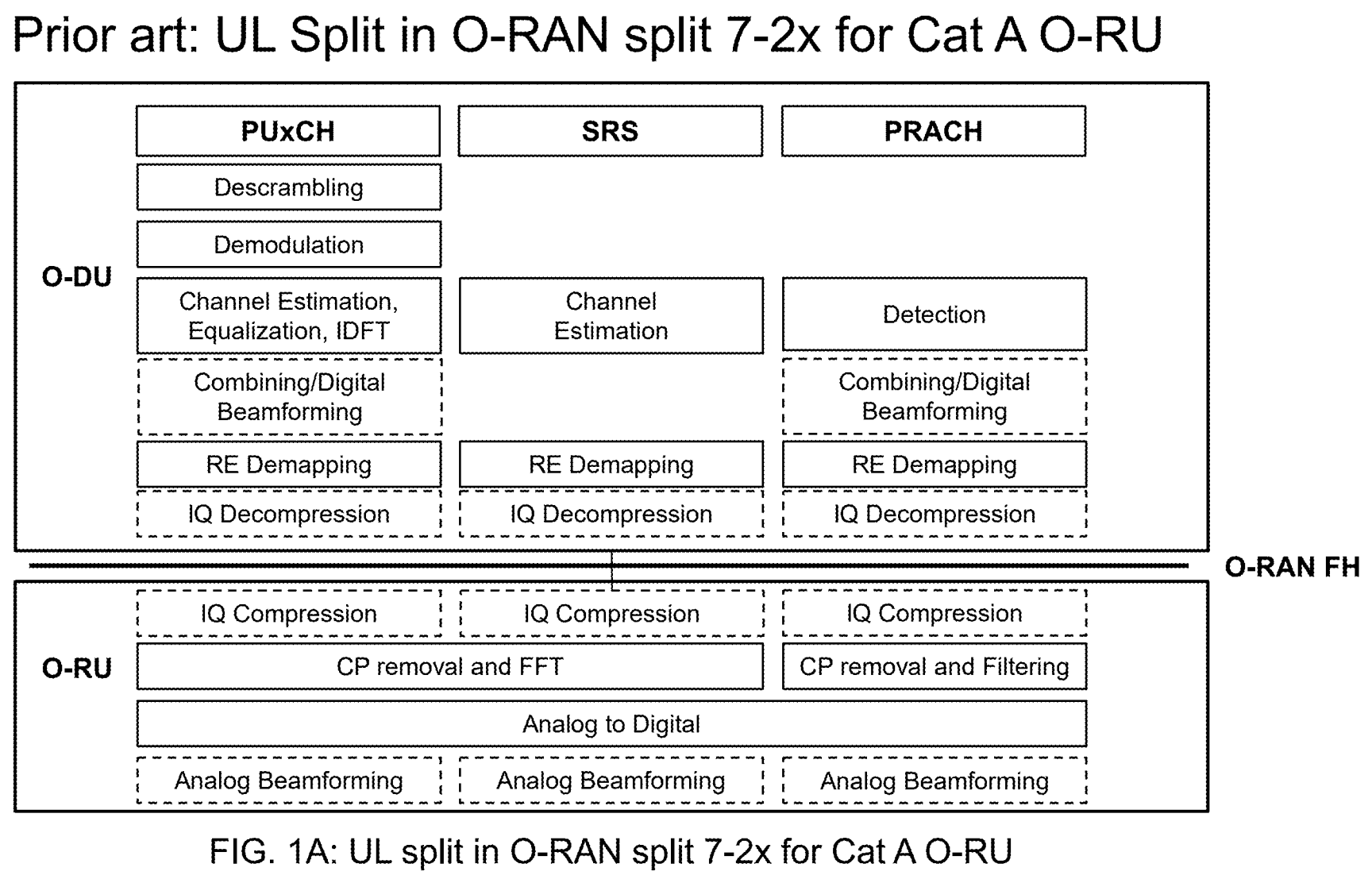

Prior art: UL Split in O-RAN split 7-2x for Cat A O-RU

O-RAN FH

O-DU

| PUxCH | SRS | PRACH |
|---|---|---|
| Descrambling | | |
| Demodulation | | |
| Channel Estimation, Equalization, IDFT | Channel Estimation | Detection |
| Combining/Digital Beamforming | | Combining/Digital Beamforming |
| RE Demapping | RE Demapping | RE Demapping |
| IQ Decompression | IQ Decompression | IQ Decompression |

O-RU

| IQ Compression | IQ Compression | IQ Compression |
|---|---|---|
| CP removal and FFT | | CP removal and Filtering |
| Analog to Digital | | |
| Analog Beamforming | Analog Beamforming | Analog Beamforming |

FIG. 1A: UL split in O-RAN split 7-2x for Cat A O-RU

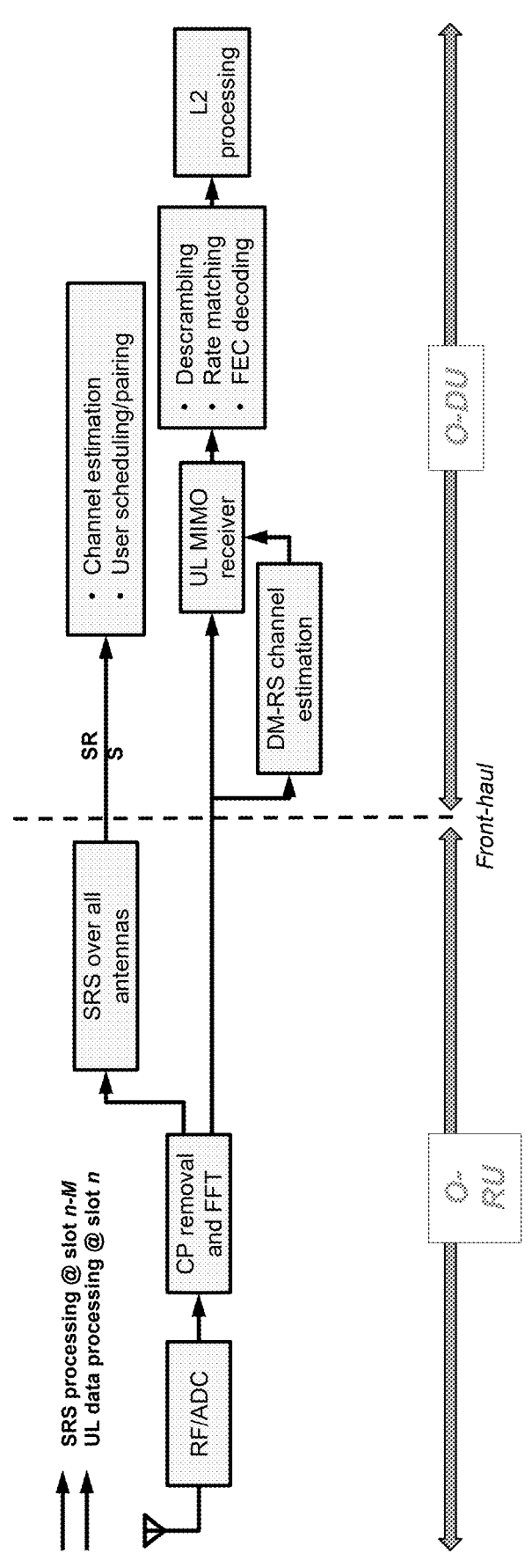
Prior art: UL Split in O-RAN split 7-2x for Cat A O-RU
FIG. 1B: UL split in O-RAN split 7-2x for Cat A O-RU Prior art: UL Split in O-RAN split 7-2x for Cat B O-RU

Figure 2A:
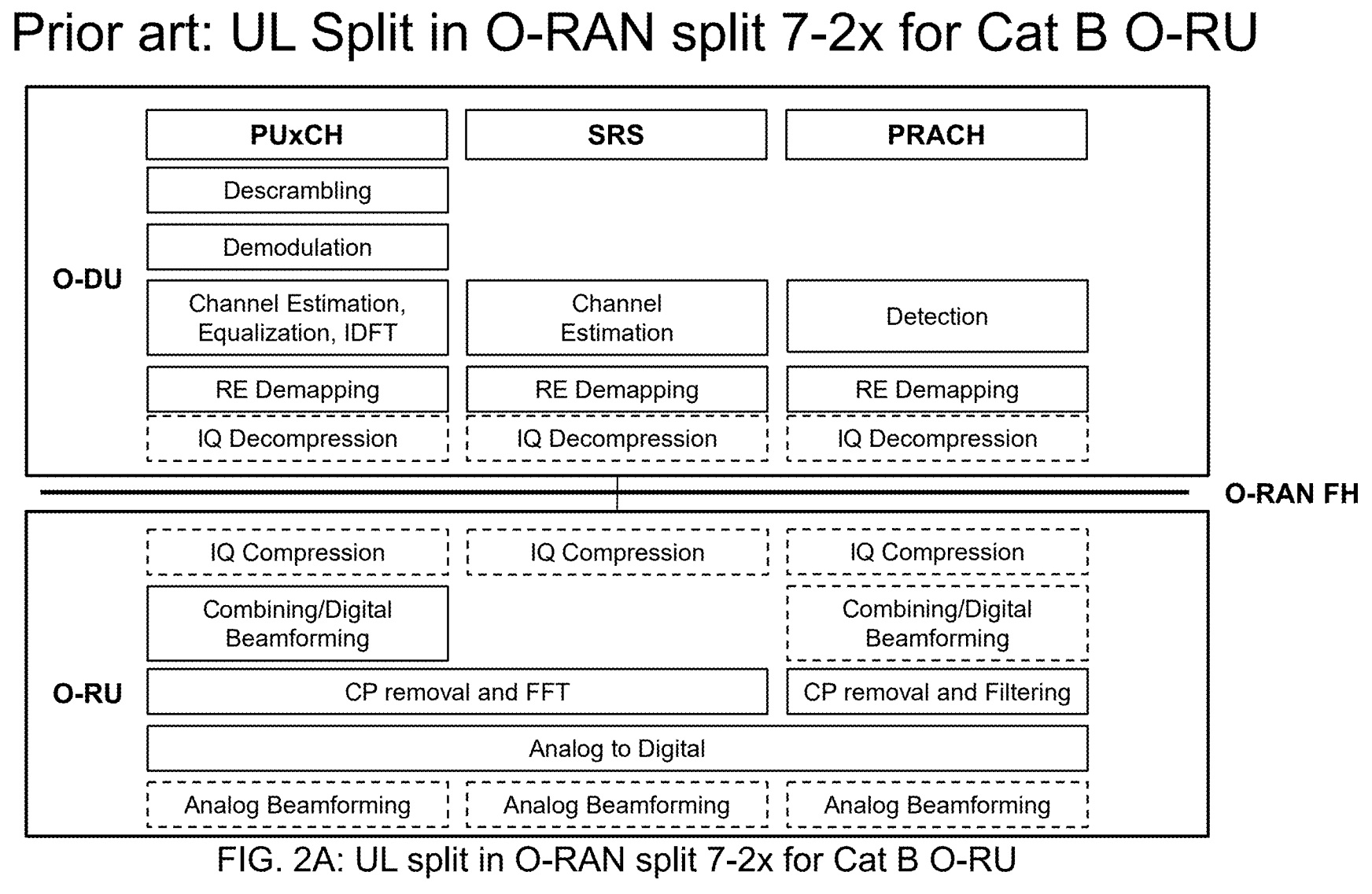

O-RAN FH

O-DU

| PUxCH | SRS | PRACH |

Descrambling

Demodulation

| Channel Estimation, Equalization, IDFT | Channel Estimation | Detection |

| RE Demapping | RE Demapping | RE Demapping |

| IQ Decompression | IQ Decompression | IQ Decompression |

O-RU

| IQ Compression | IQ Compression | IQ Compression |

| Combining/Digital Beamforming | | Combining/Digital Beamforming |

| CP removal and FFT | | CP removal and Filtering |

Analog to Digital

| Analog Beamforming | Analog Beamforming | Analog Beamforming |

FIG. 2A: UL split in O-RAN split 7-2x for Cat B O-RU

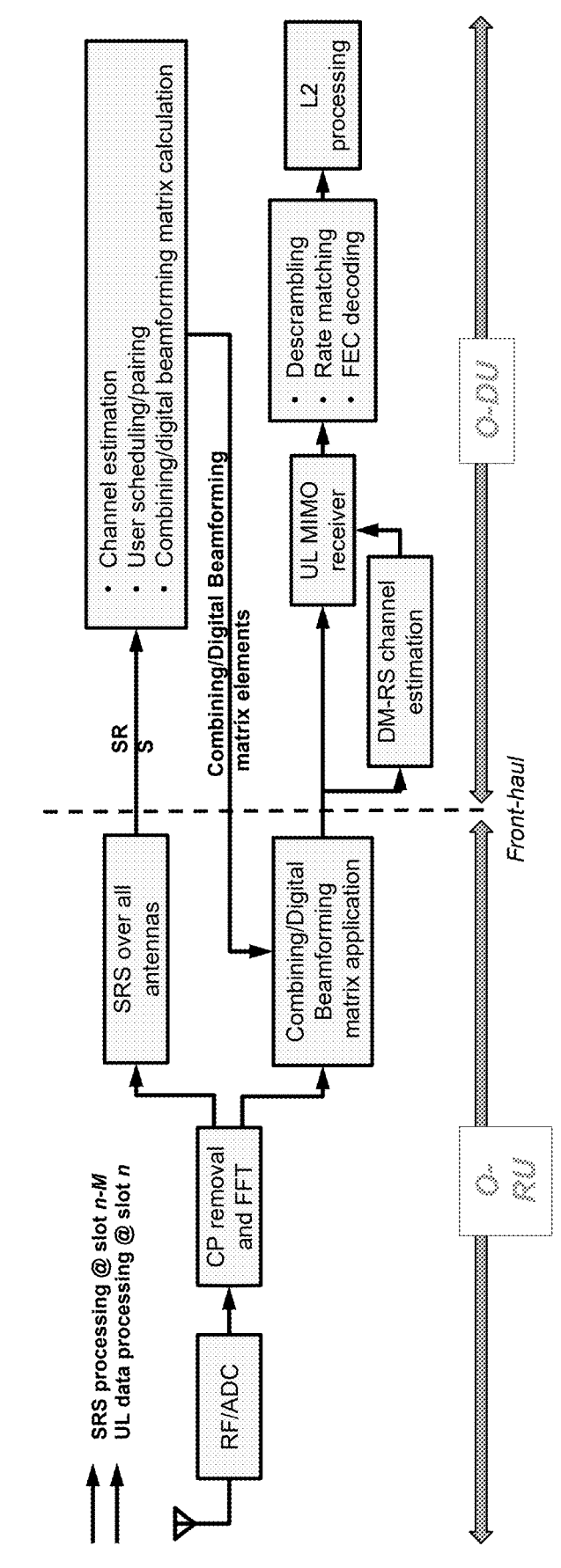
FIG. 2B: UL split in O-RAN split 7-2x with Cat B O-RU

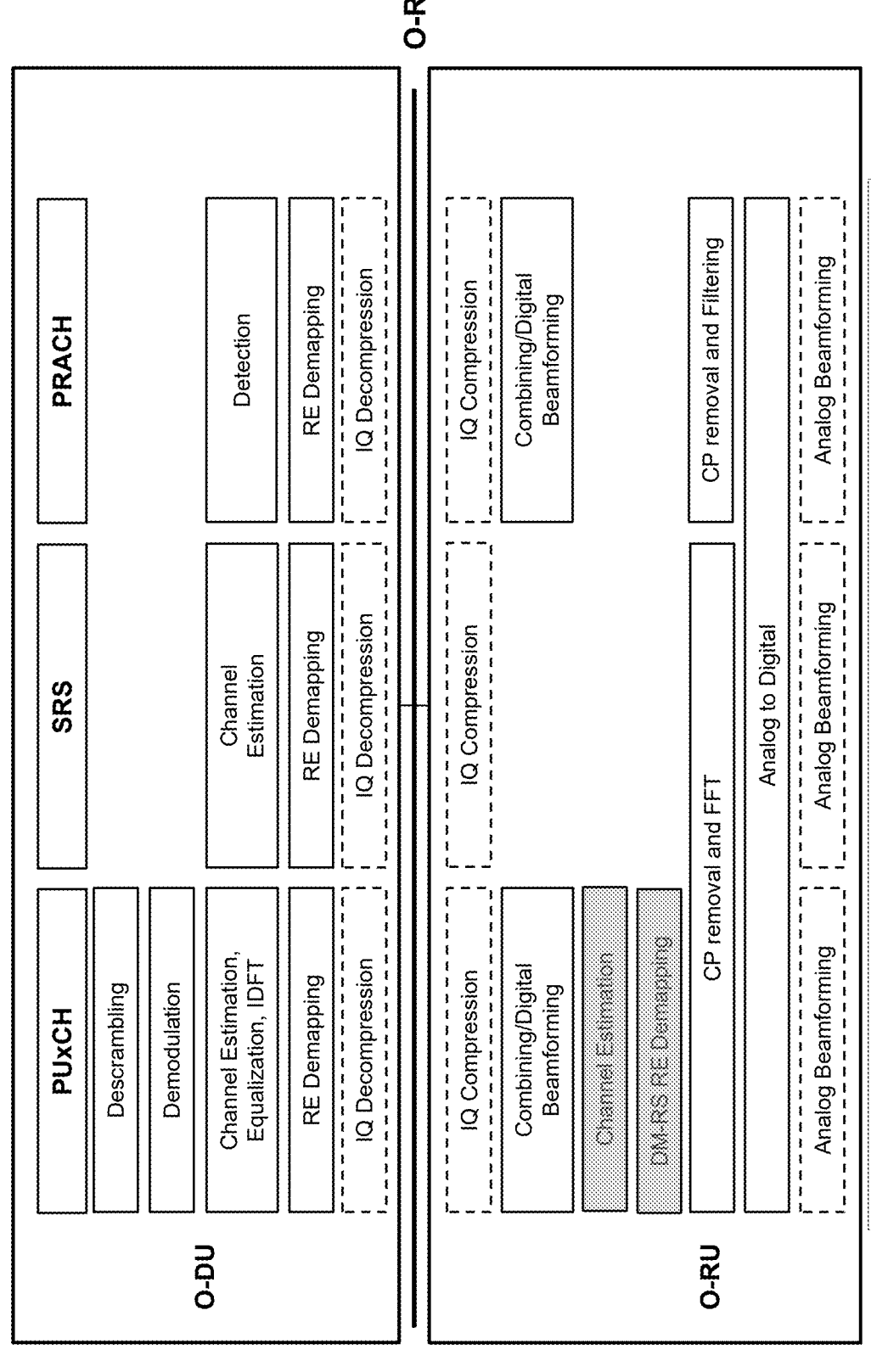
FIG. 3A: UL split in O-RAN split 7-2x with Cat C1 O-RU

Figure 3B:
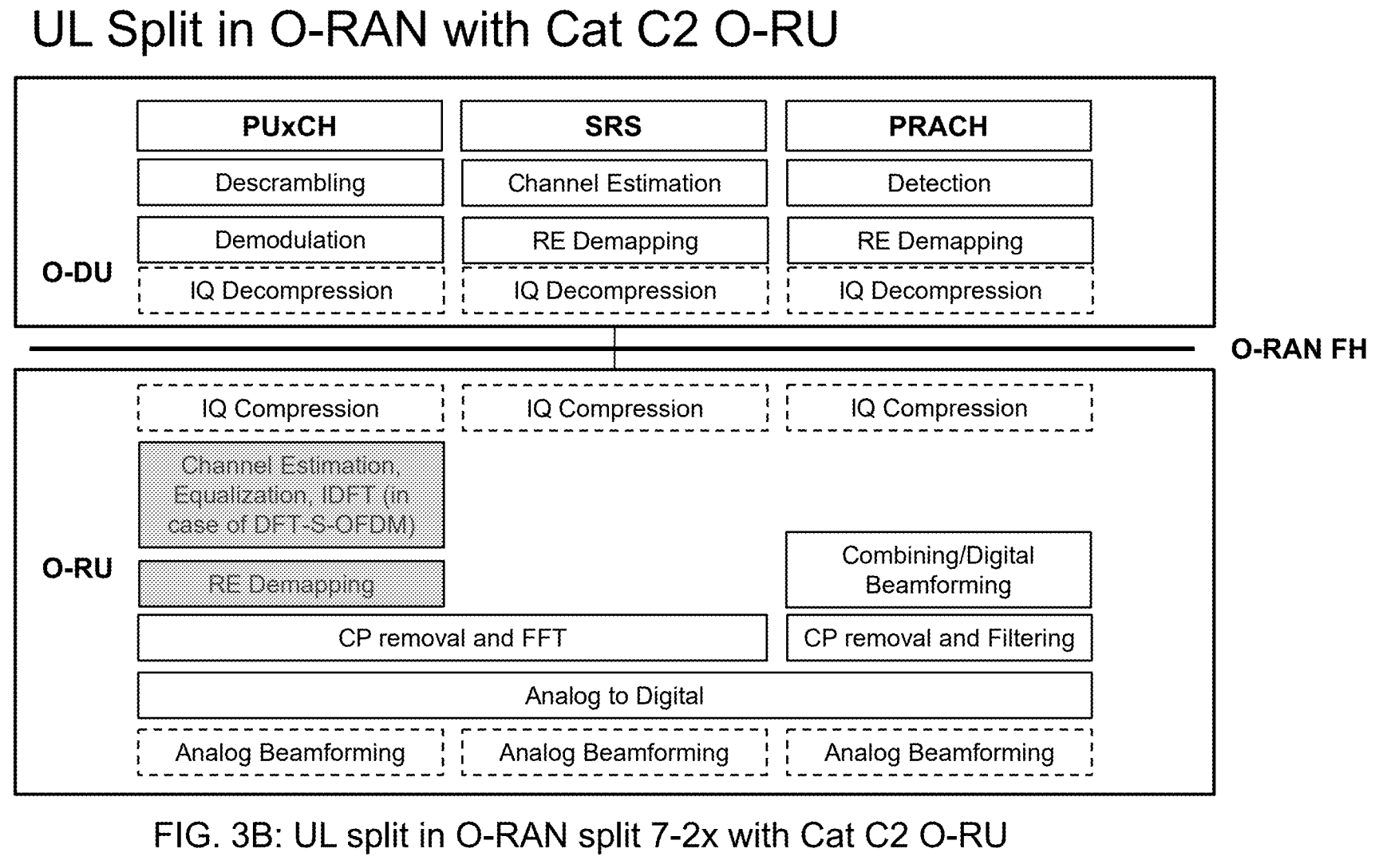

O-RAN FH

UL Split in O-RAN with Cat C2 O-RU

O-DU

| PUxCH | SRS | PRACH |
|---|---|---|
| Descrambling | Channel Estimation | Detection |
| Demodulation | RE Demapping | RE Demapping |
| IQ Decompression | IQ Decompression | IQ Decompression |

O-RU

| IQ Compression | IQ Compression | IQ Compression |
|---|---|---|
| Channel Estimation, Equalization, IDFT (in case of DFT-S-OFDM) | | Combining/Digital Beamforming |
| RE Demapping | | CP removal and Filtering |
| CP removal and FFT | | Analog Beamforming |
| Analog to Digital | | |
| Analog Beamforming | Analog Beamforming | |

FIG. 3B: UL split in O-RAN split 7-2x with Cat C2 O-RU

Figure 3C:
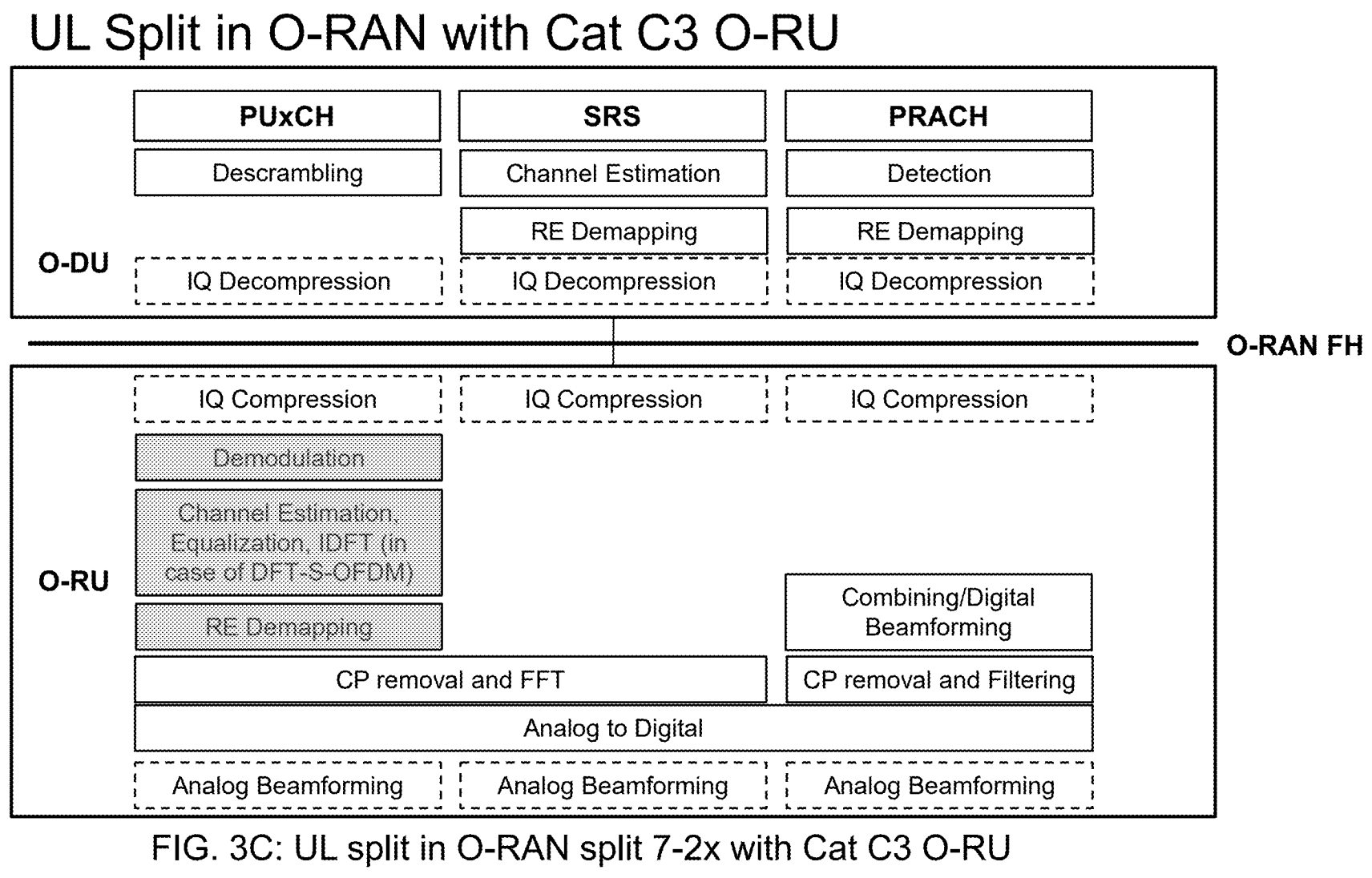

UL Split in O-RAN with Cat C3 O-RU

O-RAN FH

O-DU

| PUxCH | SRS | PRACH |
|---|---|---|
| Descrambling | Channel Estimation | Detection |
| | RE Demapping | RE Demapping |
| IQ Decompression | IQ Decompression | IQ Decompression |

O-RU

| IQ Compression | IQ Compression | IQ Compression |
|---|---|---|
| Demodulation | | Combining/Digital Beamforming |
| Channel Estimation Equalization IDFT (in case of DFT-S-OFDM) | | CP removal and Filtering |
| RE Demapping | | Analog Beamforming |
| CP removal and FFT | | |
| Analog to Digital | | |
| Analog Beamforming | Analog Beamforming | |

FIG. 3C: UL split in O-RAN split 7-2x with Cat C3 O-RU

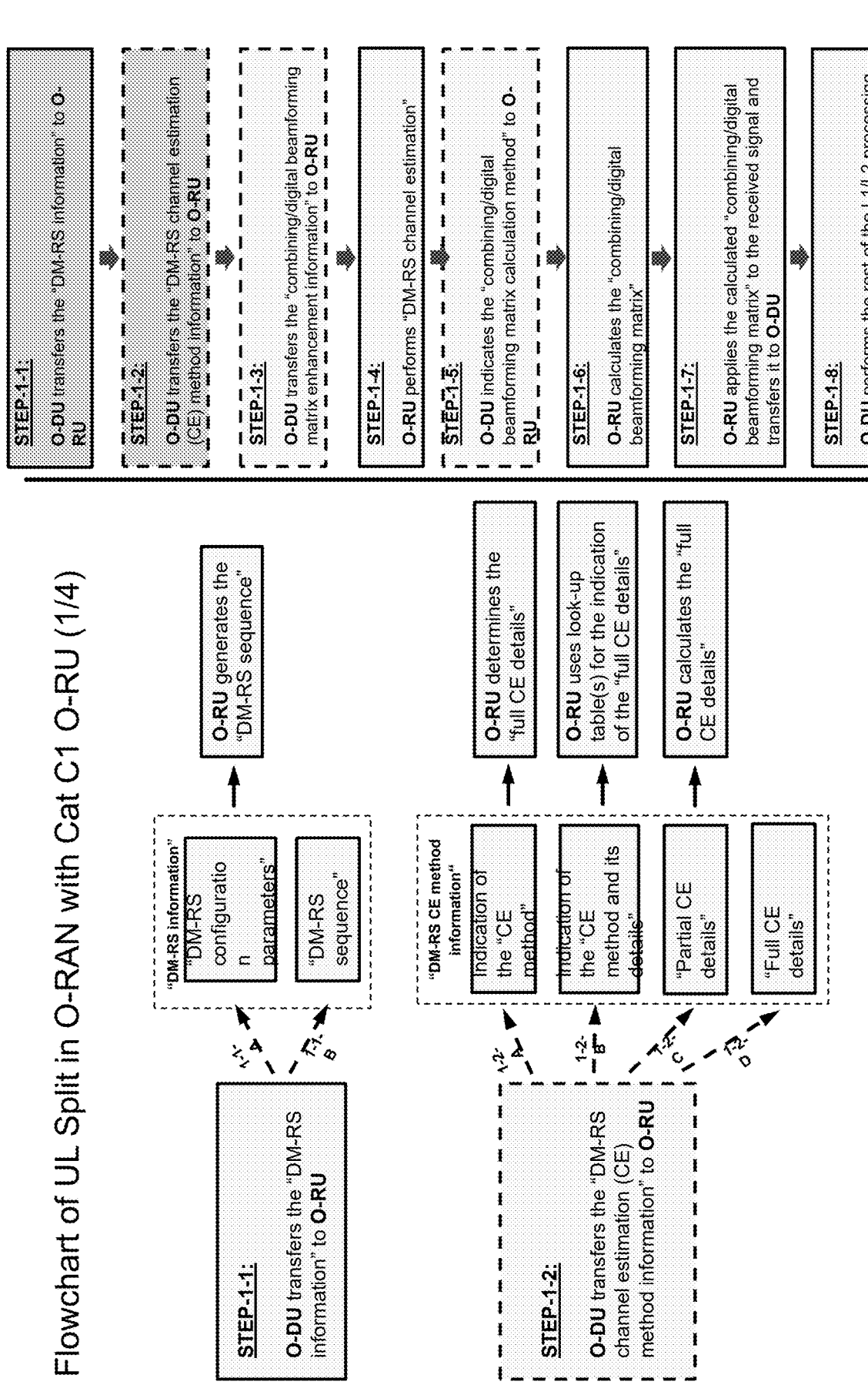
Flowchart of UL Split in O-RAN with Cat C1 O-RU (1/4)
FIG. 4A: Flowchart of UL Split in O-RAN with Cat C1 O-RU (1/4)

Figure 4B:
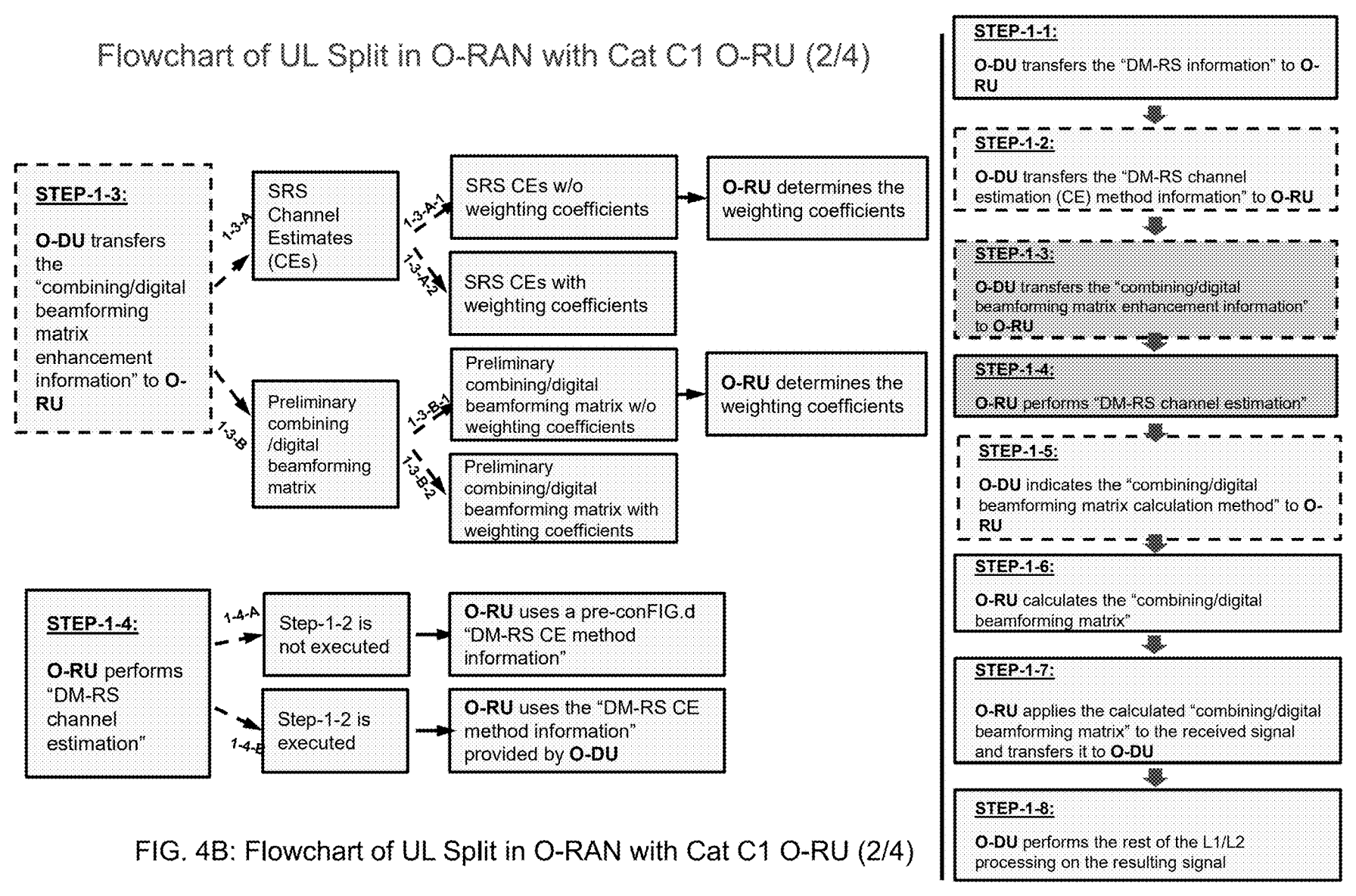

Flowchart of UL Split in O-RAN with Cat C1 O-RU (2/4)

STEP-1-1:
O-DU transfers the "DM-RS information" to O-RU

STEP-1-2:
O-DU transfers the "DM-RS channel estimation (CE) method information" to O-RU

STEP-1-3:
O-DU transfers the "combining/digital beamforming matrix enhancement information" to O-RU

STEP-1-4:
O-RU performs "DM-RS channel estimation"

STEP-1-5:
O-DU indicates the "combining/digital beamforming matrix calculation method" to O-RU

STEP-1-6:
O-RU calculates the "combining/digital beamforming matrix"

STEP-1-7:
O-RU applies the calculated "combining/digital beamforming matrix" to the received signal and transfers it to O-DU

STEP-1-8:
O-DU performs the rest of the L1/L2 processing on the resulting signal

STEP-1-3:
O-DU transfers the "combining/digital beamforming matrix enhancement information" to O-RU SRS Channel Estimates (CEs)

SRS CEs w/o weighting coefficients

SRS CEs with weighting coefficients

O-RU determines the weighting coefficients

Preliminary combining /digital beamforming matrix

Preliminary combining/digital beamforming matrix w/o weighting coefficients

Preliminary combining/digital beamforming matrix with weighting coefficients

O-RU determines the weighting coefficients 1-3-A
1-3-A-1
1-3-A-2
1-3-B
1-3-B-1
1-3-B-2

STEP-1-4:
O-RU performs "DM-RS channel estimation"

Step-1-2 is not executed

Step-1-2 is executed 1-4-A
1-4-B

O-RU uses a pre-conFIG.d "DM-RS CE method information"

O-RU uses the "DM-RS CE method information" provided by O-DU

FIG. 4B: Flowchart of UL Split in O-RAN with Cat C1 O-RU (2/4)

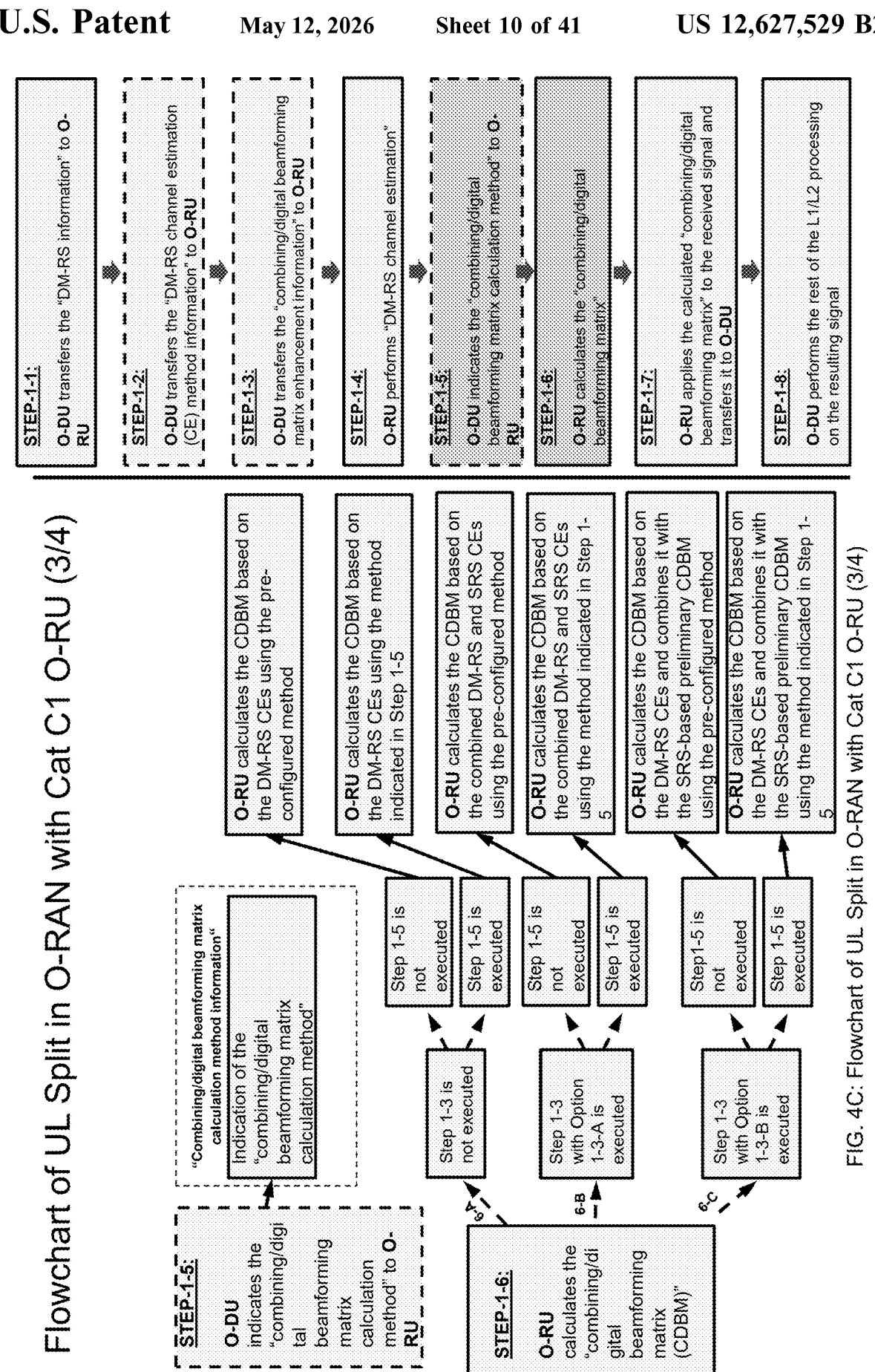
FIG. 4C: Flowchart of UL Split in O-RAN with Cat C1 O-RU (3/4)

Flowchart of UL Split in O-RAN with Cat C1 O-RU (4/4)

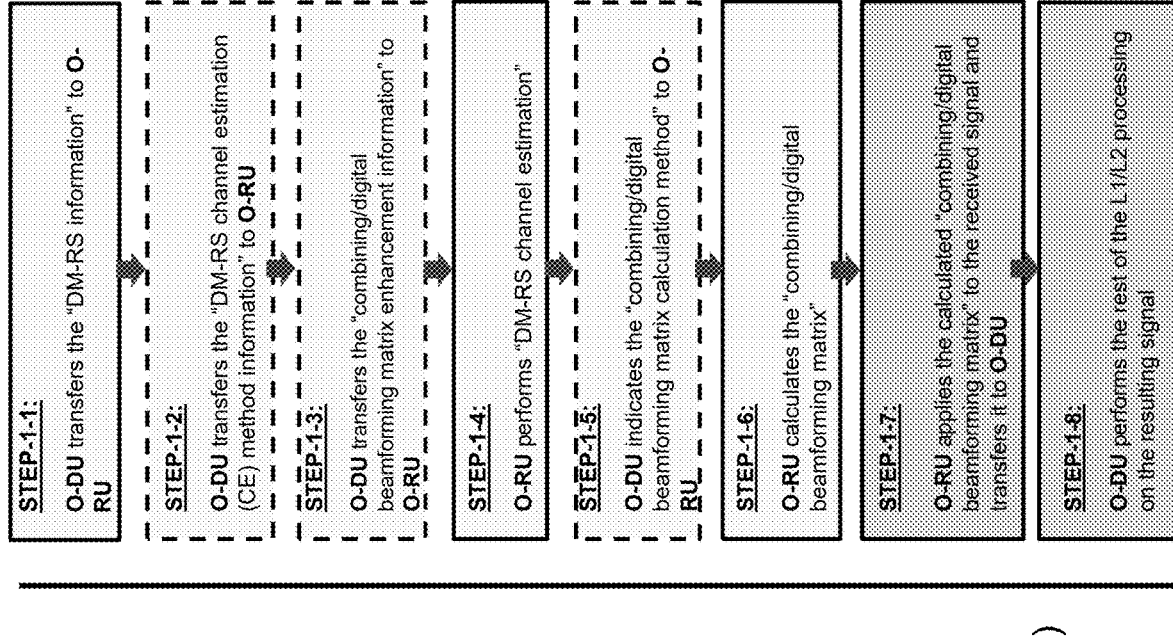

STEP-1-1:
O-DU transfers the "DM-RS information" to O-RU

STEP-1-2:
O-DU transfers the "DM-RS channel estimation (CE) method information" to O-RU

STEP-1-3:
O-DU transfers the "combining/digital beamforming matrix enhancement information" to O-RU

STEP-1-4:
O-RU performs "DM-RS channel estimation"

STEP-1-5:
O-DU indicates the "combining/digital beamforming matrix calculation method" to O-RU

STEP-1-6:
O-RU calculates the "combining/digital beamforming matrix"

STEP-1-7:
O-RU applies the calculated "combining/digital beamforming matrix" to the received signal and transfers it to O-DU

STEP-1-8:
O-DU performs the rest of the L1/L2 processing on the resulting signal

STEP-1-7:
O-RU applies the calculated "combining/digital beamforming matrix" to the received signal and transfers it to O-DU

STEP-1-8:
O-DU performs the rest of the L1/L2 processing on the resulting signal FIG. 4D: Flowchart of UL Split in O-RAN with Cat C1 O-RU (4/4)

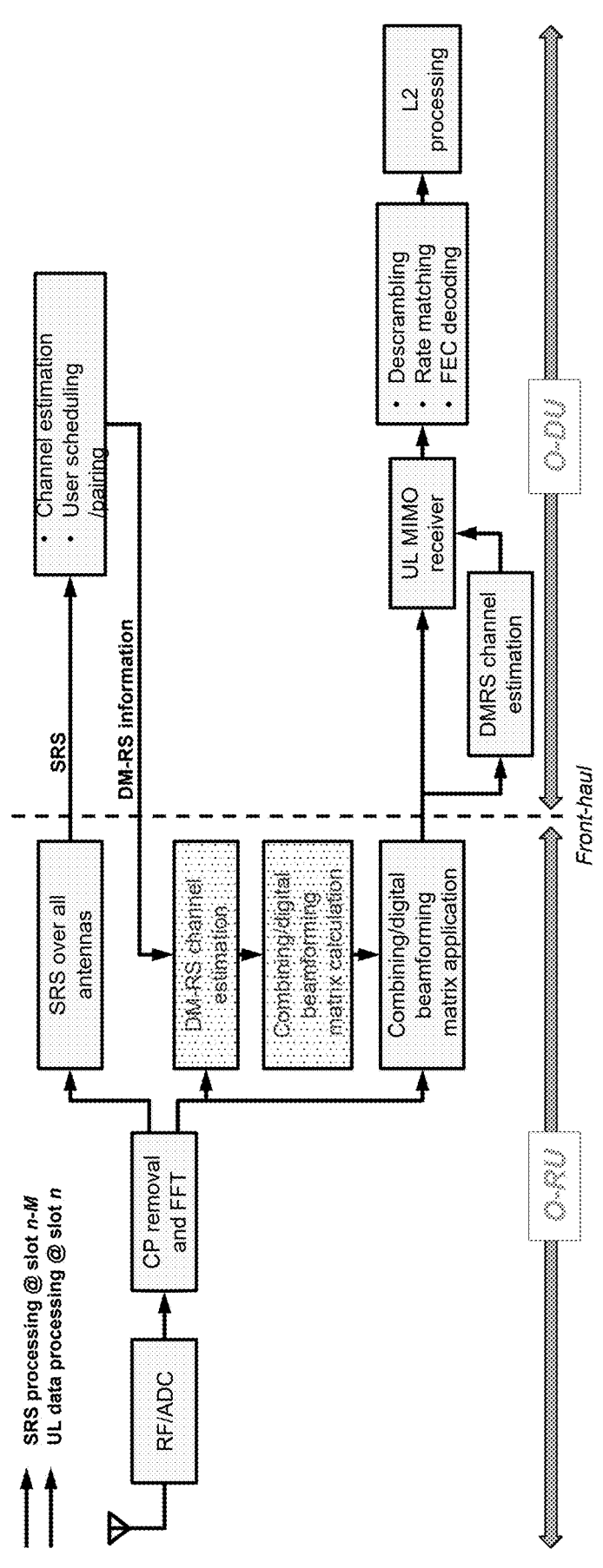
Embodiment 1-A: UL Split in O-RAN with Cat C1 O-RU
FIG. 5A: UL processing chain for Embodiment 1-A

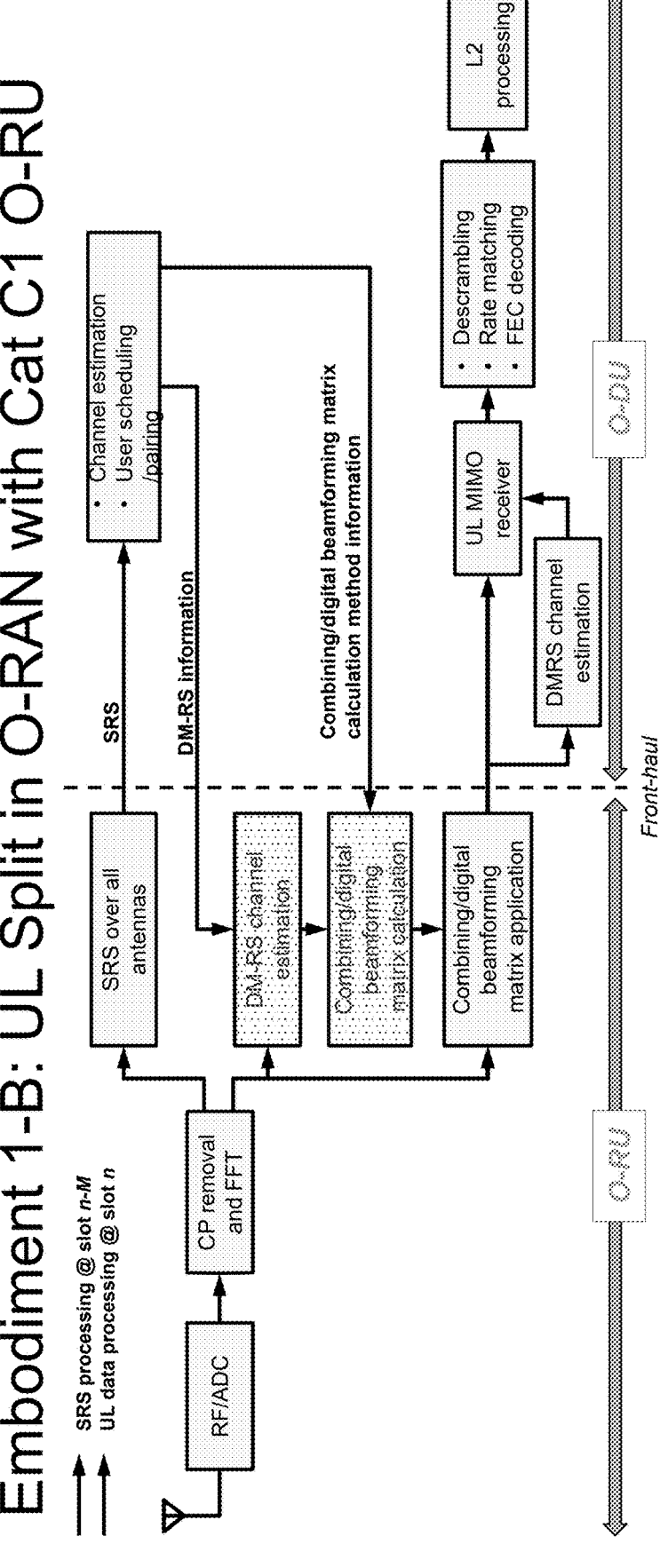
FIG. 5B: UL processing chain for Embodiment 1-B

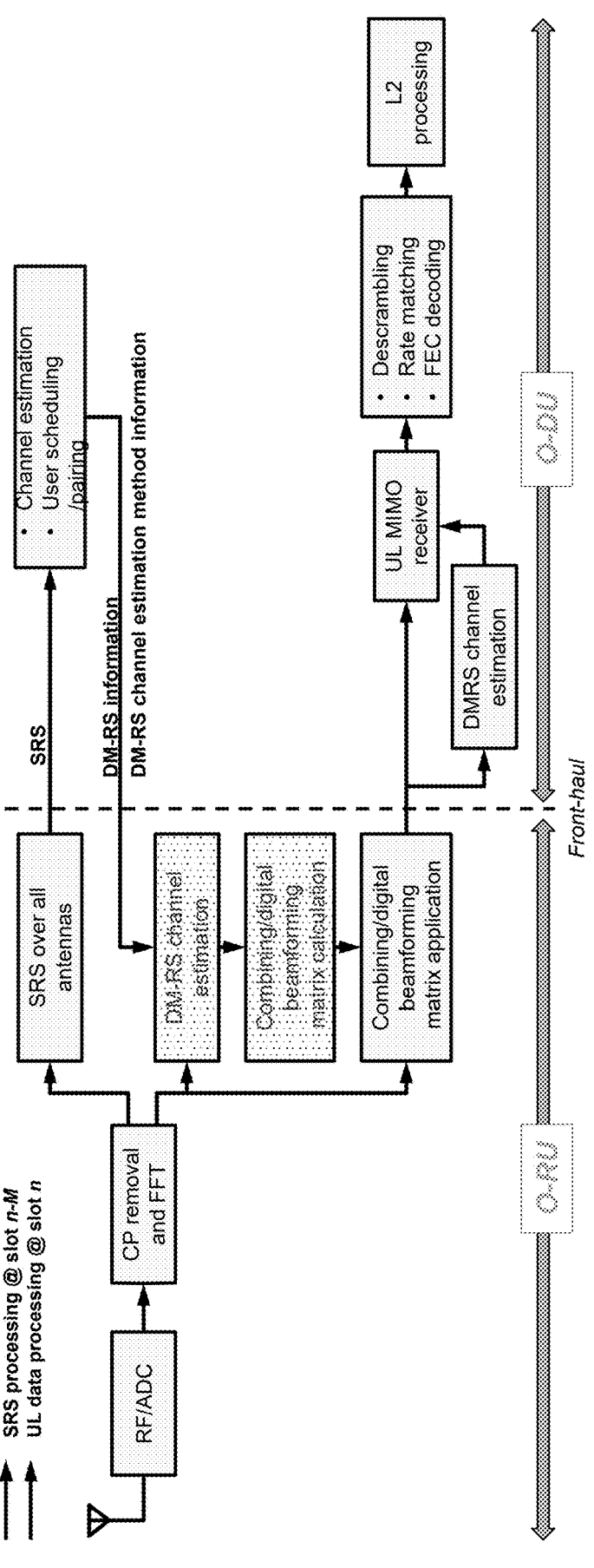
Embodiment 1-C: UL Split in O-RAN with Cat C1 O-RU
FIG. 5C: UL processing chain for Embodiment 1-C

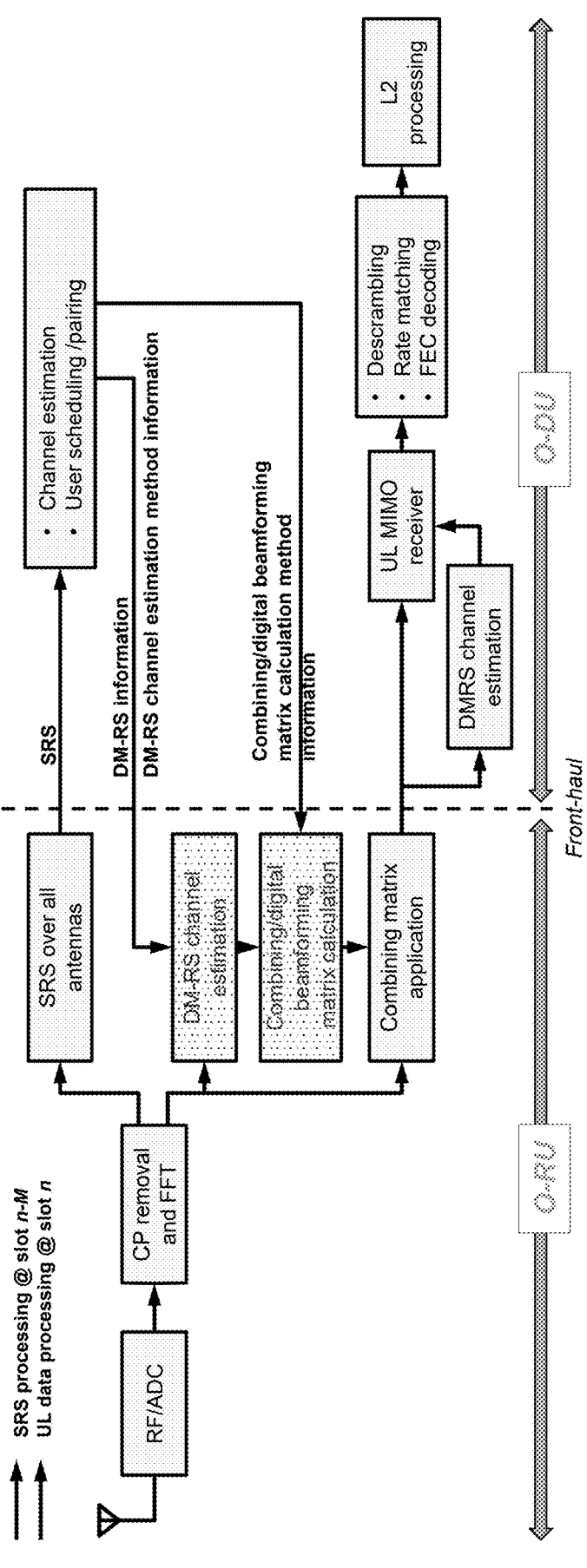
Embodiment 1-D: UL Split in O-RAN with Cat C1 O-RU
FIG. 5D: UL processing chain for Embodiment 1-D

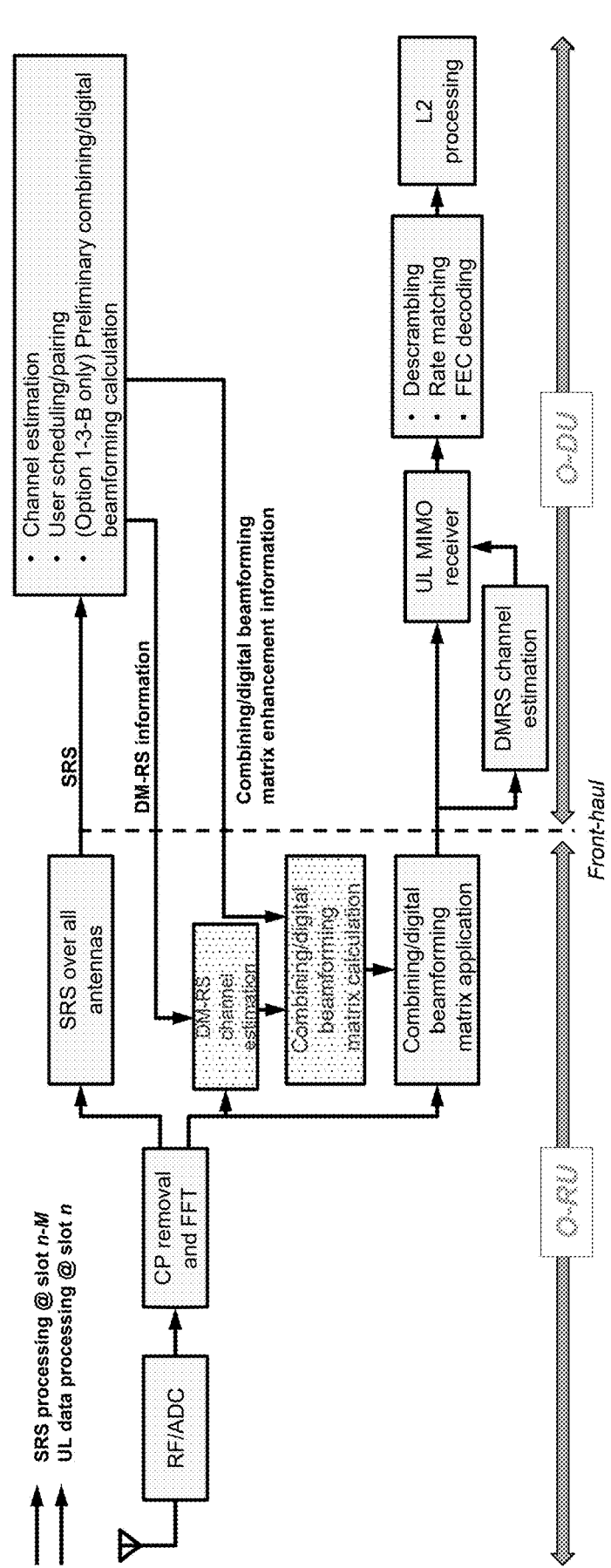
Embodiment 1-E: UL Split in O-RAN with Cat C1 O-RU
FIG. 5E: UL processing chain for Embodiment 1-E

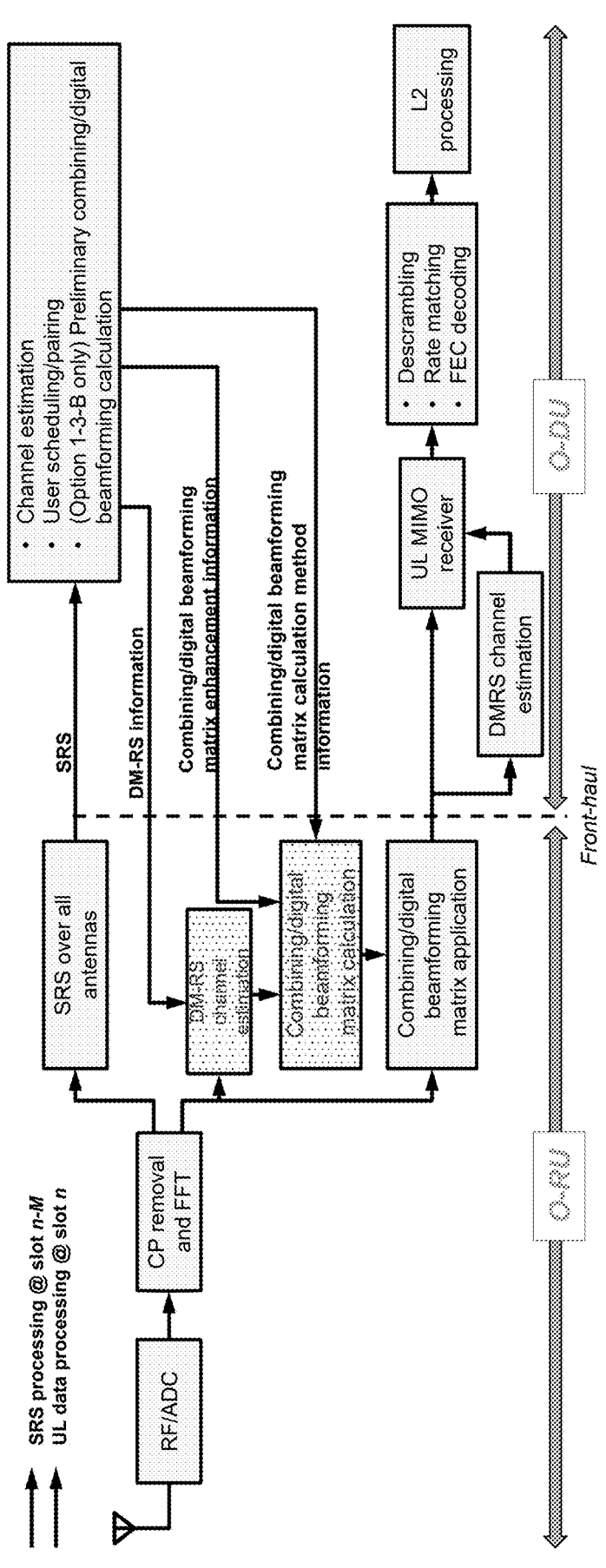
FIG. 5F: UL processing chain for Embodiment 1-F

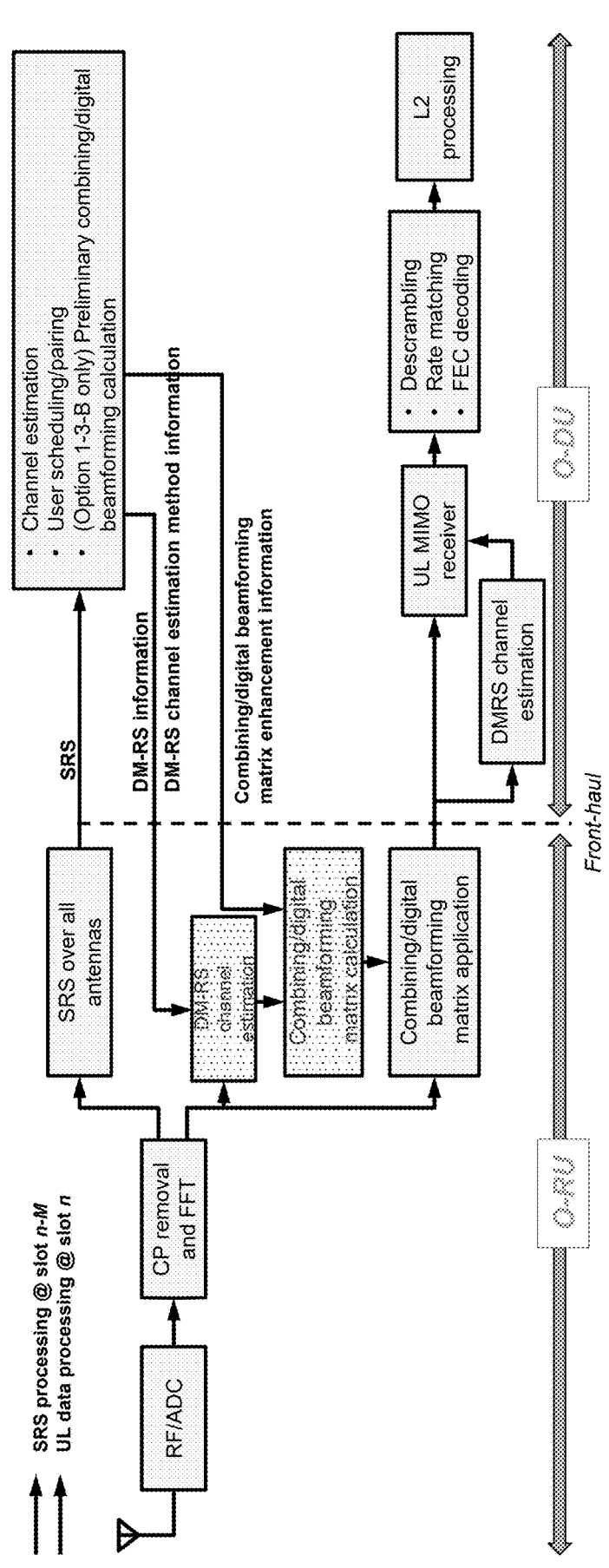
Embodiment 1-G: UL Split in O-RAN with Cat C1 O-RU
FIG. 5G: UL processing chain for Embodiment 1-G

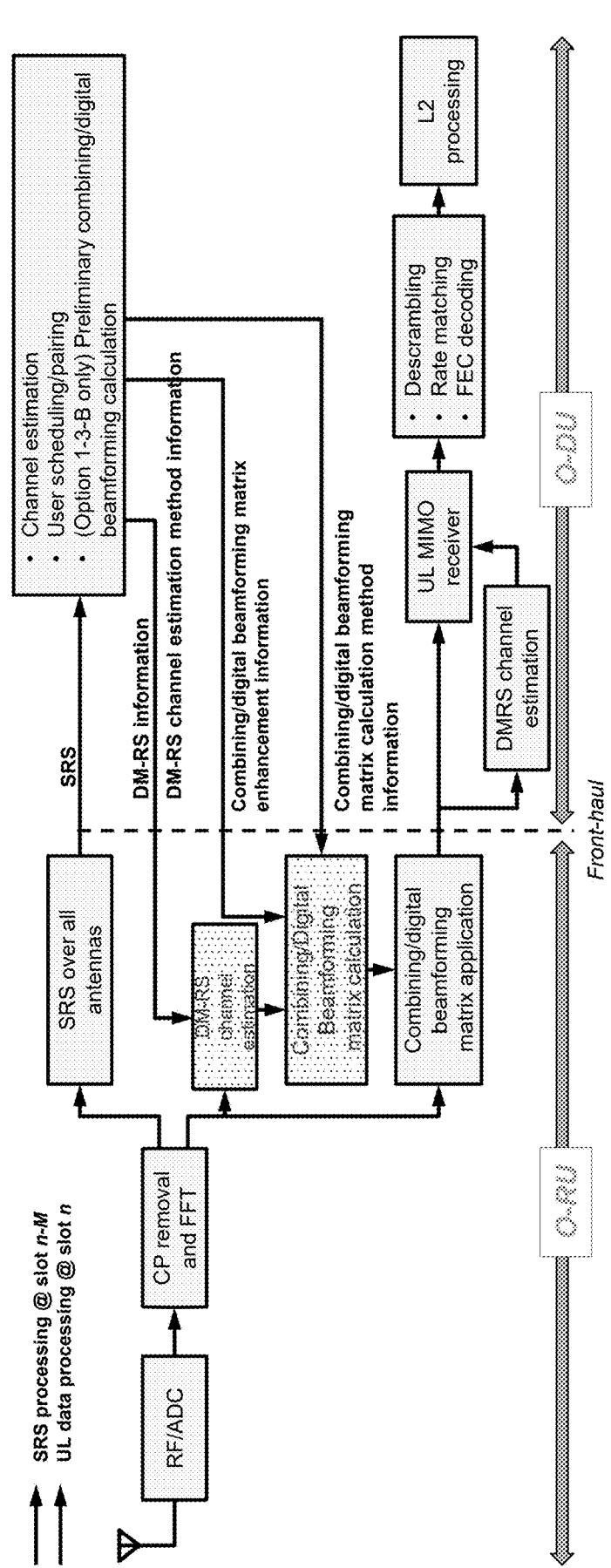
Embodiment 1-H: UL Split in O-RAN with Cat C1 O-RU
FIG. 5H: UL processing chain for Embodiment 1-H

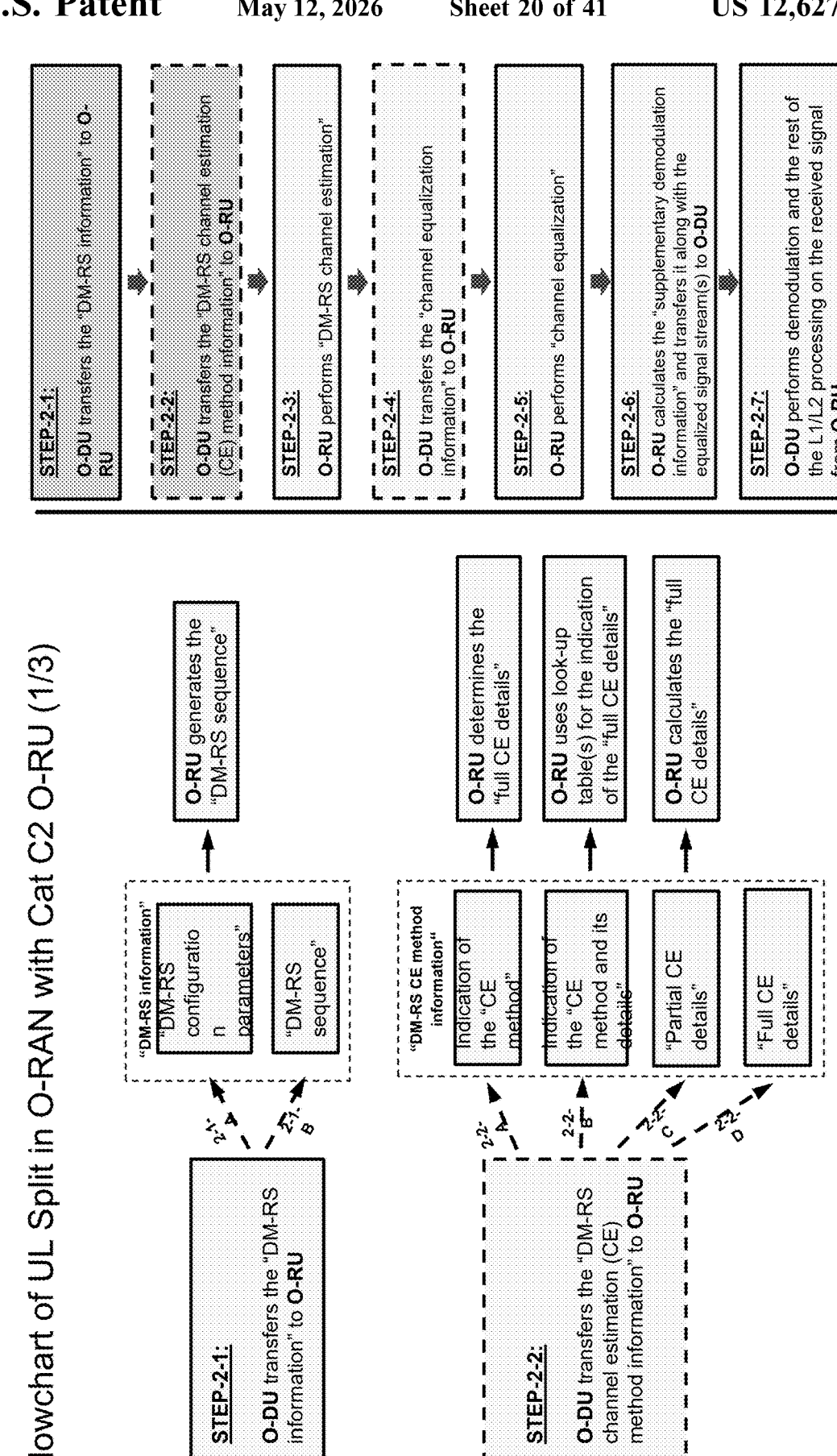
FIG. 6A: Flowchart of UL Split in O-RAN with Cat C2 O-RU (1/3)

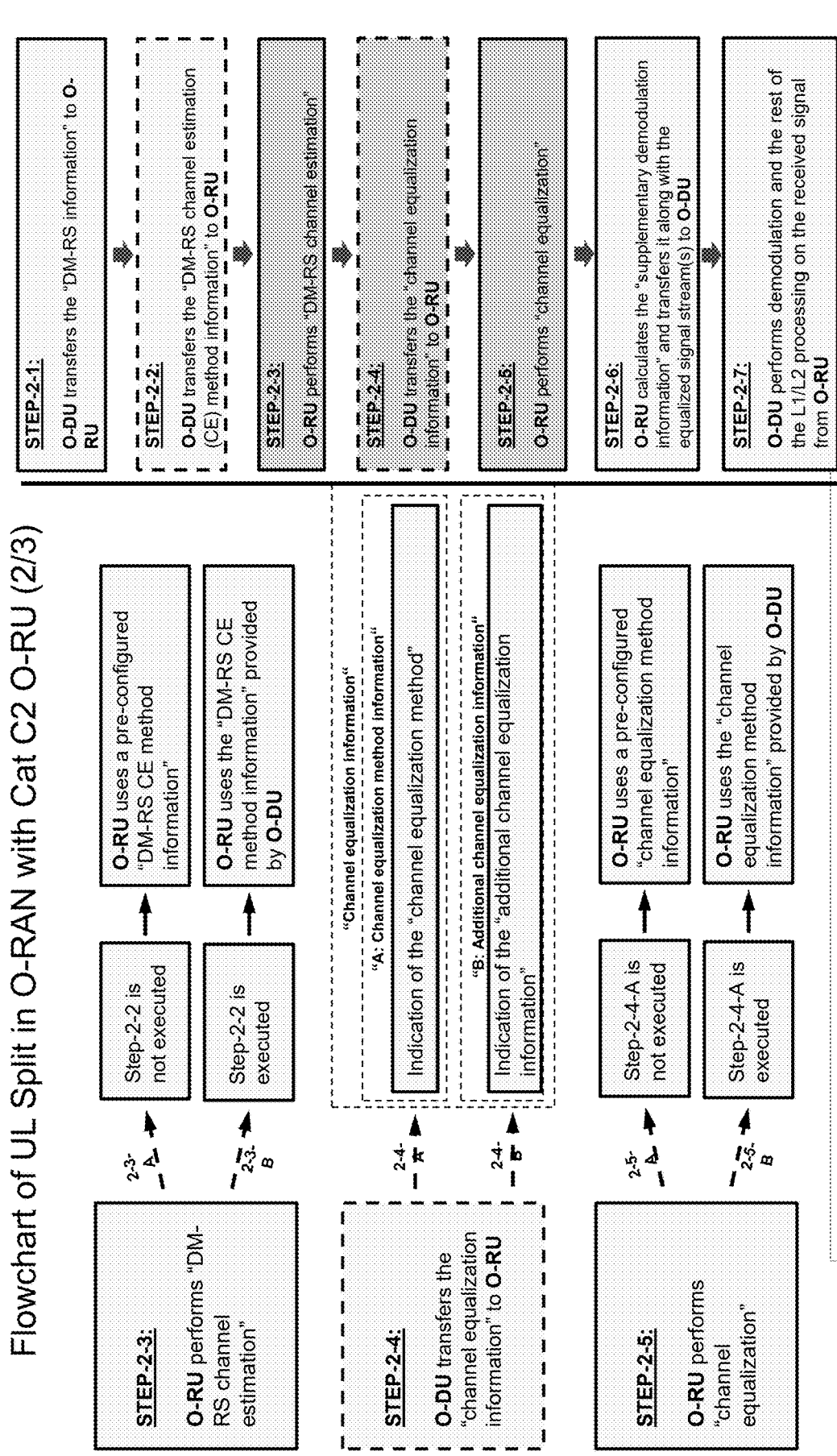
FIG. 6B: Flowchart of UL Split in O-RAN with Cat C2 O-RU (2/3)

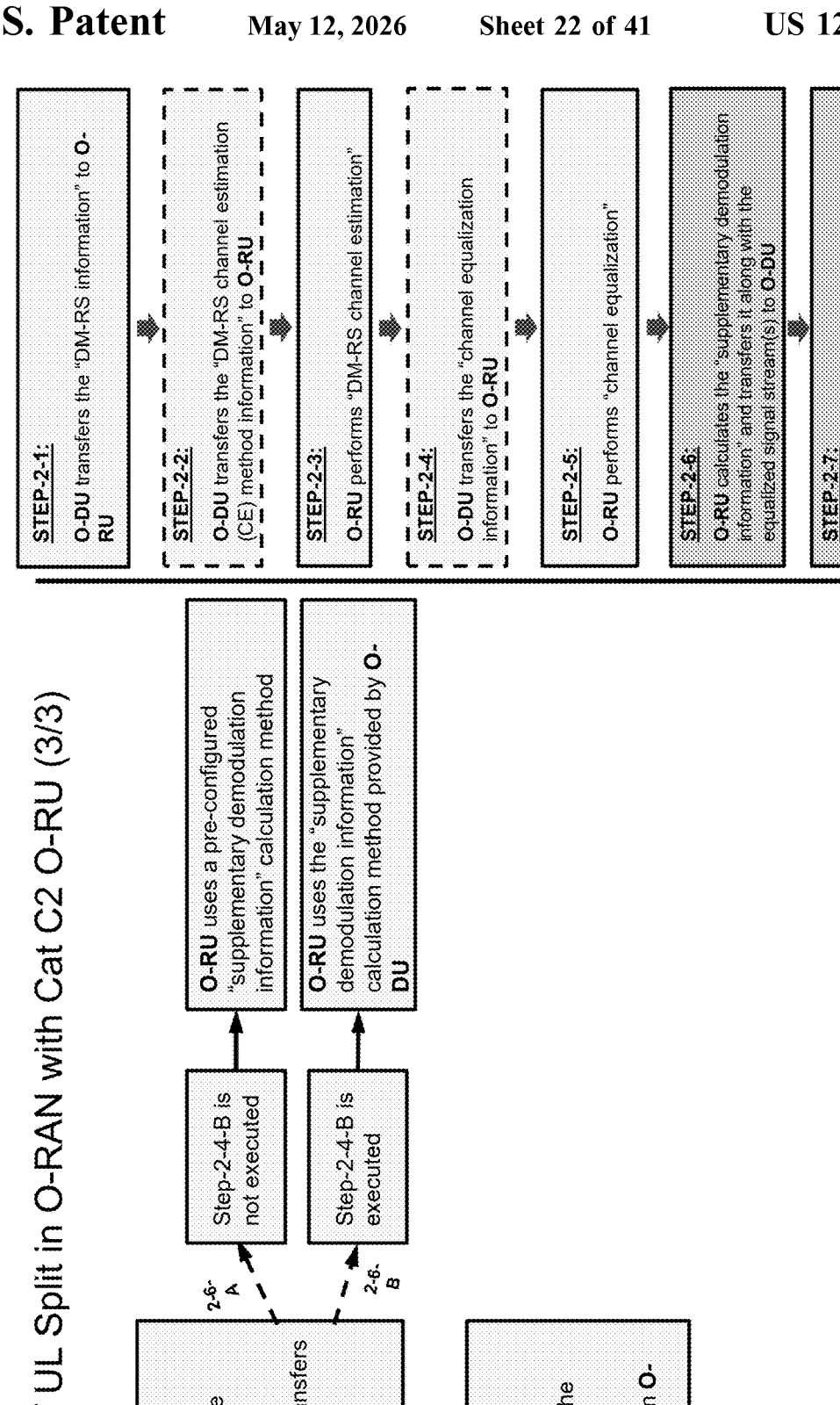

Flowchart of UL Split in O-RAN with Cat C2 O-RU (3/3)

STEP-2-1:
O-DU transfers the "DM-RS information" to O-RU

STEP-2-2:
O-DU transfers the "DM-RS channel estimation (CE) method information" to O-RU

STEP-2-3:
O-RU performs "DM-RS channel estimation"

STEP-2-4:
O-DU transfers the "channel equalization information" to O-RU

STEP-2-5:
O-RU performs "channel equalization"

STEP-2-6:
O-RU calculates the "supplementary demodulation information" and transfers it along with the equalized signal stream(s) to O-DU

STEP-2-7:
O-DU performs demodulation and the rest of the L1/L2 processing on the received signal from O-RU O-RU uses a pre-configured "supplementary demodulation information" calculation method O-RU uses the "supplementary demodulation information" calculation method provided by O-DU Step-2-4-B is not executed Step-2-4-B is executed 2-6-A 2-6-B

STEP-2-6:
O-RU calculates the "supplementary demodulation information" and transfers it along with the equalized signal stream(s) to O-DU

STEP-2-7:
O-DU performs demodulation and the rest of the L1/L2 processing on the received signal from O-RU FIG. 6C: Flowchart of UL Split in O-RAN with Cat C2 O-RU (3/3)

Embodiment 2-A: UL Split in O-RAN with Cat C2 O-RU
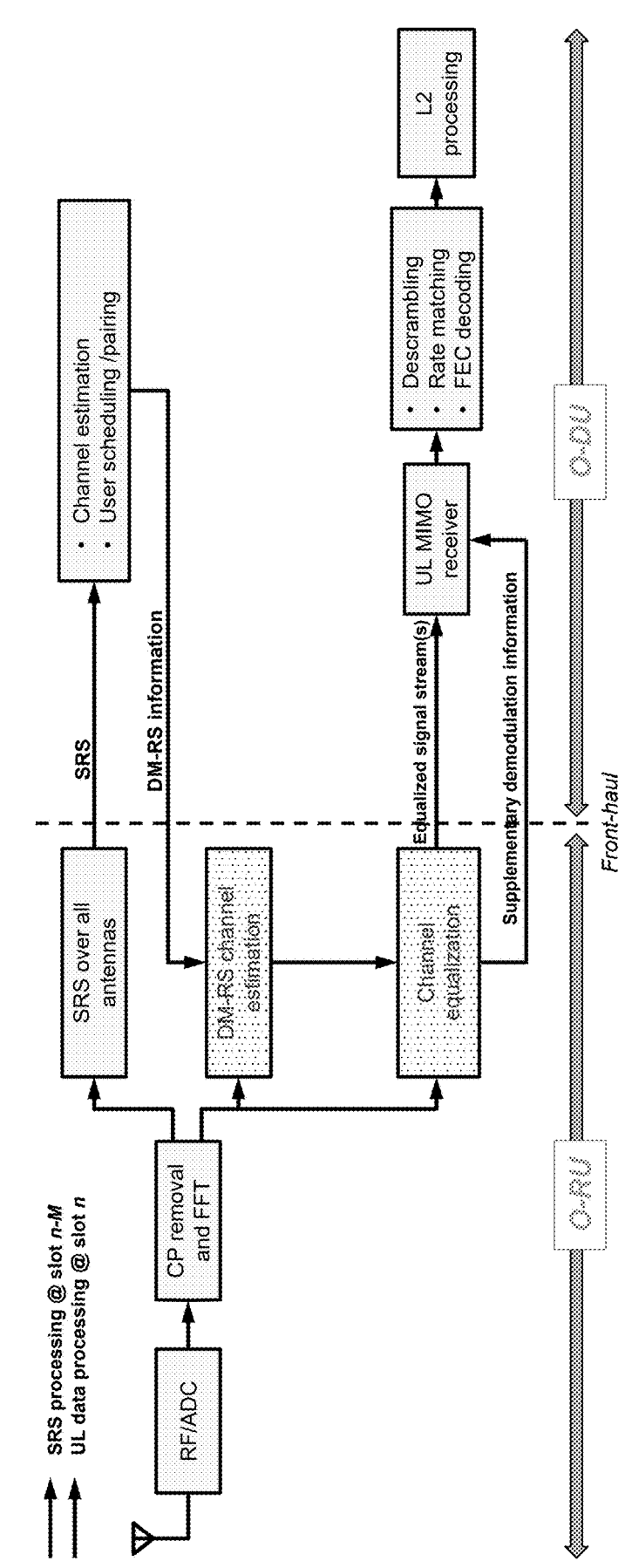
FIG. 7A: UL processing chain for Embodiment 2-A

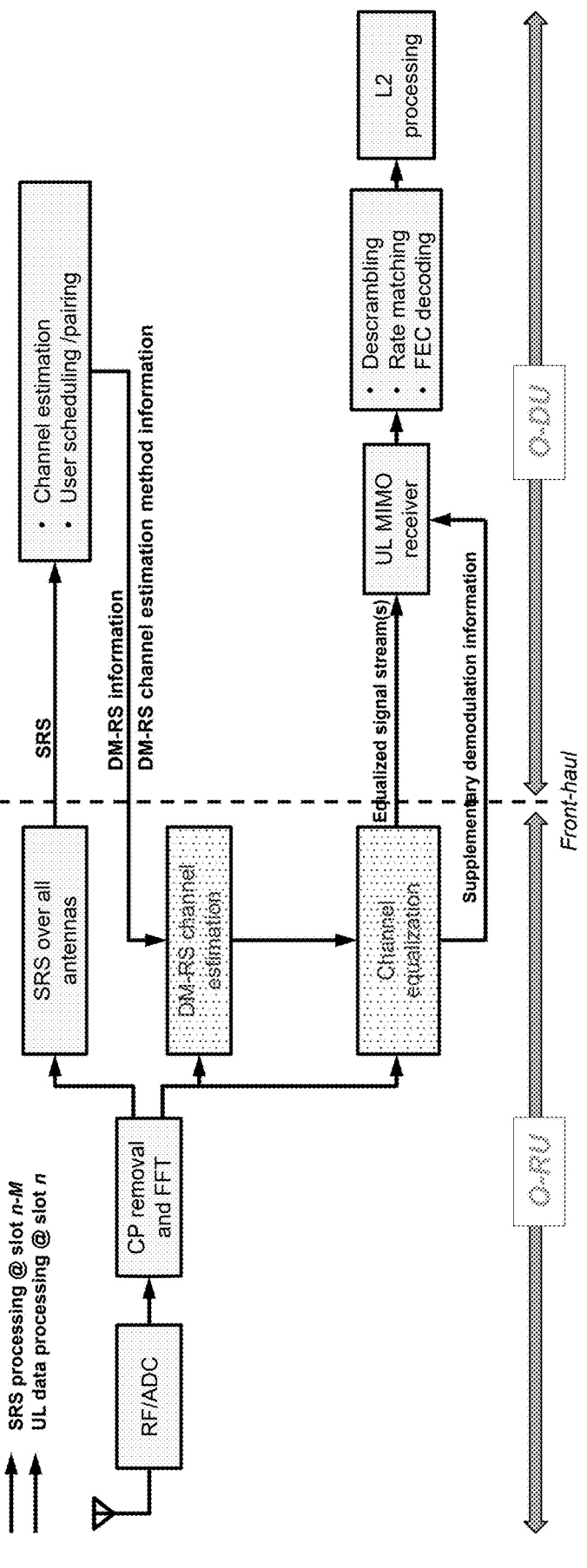
Embodiment 2-B: UL Split in O-RAN with Cat C2 O-RU
FIG. 7B: UL processing chain for Embodiment 2-B

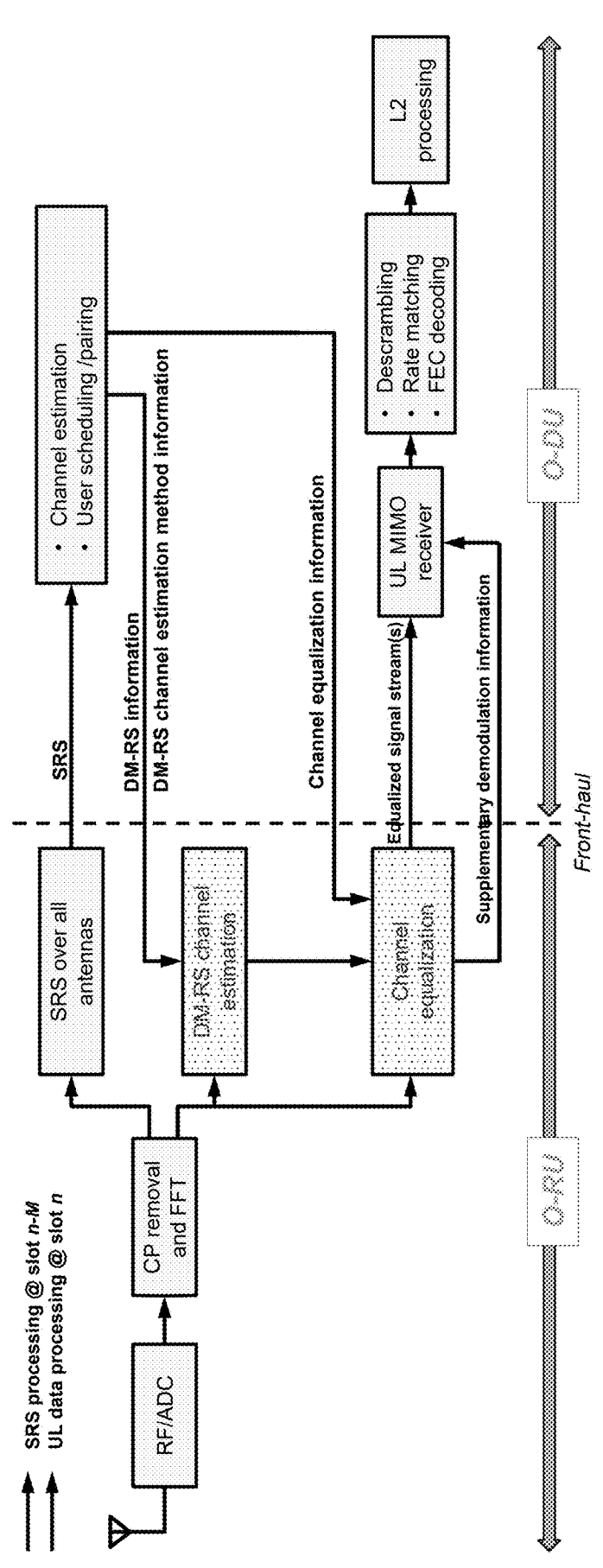
Embodiment 2-C: UL Split in O-RAN with Cat C2 O-RU
FIG. 7C: UL processing chain for Embodiment 2-C

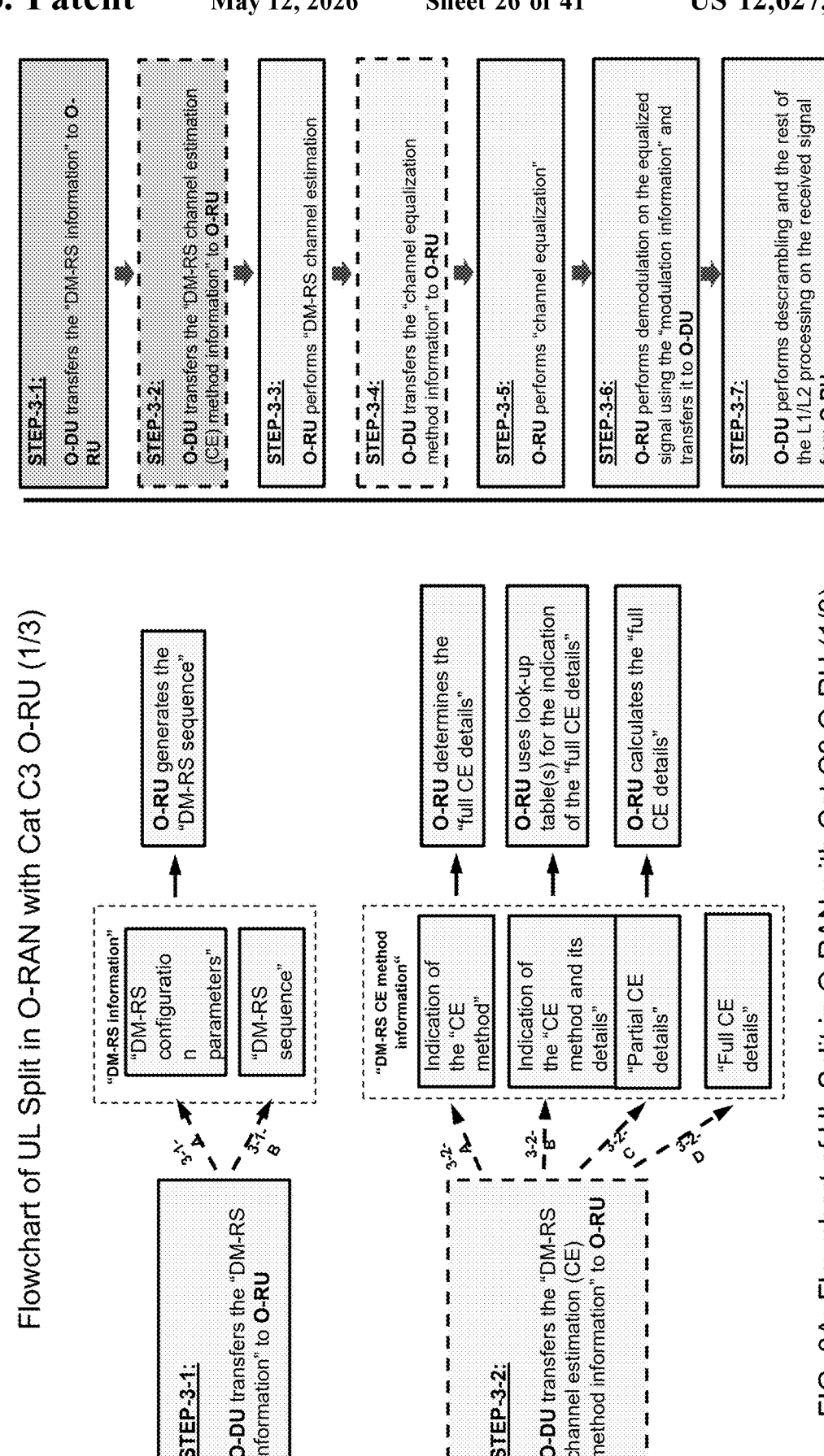

STEP-3-1:
O-DU transfers the "DM-RS information" to O-RU

STEP-3-2:
O-DU transfers the "DM-RS channel estimation (CE) method information" to O-RU STEP-3-3:
O-RU performs "DM-RS channel estimation STEP-3-4:
O-DU transfers the "channel equalization method information" to O-RU STEP-3-5:
O-RU performs "channel equalization"

STEP-3-6:
O-RU performs demodulation on the equalized signal using the "modulation information" and transfers it to O-DU STEP-3-7:
O-DU performs descrambling and the rest of the L1/L2 processing on the received signal from O-RU Flowchart of UL Split in O-RAN with Cat C3 O-RU (1/3)

O-RU generates the "DM-RS sequence"

O-RU determines the "full CE details"

O-RU uses look-up table(s) for the indication of the "full CE details"

O-RU calculates the "full CE details"

"DM-RS information"
"DM-RS configuration parameters"
"DM-RS sequence"

"DM-RS CE method information"
Indication of the "CE method"
Indication of the "CE method and its details"
"Partial CE details"
"Full CE details"

3-1-A
3-1-B
3-2-A
3-2-B
3-2-C
3-2-D

STEP-3-1:
O-DU transfers the "DM-RS information" to O-RU

STEP-3-2:
O-DU transfers the "DM-RS channel estimation (CE) method information" to O-RU FIG. 8A: Flowchart of UL Split in O-RAN with Cat C3 O-RU (1/3)

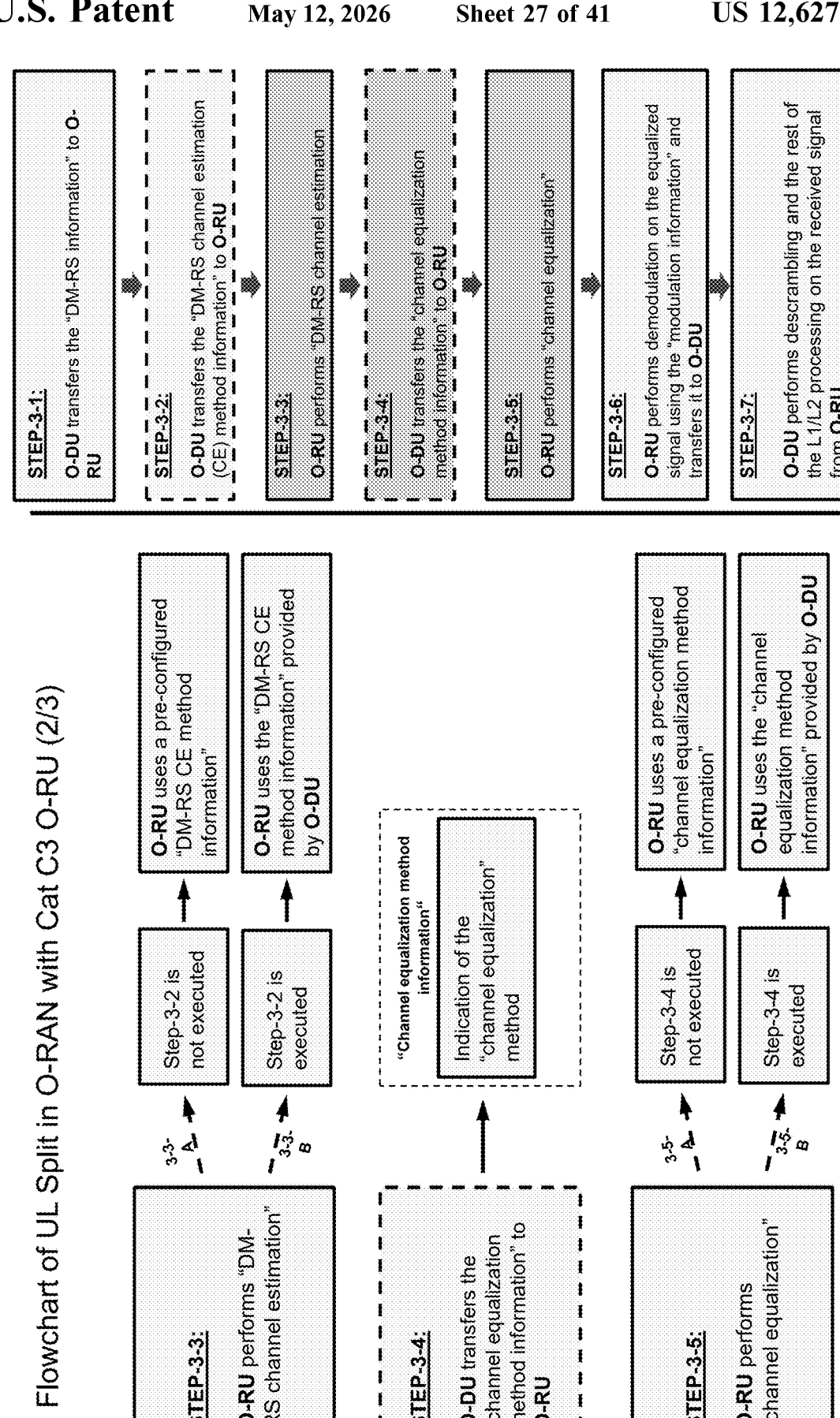

Flowchart of UL Split in O-RAN with Cat C3 O-RU (2/3)

STEP-3-1:
O-DU transfers the "DM-RS information" to O-RU

STEP-3-2:
O-DU transfers the "DM-RS channel estimation (CE) method information" to O-RU

STEP-3-3:
O-RU performs "DM-RS channel estimation"

STEP-3-4:
O-DU transfers the "channel equalization method information" to O-RU

STEP-3-5:
O-RU performs "channel equalization"

STEP-3-6:
O-RU performs demodulation on the equalized signal using the "modulation information" and transfers it to O-DU

STEP-3-7:
O-DU performs descrambling and the rest of the L1/L2 processing on the received signal from O-RU

STEP-3-3:
O-RU performs "DM-RS channel estimation"

3-3-A
3-3-B

Step-3-2 is not executed

Step-3-2 is executed

O-RU uses a pre-configured "DM-RS CE method information"

O-RU uses the "DM-RS CE method information" provided by O-DU

STEP-3-4:
O-DU transfers the "channel equalization method information" to O-RU "Channel equalization method information"

Indication of the "channel equalization" method

STEP-3-5:
O-RU performs "channel equalization"

3-5-A
3-5-B

Step-3-4 is not executed

Step-3-4 is executed

O-RU uses a pre-configured "channel equalization method information"

O-RU uses the "channel equalization method information" provided by O-DU

FIG. 8B: Flowchart of UL Split in O-RAN with Cat C3 O-RU (2/3)

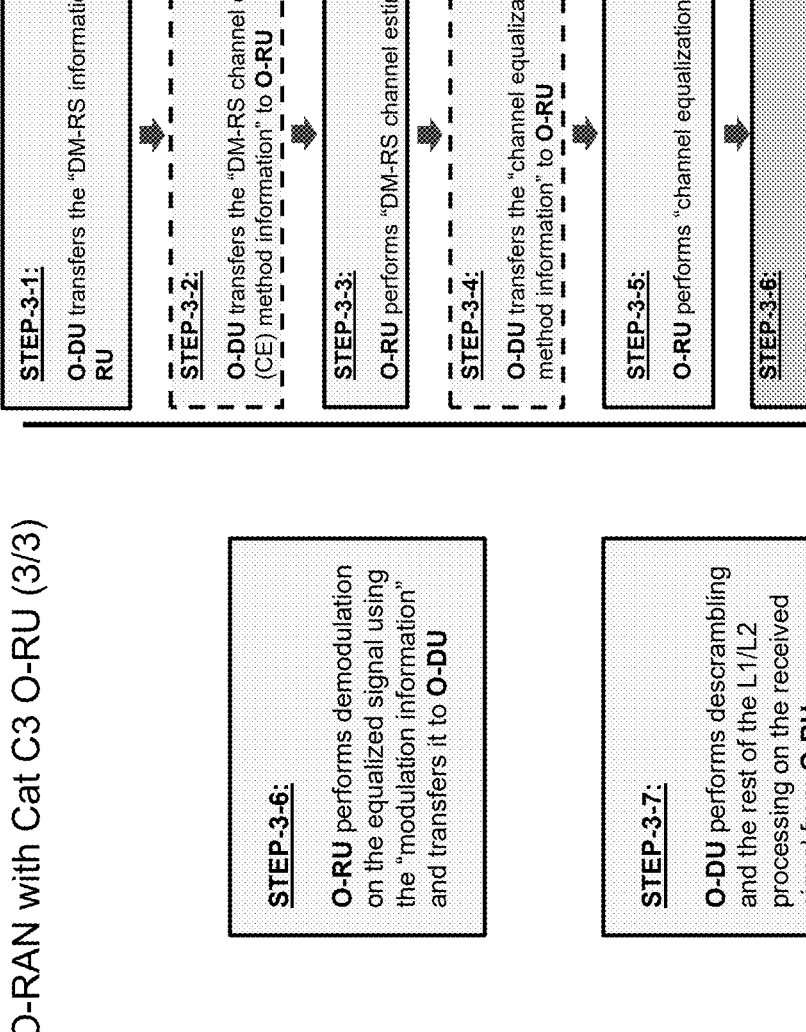

Flowchart of UL Split in O-RAN with Cat C3 O-RU (3/3)

STEP-3-1:

O-DU transfers the "DM-RS information" to O-RU

STEP-3-2:

O-DU transfers the "DM-RS channel estimation (CE) method information" to O-RU

STEP-3-3:

O-RU performs "DM-RS channel estimation

STEP-3-4:

O-DU transfers the "channel equalization method information" to O-RU

STEP-3-5:

O-RU performs "channel equalization"

STEP-3-6:

O-RU performs demodulation on the equalized signal using the "modulation information" and transfers it to O-DU

STEP-3-7:

O-DU performs descrambling and the rest of the L1/L2 processing on the received signal from O-RU

STEP-3-6:

O-RU performs demodulation on the equalized signal using the "modulation information" and transfers it to O-DU

STEP-3-7:

O-DU performs descrambling and the rest of the L1/L2 processing on the received signal from O-RU FIG. 8C: Flowchart of UL Split in O-RAN with Cat C3 O-RU (3/3)

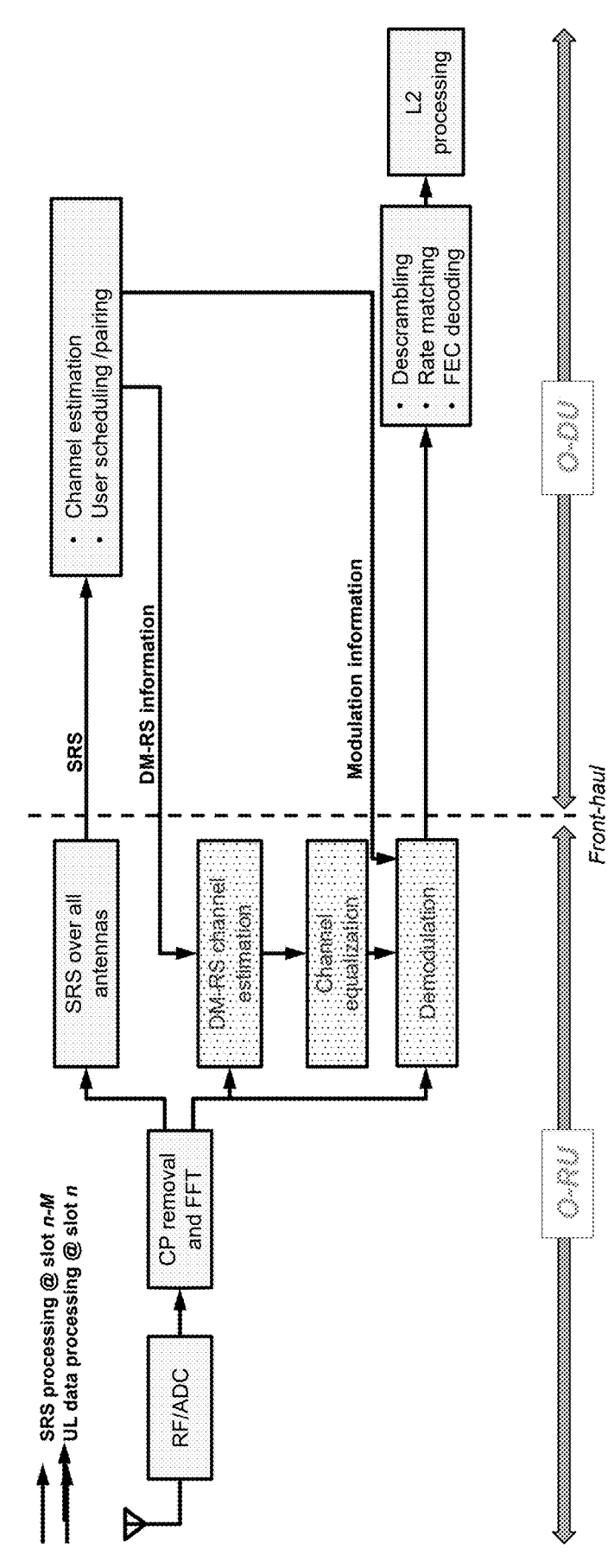
FIG. 9A: UL processing chain for Embodiment 3-A

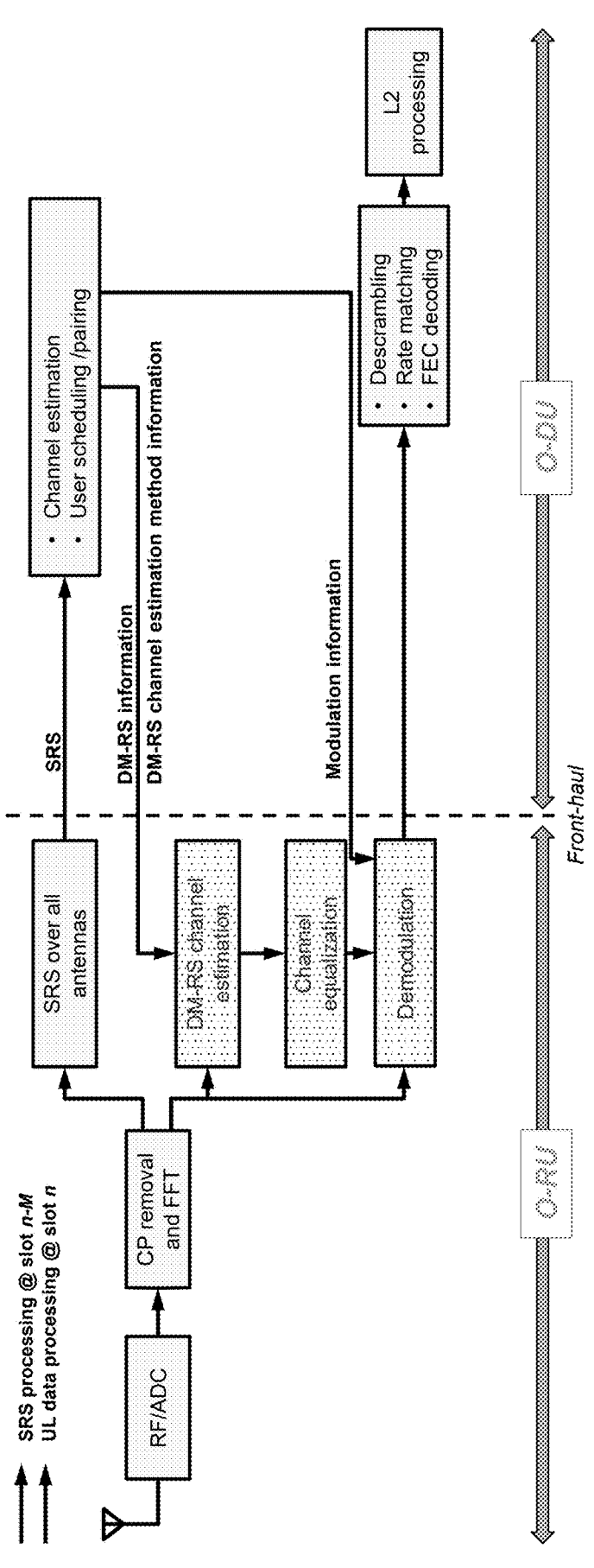
FIG. 9B: UL processing chain for Embodiment 3-B

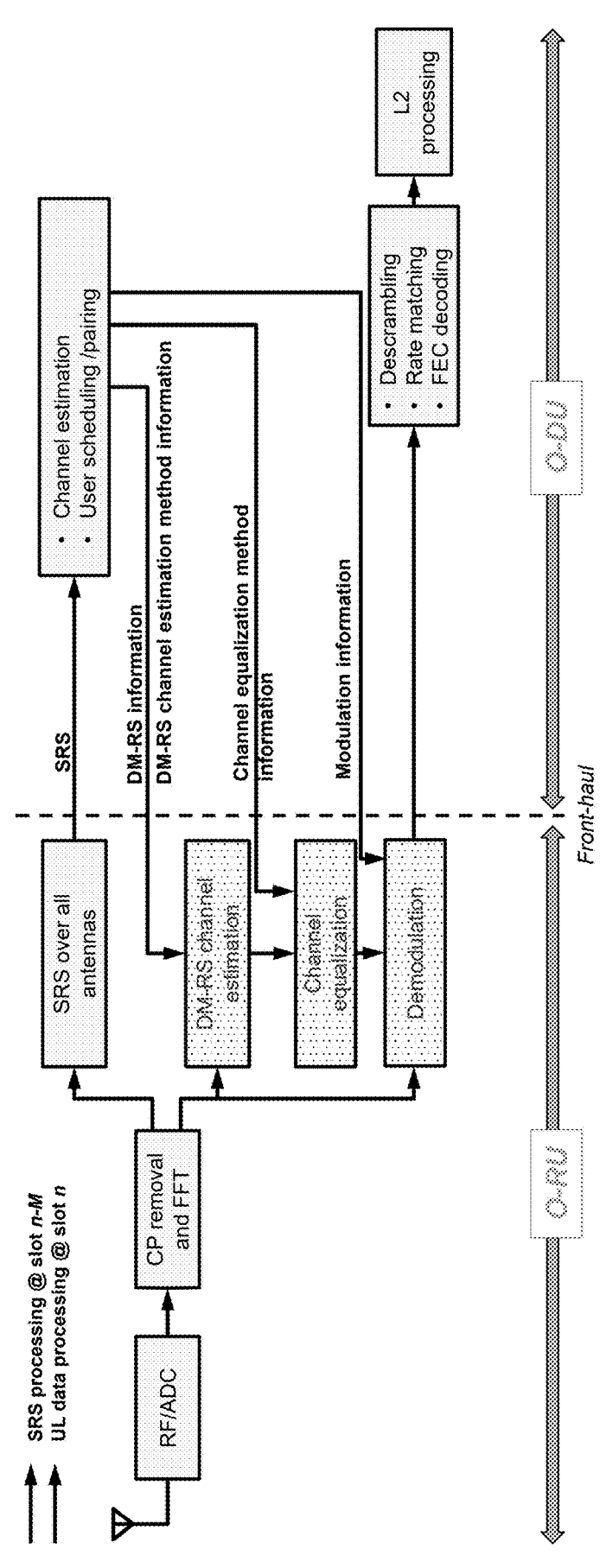
Embodiment 3-C: UL Split in O-RAN with Cat C3 O-RU
FIG. 9C: UL processing chain for Embodiment 3-C

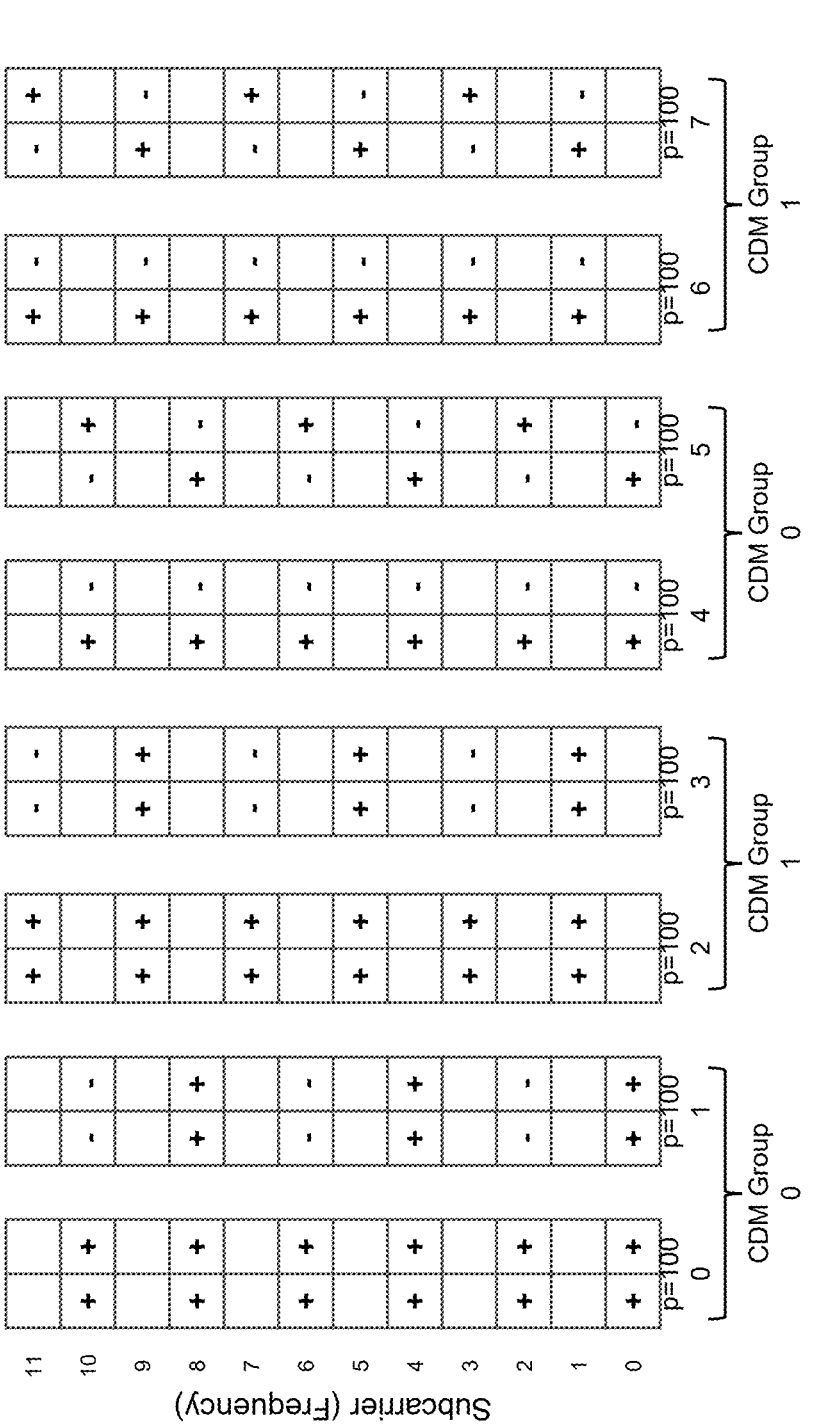
FIG. 10A: Available 8 ports for DM-RS Type 1

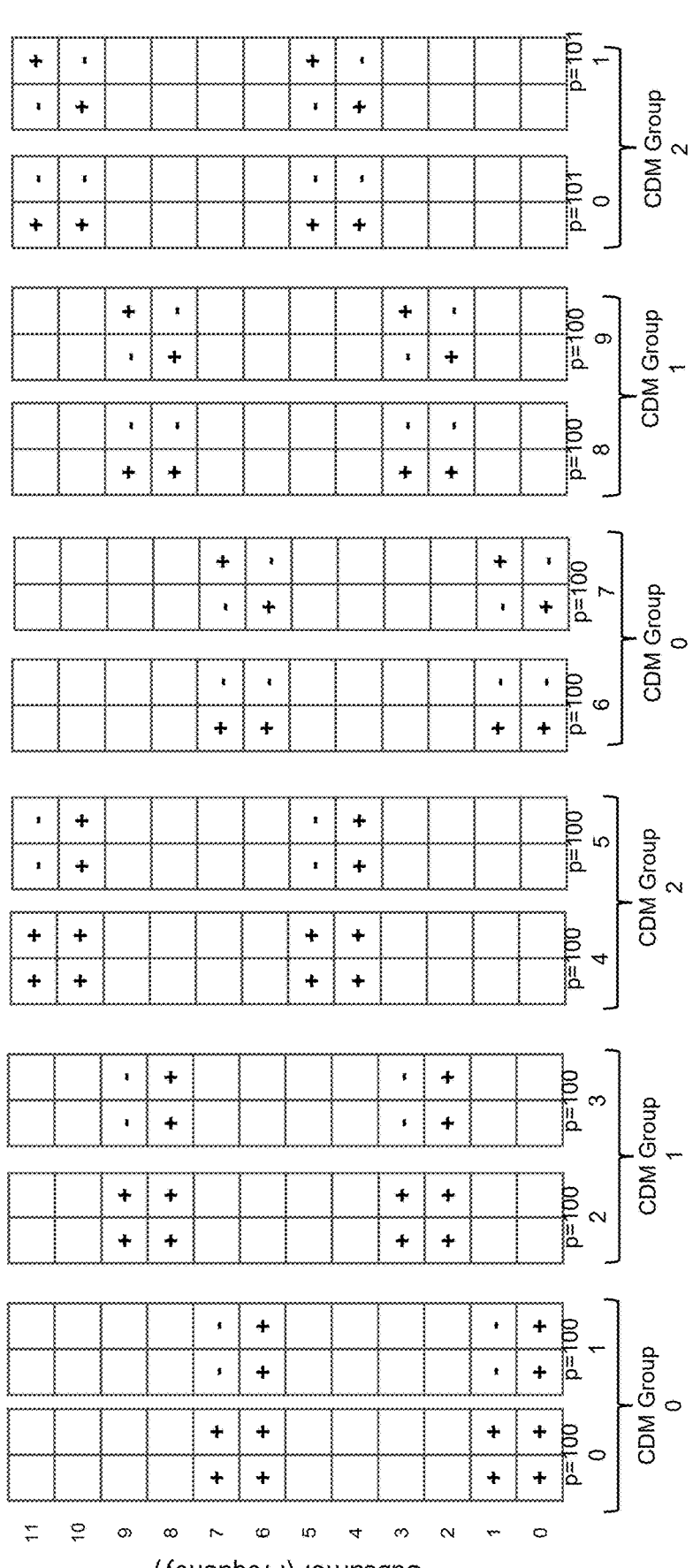
FIG. 10B: Available 12 ports for DM-RS Type 2

DM-RS configuration parameters provided by O-DU to O-RU
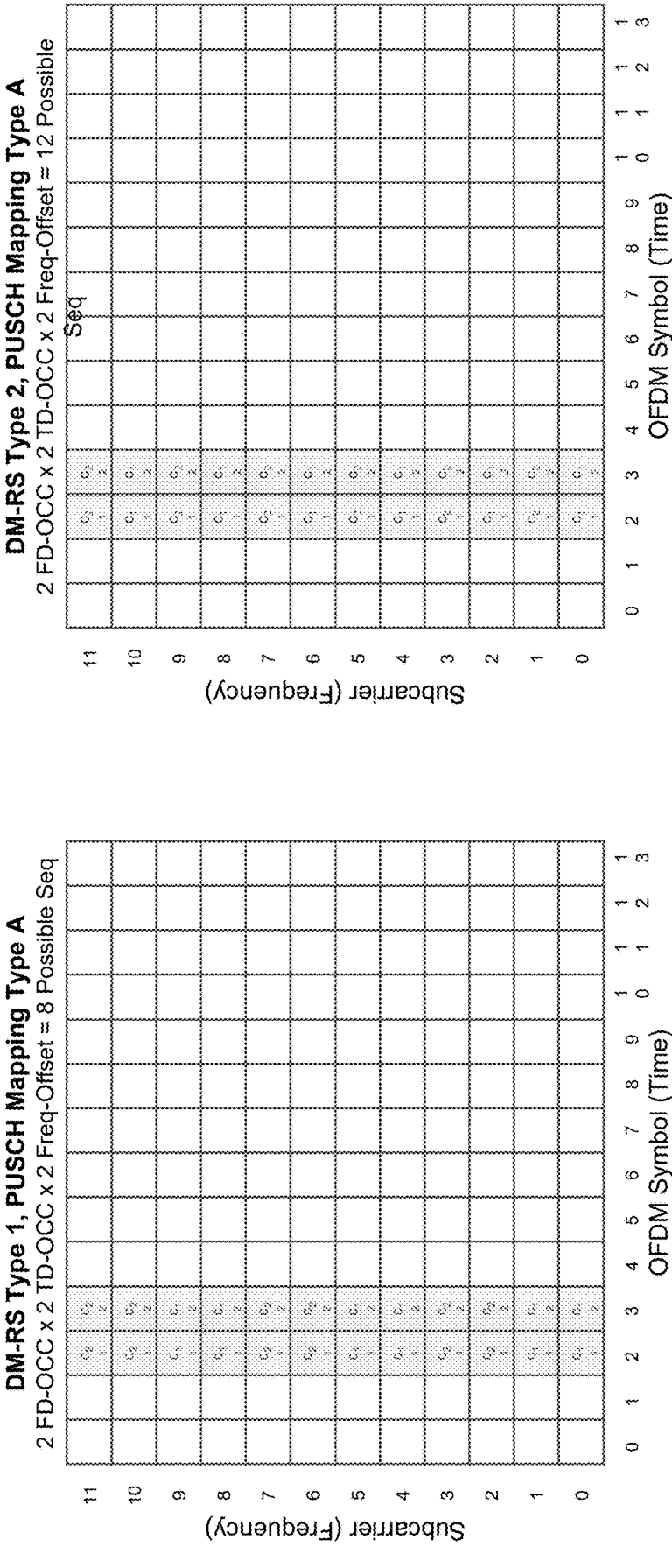
FIG. 10C: DM-RS Mapping for PUSCH Mapping Type A

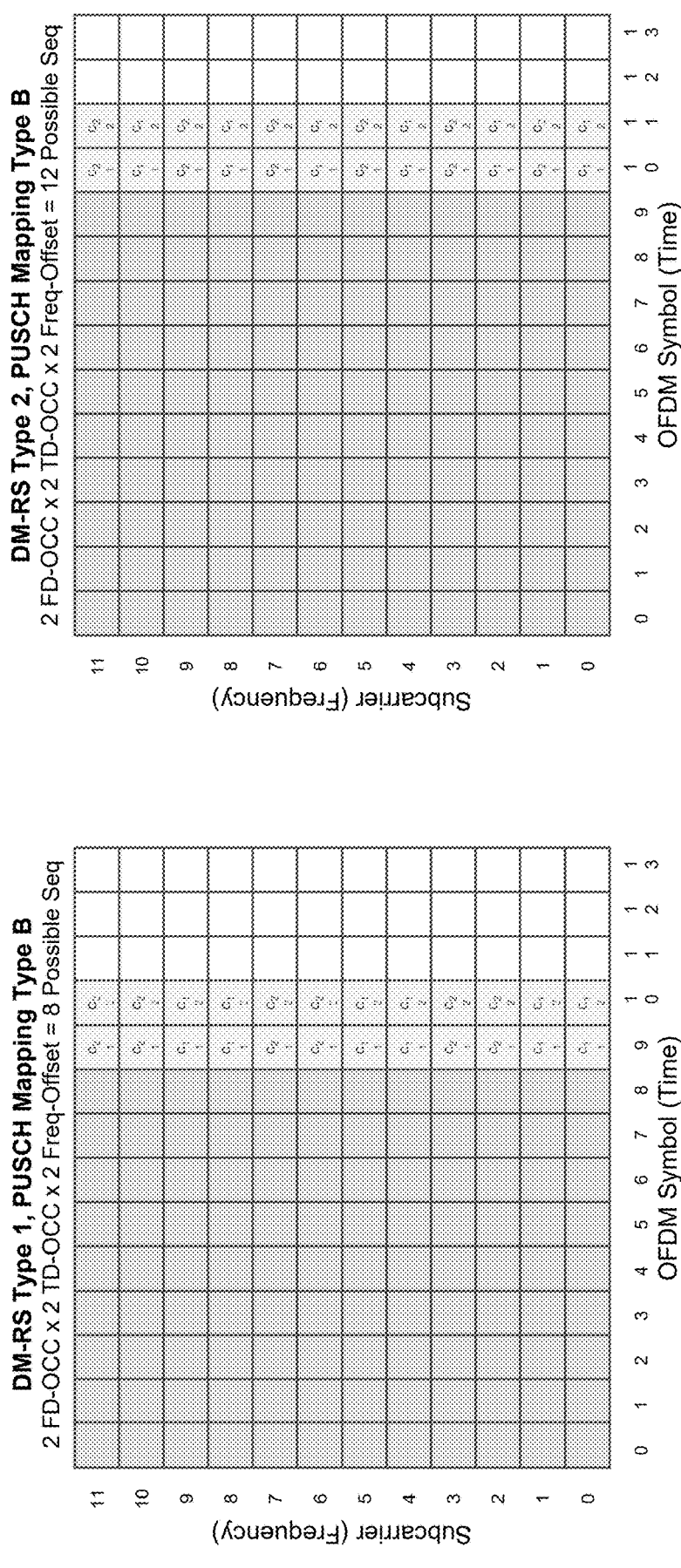
DM-RS configuration parameters provided by O-DU to O-RU
FIG. 10D: DM-RS Mapping for PUSCH Mapping Type B

DM-RS configuration parameters provided by O-DU to O-RU
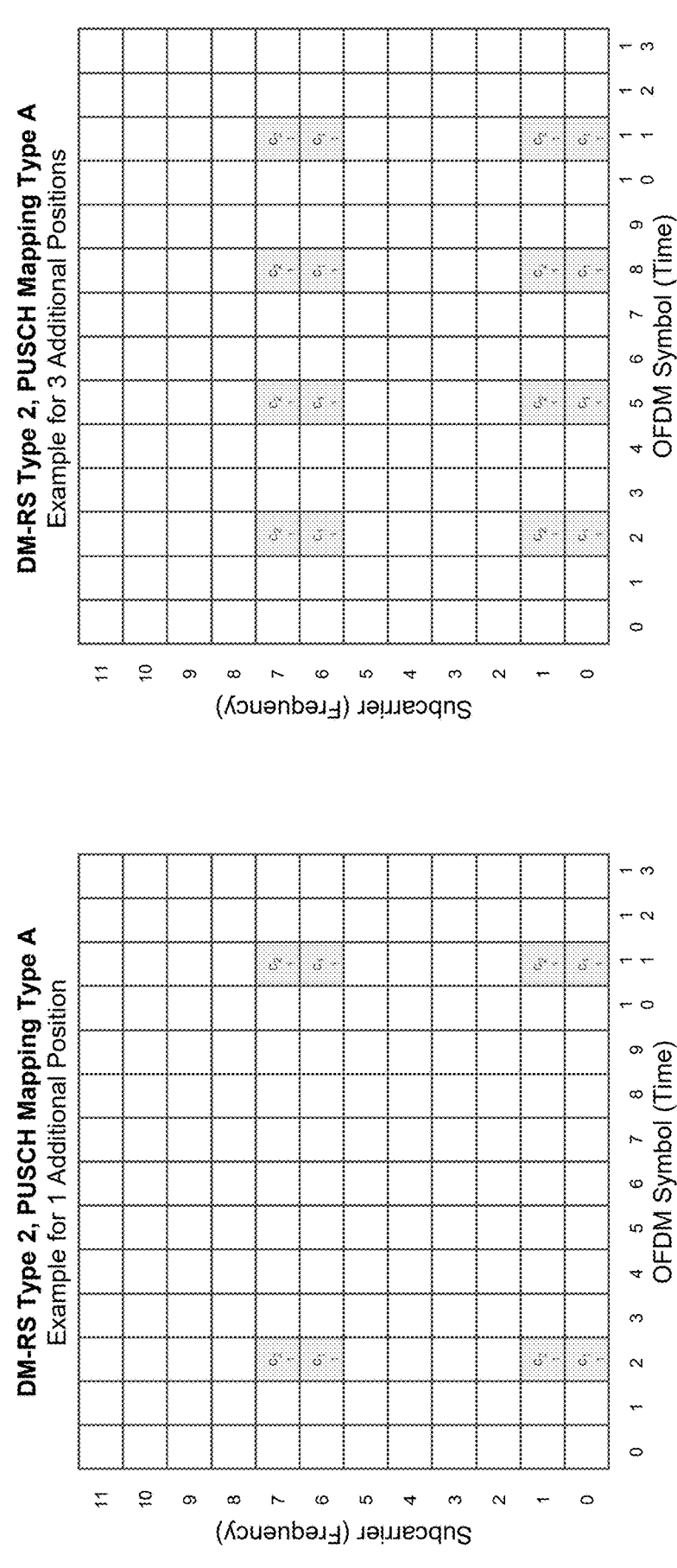
FIG. 10E: Additional DM-RS Sequences for High Mobility

DM-RS based channel estimation at O-RU

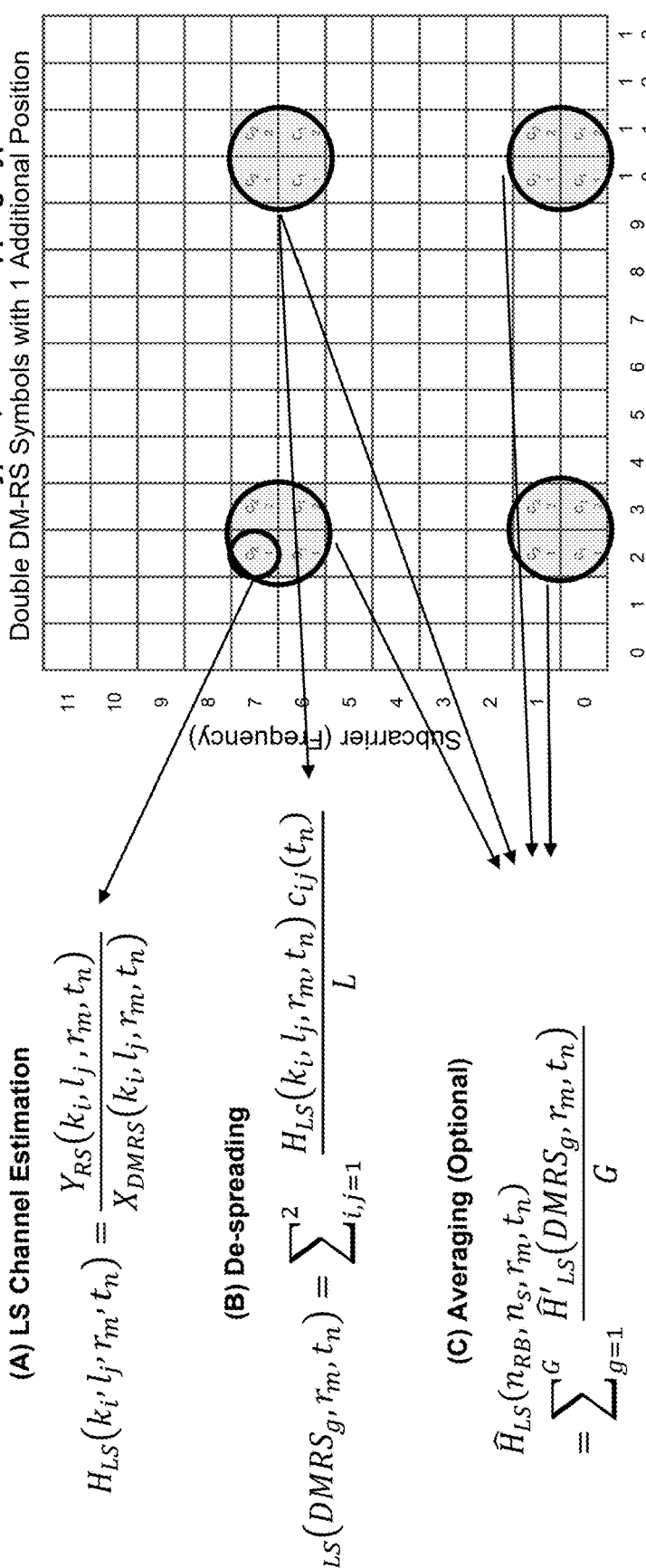

DM-RS Type 2, PUSCH Mapping Type A
Double DM-RS Symbols with 1 Additional Position

(A) LS Channel Estimation

$$H_{LS}(k_i, l_j, r_m, t_n) = \frac{Y_{RS}(k_i, l_j, r_m, t_n)}{X_{DMRS}(k_i, l_j, r_m, t_n)}$$

(B) De-spreading

$$\widehat{H}'_{LS}(DMRS_g, r_m, t_n) = \sum_{i,j=1}^{2} \frac{H_{LS}(k_i, l_j, r_m, t_n) \, c_{ij}(t_n)}{L}$$

(C) Averaging (Optional)

$$\widehat{H}_{LS}(n_{RB}, n_s, r_m, t_n) = \sum_{g=1}^{G} \frac{\widehat{H}'_{LS}(DMRS_g, r_m, t_n)}{G}$$

FIG. 11A: LS Channel Estimation Procedure

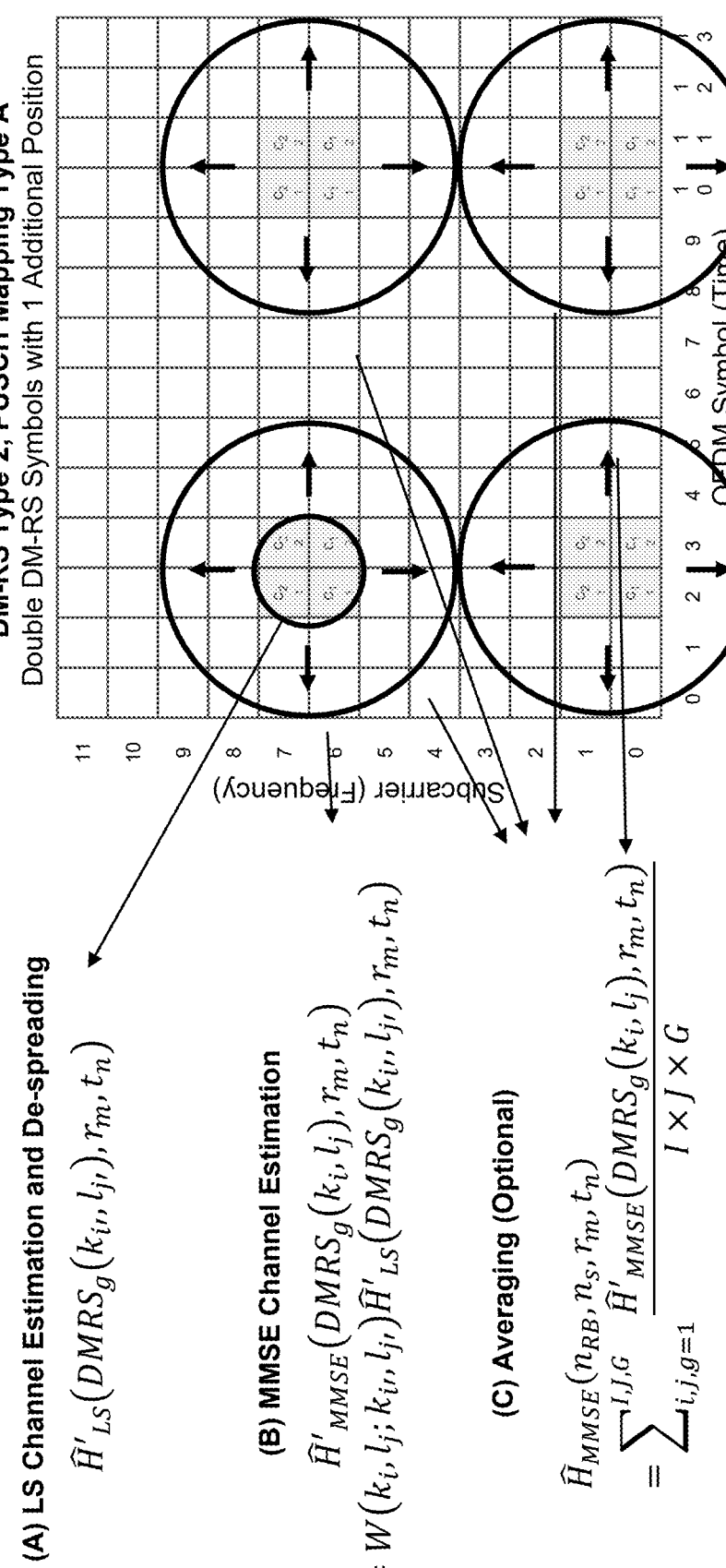

DM-RS based channel estimation at O-RU

DM-RS Type 2, PUSCH Mapping Type A
Double DM-RS Symbols with 1 Additional Position

(A) LS Channel Estimation and De-spreading

$$\hat{H}'_{LS}\left(DMRS_g\left(k_i, l_j\right), r_m, t_n\right)$$

(B) MMSE Channel Estimation

$$\hat{H}'_{MMSE}\left(DMRS_g\left(k_i, l_j\right), r_m, t_n\right)$$
$$= W\left(k_i, l_j; k_{i'}, l_{j'}\right)\hat{H}'_{LS}\left(DMRS_g\left(k_{i'}, l_{j'}\right), r_m, t_n\right)$$

(C) Averaging (Optional)

$$\hat{H}_{MMSE}\left(n_{RB}, n_s, r_m, t_n\right)$$
$$= \sum_{i,j,g=1}^{I,J,G} \frac{\hat{H}'_{MMSE}\left(DMRS_g\left(k_i, l_j\right), r_m, t_n\right)}{I \times J \times G}$$

Subcarrier (Frequency)

OFDM Symbol (Time)

FIG. 11B: MMSE Channel Estimation Procedure

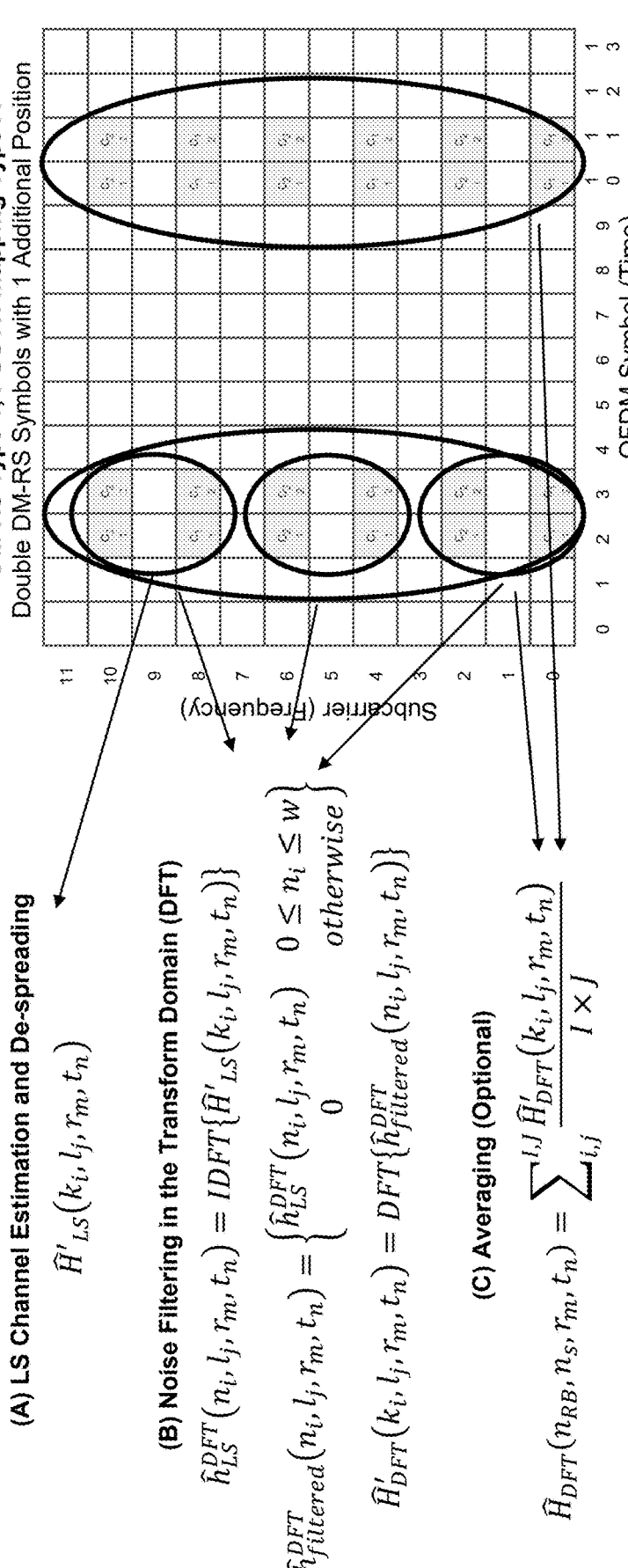

DM-RS based channel estimation at O-RU

DM-RS Type 1, PUSCH Mapping Type A
Double DM-RS Symbols with 1 Additional Position Subcarrier (Frequency)

OFDM Symbol (Time)

(A) LS Channel Estimation and De-spreading

$$\hat{H}'_{LS}(k_i, l_j, r_m, t_n)$$

(B) Noise Filtering in the Transform Domain (DFT)

$$\hat{h}^{DFT}_{LS}(n_i, l_j, r_m, t_n) = IDFT\{\hat{H}'_{LS}(k_i, l_j, r_m, t_n)\}$$

$$\hat{h}^{DFT}_{filtered}(n_i, l_j, r_m, t_n) = \begin{cases} \hat{h}^{DFT}_{LS}(n_i, l_j, r_m, t_n) & 0 \leq n_i \leq w \\ 0 & otherwise \end{cases}$$

$$\hat{H}'_{DFT}(k_i, l_j, r_m, t_n) = DFT\{\hat{h}^{DFT}_{filtered}(n_i, l_j, r_m, t_n)\}$$

(C) Averaging (Optional)

$$\hat{H}_{DFT}(n_{RB}, n_s, r_m, t_n) = \sum_{i,j}^{I,J} \frac{\hat{H}'_{DFT}(k_i, l_j, r_m, t_n)}{I \times J}$$

FIG. 11C: DFT-based Channel Estimation Procedure

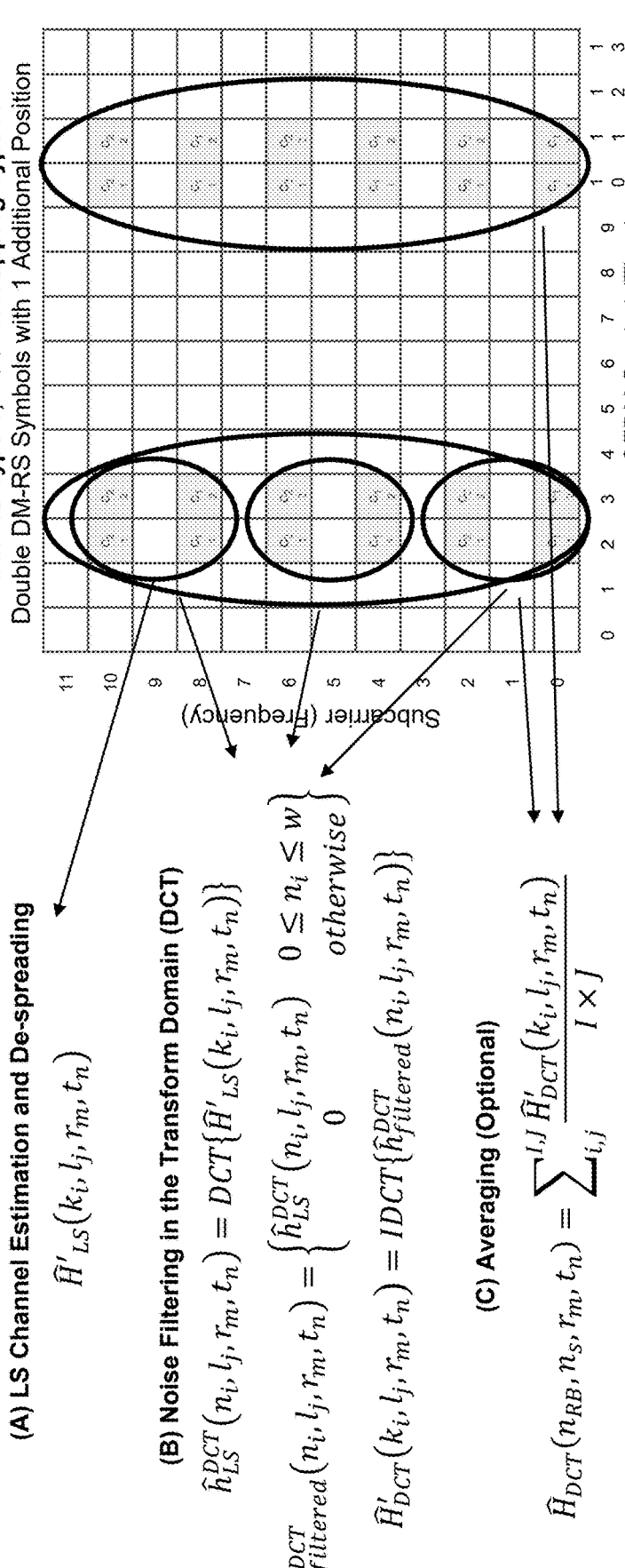
FIG. 11D: DCT-based Channel Estimation Procedure

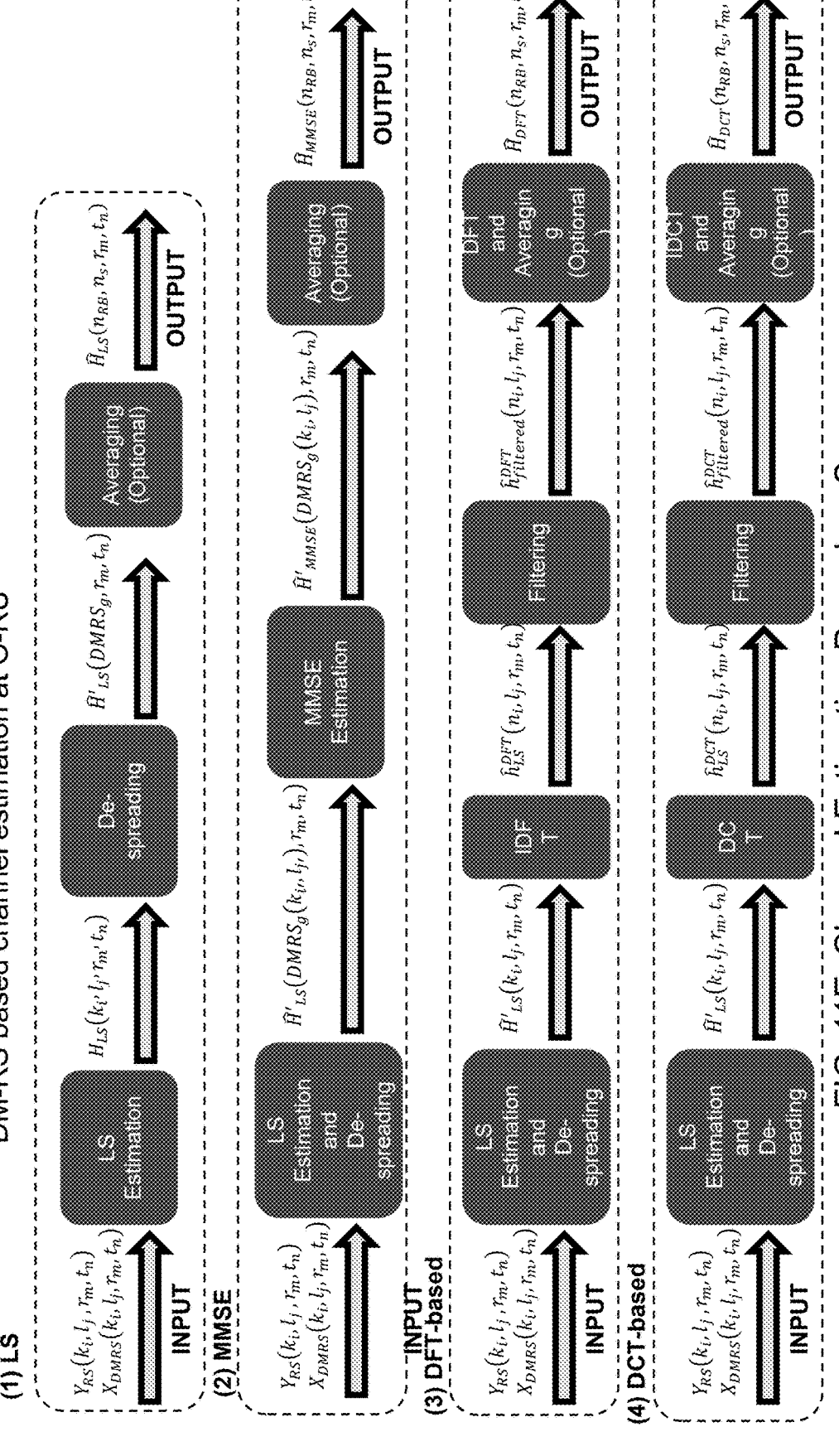
FIG. 11E: Channel Estimation Procedure Summary

SYSTEMS AND METHODS FOR ENHANCING EFFICIENT UPLINK MIMO PERFORMANCE AND IMPLEMENTATION FOR O-RAN-BASED RADIO ACCESS NETWORKS

CROSS REFERENCE TO RELATED APPLICATIONS

The present application claims priority to U.S. Provisional Patent Application No. 63/244,774, filed on Sep. 16, 2021, U.S. Provisional Patent Application No. 63/257,811, filed on Oct. 20, 2021, and U.S. Provisional Patent Application No. 63/300,108, filed on Jan. 17, 2022, the entirety of each of which is incorporated herein by reference.

BACKGROUND OF THE DISCLOSURE

1. Field of the Disclosure

The present disclosure relates to systems and methods for operating the Radio Access Network (RAN) design for 4G- and 5G-based mobile networks, and relates more particularly to systems and methods to enable efficient uplink mMIMO performance for Open-RAN (O-RAN).

Traditionally, the radio access networks were built as an integrated unit where the entire RAN was processed. The RAN network traditionally uses application-specific hardware for processing, making them difficult to upgrade and evolve. As future networks evolve to have massive densification of networks to support increased capacity requirements, there is a growing need to reduce the CAPEX/OPEX costs of RAN deployment and make the solution scalable and easy to upgrade.

In the field of cloud-based Radio Access Networks (RAN), a significant portion of the RAN layer processing is performed at a central unit (CU) and a distributed unit (DU). Both CUs and DUs are also known as the baseband units (BBUs). CUs are usually located in the cloud on commercial off-the-shelf servers, while DUs can be distributed. Also, the RF and real-time functions can be processed in the remote radio unit (RU).

The context of the present disclosure is related to systems and methods to enable efficient uplink mMIMO performance for O-RAN-based RANs.

3GPP has defined multiple split options across the entire radio access network (RAN). There are various factors affecting the selection of the fronthaul split option, such as bandwidth, latency, implementation cost, virtualization benefits, complexity of the fronthaul interface, expansion flexibility, computing power, and memory requirement.

One of the most common splits that are standardized recently by the O-RAN alliance is split option 7-2x (Intra-PHY split). This split has multiple advantages such as simplicity, transport bandwidth scalability, beamforming support, interoperability, support for advanced receivers and inter-cell coordination, lower O-RU complexity, future proof-ness, and interface and functions symmetry.

One of the technologies that use the O-RAN 7-2x specifications is 4G/5G massive MIMO (mMIMO). In SU-MIMO, the gNB serves a single user on a set of time-frequency resources, whereas in MU-MIMO setup, the gNB serves multiple users on the same time-frequency resources. In UL, UEs send SRS signals over a relatively long period of time, which are sent to the O-DU from the O-RU via the fronthaul interface. Using the SRS signal, the O-DU then obtains the UL channel estimates of the UEs, using which gNB performs user pairing (in the case of MU-MIMO) and calculates UL combining/digital beamforming matrix for the scheduled user(s). The O-DU sends the combining/digital beamforming matrix elements or weights to the O-RU, which in return applies these elements to the frequency-domain PUSCH IQ samples received at a later time and sends the resulting IQ samples to the O-DU for the rest of PHY processing. One aspect of the combining operation (using the combining/digital beamforming matrix) at O-RU is that it enables the O-RU to reduce the number of streams transferred from O-RU to O-DU to a value smaller than the number of RX antennas. In mMIMO systems, the number of RX antennas is large, and transferring all received streams for PUSCH to O-DU incurs significant and prohibitive front-haul bandwidth consumption.

Although split option 7-2x enables multiple advanced features, such as beamforming and UL CoMP, the system performance may degrade in certain scenarios, such as UL mMIMO for high-speed UEs and/or interference-limited scenarios, where there is significant inter-cell interference (ICI) from neighboring cells contaminating the UL signal from the desired UEs.

Performance degradation in high mobility scenarios: The reason for such degradation in high-speed UEs scenarios is channel aging. Specifically, the SRS signals are sent over a relatively long period of time (e.g., 10s of milliseconds). By the time the O-RU applies the combining/digital beamforming matrix elements to the PUSCH symbols, these matrix elements become inaccurate since the SRS signals are outdated (i.e., SRS to UL-data TTI delay is long). In other words, the channel gains between the UEs and the gNB at the time PUSCH is received are no longer reflected accurately by the SRS signals (since UEs are moving fast in such a scenario), which cause interference and hence throughput degradation during the combining process (using the combining/digital beamforming matrix) in the UL chain.

Performance degradation in the presence of inter-cell interference (IC): The main reason for performance degradation in the presence of ICI is signal dimension reduction at O-RU. In particular, squeezing desired signal and interference signal into a smaller number of dimensions causes performance degradation of the interference rejection at O-DU.

One way to mitigate the performance degradation in high mobility scenarios is to configure SRS transmissions with shorter periodicities. However, shorter SRS periodicity may decrease the SRS capacity, i.e., the number of UEs that can be configured to transmit SRS, because more resources are occupied by each UE for SRS transmission. Also, in a time-division duplex (TDD) system, there are certain limitations on SRS periodicity due to the TDD frame structure adopted by the system.

Another approach to mitigate the performance degradation in high mobility scenarios is to predict the UL channel of the PUSCH/PUCCH slot at DU based on UL channels of a number of previous SRS transmissions. In addition to the computation complexity of the underlying prediction algorithm, this approach has its own limitations on performance improvement depending on UE speeds.

For scenarios with inter-cell interference, a typical O-DU processing uses a minimum mean-squared error receiver with interference rejection combining (MMSE-IRC) to mitigate the impact of the interference. However, since O-DU has access to the compressed PUSCH signal transferred from O-RU, the performance of MMSE-IRC may be degraded compared to a typical 7-3 receiver wherein MMSE-IRC is computed based on and applied to the full-dimension signal.

There are four planes specified in the O-RAN specs, namely user-plane (U-plane), control plane (C-plane), synchronization plane (S-plane), and management plane (M-plane). The existing O-RAN spec explains the exact method of sending the C-plane messages in the downlink (DL) direction and sending/receiving the U-plane messages between the O-DU and the O-RU.

M-Plane:

The M-plane specifies the management plane protocols used over the fronthaul interface linking the O-RU (O-RAN Radio Unit) with other management plane entities, which can include the O-DU (O-RAN Distributed Unit), the O-RAN defined Service Management and Orchestration (SMO) functionality as well as other generic Network Management Systems (NMS).

In contrast to C-plane (described in the next section), Management Plane refers to non-real-time management operations between the O-DU and the O-RU. Specifically, The Lower-Layer Split M-plane (LLS-M) facilitates the initialization, configuration, and management of the O-RU to support the stated functional split A NETCONF/YANG-based M-Plane is used for supporting the management features, including "startup" installation, software management, configuration management, performance management, fault management, and file management towards the O-RU. The M-Plane supports two architectural models:

1. Hierarchical model: The O-RU is managed entirely by one or more O-DU(s) using a NETCONF based M-Plane interface. When the O-RU is managed by multiple O-DUs, it is typically for enabling O-DU and/or transport connectivity redundancy capabilities.

2. Hybrid model: The hybrid architecture enables one or more direct logical interface(s) between management system(s) and O-RU in addition to a logical interface between O-DU and the O-RU. Based on the transport topology, various modes of network connectivity are possible between O-RU and O-DU and SMO. The basic requirement for M-Plane is to have end-to-end IP connectivity between the O-RU and the elements managing it (O-DU, SMO, or so-called "O-RU Controllers").

The M-Plane provides the following major functionalities to the O-RU. These features are implemented using the NETCONF provided functions such as "Startup" installation, SW management, Configuration management, Performance management, Fault Management, and File Management. The data models representing the M-Plane are organized as a set of reusable YANG modules.

C-Plane:

The purpose of the C-plane messages is to transmit data-associated control information required for the processing of user data (e.g., scheduling and beamforming commands). These messages are sent separately for DL-related commands and UL-related commands.

A common frame format is used for C-Plane messages, having a transport layer and an application layer. The application layer is within the transport layer payload and consists of a common header for time reference, followed by information and parameters dependent and specific to the Section Type in use. Multiple sets of section data of the same Section Type value can be lined up one after another within the payload. To minimize packet rate over the interface, a transmitter should fill messages with as many subsequent sections (with or without sequential section IDs) as possible.

Section Type 1 is used for most Downlink and Uplink radio channels. In accord with O-RAN specifications, the fields of Section type 1 can be explained as follows:

Transport Layer
Application Layer
    Common Header Fields
        dataDirection (data direction (gNB Tx/Rx)) field: 1 bit
        payloadVersion (payload version) field: 3 bits
            value="1" shall be set (1st protocol version for payload and time reference format)
        filterIndex (filter index) field: 4 bits
        frameId (frame identifier) field: 8 bits
        subframeId (subframe identifier) field: 4 bits
        slotID (slot identifier) field: 6 bits
        startSymbolid (start symbol id) field: 6 bits
        numberOfsections (number of sections) field: 8 bits
        sectionType (section type) field: 8 bits
            value="1" shall be set
        udCompHdr (user data compression header) field: 8 bits 11
        reserved (reserved for future use) field: 8 bits
    Section Fields
        sectionId (section identifier) field: 12 bits
        rb (resource block identifier) field: 1 bit
        symInc (symbol number increment command) field: 1 bit
        startPrbc (starting PRB of data section description) field: 10 bits
        numPrbc (number of contiguous PRBs per data section description) field: 8 bits
        reMask (resource element mask) field: 12 bits
        numSymbol (number of symbols) field: 4 bits
        ef (extension flag) field: 1 bit
        beamId (beam identifier) field: 15 bits FIG. 1A illustrates the conventional UL functional split in O-RAN split 7-2x for Cat A O-RU. FIG. 1B illustrates the processing blocks of UL processing in a conventional ORAN split 7-2x for Cat A O-RU. As illustrated in FIG. 1B, the operations in O-RAN split 7-2x for UL processing for Cat A O-RU are as follows:

O-RU receives the sounding reference signal (SRS) signal(s) from the UE(s) at slot n-M, where M is a positive integer.

O-RU applies ADC, CP removal, and FFT and transfers the frequency-domain (FD) IQ samples of the SRS over all the antennas to the O-DU using O-RAN U-plane message(s).

O-DU performs channel estimation on the IQ samples of SRS received from O-RU. Also, using the estimated channels, it performs user scheduling (and user pairing in the case of MU-MIMO) to indicate which UEs are scheduled to transmit PUSCH over the same time-frequency resources at a later time.

O-RU applies ADC, CP removal, and FFT and transfers the frequency-domain (FD) IQ samples of the received PUCCH/PUSCH over all the antennas to the O-DU using O-RAN U-plane message(s).

O-DU performs DM-RS channel estimation on the signal stream(s) of slot n received from O-RU. Subsequently, O-DU performs UL MIMO processing by performing channel equalization using the estimated channel (with optional inter-cell interference rejection) and demodulation of the equalized signal stream(s) and performs the rest of L1/L2 processing on the resulting signal stream(s).

One drawback of the O-RAN operation with Cat A O-RU is its large fronthaul throughput requirement, especially in massive MIMO scenarios.

FIG. 2A illustrates the conventional UL functional split in O-RAN split 7-2x for Cat B O-RU FIG. 2B illustrates the conventional processing blocks of UL processing in ORAN split 7-2x for Cat B O-RU. As illustrated in FIG. 2B, the operations in O-RAN split 7-2x for UL processing for Cat B O-RU are as follows:

1) O-RU receives the sounding reference signal (SRS) signal(s) from the UE(s) at slot n-M, where M is a positive integer.

O-RU applies ADC, CP removal, and FFT and transfers the frequency-domain (FD) IQ samples of the SRS over all the antennas to the O-DU using O-RAN U-plane message(s).

O-DU performs channel estimation on the IQ samples of SRS received from O-RU. Also, using the estimated channels, it performs the following:

O-DU performs user scheduling (and user pairing in the case of MU-MIMO) to indicate which UEs are scheduled to transmit PUSCH over the same time-frequency resources at a later time.

O-DU calculates combining/digital beamforming matrix elements to be applied on the PUSCH received from UE(s) scheduled at a later time, i.e., at slot n.

O-DU transfers the combining/digital beamforming matrix elements calculated at Step 3b to O-RU sometime earlier than slot n.

O-RU applies ADC, CP removal, and FFT and then applies the combining/digital beamforming matrix elements on the received PUCCH/PUSCH signal of slot n and transfers the resulting layers to the O-DU.

O-DU performs DM-RS channel estimation on the signal stream(s) of slot n received from O-RU. Subsequently, O-DU performs UL MIMO processing by performing channel equalization using the estimated channel (with optional inter-cell interference rejection) and demodulation of the equalized signal stream(s) and performs the rest of L1/L2 processing on the resulting signal stream(s).

One drawback of O-RAN operation with Cat B O-RU is that the combining/digital beamforming matrix elements are calculated using SRS channel estimates (at O-DU) at a slot n-M which is earlier than the current slot n. Since the channel may change during the M slots between slot n-M and slot n, the combining/digital beamforming matrix may not properly match the UL channel of slot n. This can result in some performance degradation, particularly for UEs with higher mobility. Also, since O-DU operates on a combined version of the signal received from O-RU in slot n (not the full-dimension signal), the interference rejection performance in O-DU may be degraded.

SUMMARY

Implementations as described herein provide methods to enable an efficient mMIMO system for O-RAN based RANs.

Implementations as described herein address the aforementioned issues of performance degradation of the O-RAN 7-2x based UL MIMO. Aspects of the implementation include the following:

Asymmetrical functional split (using different functional splits in DL and UL): In implementations, the functional split point in the UL is changed so that further signal processing can be done at O-RU. In one embodiment, O-RU performs a first level of DM-RS channel estimation on PUSCH/PUCCH and uses the result of this channel estimation to calculate the combining/digital beamforming matrix, and after performing combining/digital beamforming on the received signal, transfers the resulting signal to O-DU for the rest of processing. In another embodiment, O-RU performs both DM-RS channel estimation and equalization on PUSCH/PUCCH and transfers the equalized signal to O-DU for the rest of the processing. In yet another embodiment, O-RU performs DM-RS channel estimation, equalization, and demodulation on PUSCH/PUCCH and transfers the resulting demodulated signal to O-DU for the rest of the processing. Described are multiple signaling (between O-DU and O-RU) and processing options for functional splits.

Signaling mechanisms to enable asymmetrical functional splits: Described are C-plane message modifications and M-plane enhancements to enable different split architectures. To enable different asymmetrical functional splits mentioned above and allow interoperability across different O-RU and O-DU vendors, several M-plane and C/U-plane enhancements are described. In one embodiment, the O-RU reports, via the M-plane, to the O-RU controller as part of its capability the supported split points and supported techniques (e.g., channel estimation techniques, MIMO detection techniques, etc.). In another embodiment, the O-RU controller statically configures, via the M-plane, the O-RU with the static parameters and static configurations based on the reported capabilities to operate using specific methods. In another embodiment, new sections and section extensions to the C-plane messages are proposed to carry, in real-time, the parameters and configurations at the O-RU to enable operation in an innovative split architecture.

Described is an Open Radio Access Network (O-RAN) system, comprising:

a baseband unit (BBU) having an O-RAN centralized unit (0-CU) and an O-RAN distributed unit (O-DU);

an O-RAN radio unit (O-RU) remote from the BBU; and a fronthaul interface between the O-RU and the BBU;

wherein a functional split of O-RAN functions respectively assigned to O-RU and O-DU for the fronthaul interface between the BBU and the O-RU is different for downlink (DL) and uplink (UL), and wherein at least one of i) demodulation reference signal (DM-RS)-based channel estimation is performed by the O-DU in the DL and by the O-RU in the UL, ii) equalization is performed by the O-DU in the DL and by the O-RU in the UL, and iii) demodulation is performed by the O-DU in the DL and by the O-RU in the UL.

In an embodiment where the O-DU transfer DM-RS information to the O-RU, the DM-RS information including DM-RS configuration parameters of the scheduled or paired UEs/layers are received by the O-RU, and the O-RU generates a DM-RS sequence using the DM-RS configuration parameters received from O-DU. In an implementation, the O-DU transfers DM-RS channel estimation method information to the O-RU to indicate a channel estimation method. In an implementation, the O-DU indicates a combining/digital beamforming matrix calculation method to the O-RU. In an implementation, the O-DU transfers a combining/digital beamforming matrix enhancement information to the O-RU. In an implementation, the O-DU indicates a combining/digital beamforming matrix calculation method to the O-RU. The O-RU estimates the UL channels of the UE(s) and/or layer(s) transmitted at a current slot n using the DM-RS information. In an implementation, the O-DU indicates a combining/digital beamforming matrix calculation method to the O-RU. In an implementation, the O-RU calculates the combining/digital beamforming matrix. In an implementation, the O-RU applies the calculated combining/digital beamforming matrix to a received signal and transfers the calculated combining/digital beamforming matrix to the O-DU. In an implementation, the O-DU performs a L1/L2 processing on the resulting signal.

In an embodiment where i) a demodulation reference signal (DM-RS)-based channel estimation is performed by the O-DU in the DL and by the O-RU in the UL, and ii) an equalization is performed by the O-DU in the DL and by the O-RU in the UL. In an implementation, where the O-DU transfers DM-RS information to the O-RU, the DM-RS information including DM-RS configuration parameters of the scheduled or paired UEs/layers are received by the O-RU, and the O-RU generates a DM-RS sequence using the DM-RS configuration parameters received from O-DU. In an implementation, the O-RU estimates the UL channels of the UE(s) and/or layer(s) transmitted at a current slot n using the DM-RS information. In an implementation, prior to the estimation the UL channels of the UE(s) and/or layer(s) transmitted at a current slot n using the DM-RS information, the O-DU indicates ta DM-RS channel estimation method information to the O-RU. In an implementation, the O-DU transfers DM-RS channel estimation method information to the O-RU to indicate the channel estimation method. In an implementation, the O-RU equalizes the UL channels of the one or more UEs, the one or more layers, or both transmitted at a current slot n. In an implementation, the O-RU calculates a supplementary demodulation information and transfers the supplementary demodulation information along with an equalized signal stream to the O-DU. In an implementation the O-DU performs a demodulation on a signal of slot n transferred from the O-RU and a L1/L2 processing on the demodulated signal.

In an embodiment, i) a demodulation reference signal (DM-RS)-based channel estimation is performed by the O-DU in the DL and by the O-RU in the UL, ii) an equalization is performed by the O-DU in the DL and by the O-RU in the UL, and iii) demodulation is performed by the O-DU in the DL and by the O-RU in the UL. In an implementation, the O-DU transfer DM-RS information to the O-RU, the DM-RS information including DM-RS configuration parameters of the scheduled or paired UEs/layers are received by the O-RU, and the O-RU generates a DM-RS sequence using the DM-RS configuration parameters received from O-DU. In an implementation, the the O-RU estimates the UL channels of the UE(s) and/or layer(s) transmitted at a current slot n using the DM-RS information. In an implementation, the, prior to the estimation the UL channels of the UE(s) and/or layer(s) transmitted at a current slot n using the DM-RS information, the O-DU indicates ta DM-RS channel estimation method information to the O-RU. In an implementation, the O-DU transfers DM-RS channel estimation method information to the O-RU to indicate the channel estimation method. In an implementation, the O-RU equalizes the UL channels of the one or more UEs, the one or more layers, or both, transmitted at a current slot n. In an implementation, prior to a slot n, the DU transfers modulation information to the RU and the O-RU performs demodulation on an equalized signal. In an implementation, the O-DU performs a descrambling operation on the equalized signal of slot n transferred from the O-RU and a L1/L2 processing on the descrambled signal.

In an embodiment, i) the demodulation reference signal (DM-RS)-based channel estimation is performed by the O-DU in the DL and by the O-RU in the UL, ii) the equalization is performed by the O-DU in the DL and by the O-RU in the UL, and iii) demodulation is performed by the O-DU in the DL and by the O-RU in the UL.

In an embodiment, described is a method of operating an Open Radio Access Network (O-RAN) system, comprising:

providing a baseband unit (BBU) having an O-RAN centralized unit (0-CU) and an O-RAN distributed unit (O-DU);

providing an O-RAN radio unit (O-RU) remote from the BBU; and providing a fronthaul interface between the O-RU and the BBU;

wherein a functional split of O-RAN functions respectively assigned to O-RU and O-DU for the fronthaul interface between the BBU and the O-RU is different for downlink (DL) and uplink (UL), and wherein at least one of i) demodulation reference signal (DM-RS)-based channel estimation is performed by the O-DU in the DL and by the O-RU in the UL, ii) equalization is performed by the O-DU in the DL and by the O-RU in the UL, and iii) demodulation is performed by the O-DU in the DL and by the O-RU in the UL. In an implementation of the method, i) the demodulation reference signal (DM-RS)-based channel estimation is performed by the O-DU in the DL and by the O-RU in the UL, and ii) equalization is performed by the O-DU in the DL and by the O-RU in the UL. In an implementation of the method i) demodulation reference signal (DM-RS)-based channel estimation is performed by the O-DU in the DL and by the O-RU in the UL, ii) equalization is performed by the O-DU in the DL and by the O-RU in the UL, and iii) demodulation is performed by the O-DU in the DL and by the O-RU in the UL.

In an embodiment, a method of demodulation reference signal (DM-RS)-based channel estimation is performed by the O-RU in an OFDM system with N subcarriers, comprising at least one of:

a Least-Squares (LS) Channel Estimation;

a Minimum Mean-Square Error (MMSE) Channel Estimation;

a Discrete Fourier Transform (DFT) based Channel Estimation; or a Discrete Cosine Transform (DCT) based Channel Estimation, where a received signal in the frequency domain is expressed as $$Y=XH+Z$$

where Y is a received signal vector, X is a diagonal matrix where each diagonal element represents a DM-RS signal in subcarrier k, H is a channel vector, and Z is a noise vector. In an implementation, the method further comprises:

after extracting DM-RS symbols of the received DM-RS signal in the frequency domain, the LS channel estimation is:

$$H_{LS}(k_i, l_j, r_m, t_n) = \frac{Y_{RS}(k_i, l_j, r_m, t_n)}{X_{DMRS}(k_i, l_j, r_m, t_n)}$$

where $k_i$ represents a subcarrier index, $l_j$ represents a symbol index, $r_m$ is a receiver antenna index, and $t_n$ is a DM-RS transmission port index; and and de-spreading the channel estimation as:

$$\hat{H}'_{LS}(DMRS_g, r_m, t_n) = \sum_{i,j=1}^{2} \frac{H_{LS}(k_i, l_j, r_m, t_n)c_{ij}(t_n)}{L}$$

where $c_{ij}(t_n)$ represents a code in symbol i, the subcarrier j, and the DM-RS transmission port n.

In an implementation, the method further comprises:

the MMSE channel estimation being calculated as follows:

$$\hat{H}'_{MMSE}(DMRS_g(k_i, l_j), r_m, t_n) =$$

$$W(k_i, l_j; k_{i'}, l_{j'})\hat{H}'_{LS}(DMRS_g(k_{i'}, l_{j'}), r_m, t_n)$$

where $k_i$ represents a subcarrier index, $l_j$ represents a symbol index, $r_m$ is a receiver antenna index, and $t_n$ is a DM-RS transmission port index.

In an implementation, the method further comprises:

the DFT channel estimation being calculated as follows:

calculating the LS channel estimate ($\hat{H}_{LS}$) or an MMSE channel estimate as an initial estimate;

converting the LS channel estimate or MMSE channel estimate to a time domain with an IDFT operation:

$$\hat{h}_{LS}^{DFT}(n_i, l_j, r_m, t_n) = IDFT\{\hat{H}'_{LS}(k_i, l_j, r_m, t_n)\};$$

and filtering noise outside maximum delay of the channel:

$$\hat{h}_{filtered}^{DFT}(n_i, l_j, r_m, t_n) = \begin{cases} \hat{h}_{LS}^{DFT}(n_i, l_j, r_m, t_n) & 0 \leq n_i \leq w \\ 0 & \text{otherwise} \end{cases}$$

where w denotes the window length.

In an implementation, the method further comprises:

the DCT channel estimation being calculated as follows:

calculating the LS channel estimate ($\hat{H}_{LS}$) or the MMSE estimate as an initial estimate;

converting the LS or MMSE estimate to a transform domain with a DCT operation:

$$\hat{h}_{LS}^{DCT}(n_i, l_j, r_m, t_n) = DCT\{\hat{H}'_{LS}(k_i, l_j, r_m, t_n)\}$$

filtering noise outside maximum delay of the channel:

$$\hat{h}_{filtered}^{DCT}(n_i, l_j, r_m, t_n) = \begin{cases} \hat{h}_{LS}^{DCT}(n_i, l_j, r_m, t_n) & 0 \leq n_i \leq w \\ 0 & \text{otherwise} \end{cases}$$

where w denotes the window length.

BRIEF DESCRIPTION OF THE DRAWINGS

FIG. 1A illustrates the UL functional split in O-RAN split 7-2x for Cat A O-RU.

FIG. 1B illustrates the processing blocks of UL processing in ORAN split 7-2x for Cat A O-RU.

FIG. 2A illustrates the UL functional split in O-RAN split 7-2x for Cat B O-RU.

FIG. 2B illustrates the processing blocks of UL processing in ORAN split 7-2x for Cat B O-RU.

FIG. 3A illustrates an embodiment of a UL functional split of an O-RU Cat C1.

FIG. 3B illustrates an embodiment of a UL functional split of an O-RU Cat C2.

FIG. 3C illustrates an embodiment of a UL functional split of an O-RU Cat C3.

FIG. 4A is a flowchart of UL Split in O-RAN with Cat C1 O-RU.

FIG. 4B is a flowchart of UL Split in O-RAN with Cat C1 O-RU.

FIG. 4C is a flowchart of UL Split in O-RAN with Cat C1 O-RU.

FIG. 4D is a flowchart of UL Split in O-RAN with Cat C1 O-RU.

FIG. 5A illustrates an exemplary implementation of a signaling mechanism according to Embodiment 1 to enable O-RU Cat C1 a signaling mechanism.

FIG. 5B illustrates an exemplary implementation of a signaling mechanism according to Embodiment 1 to enable O-RU Cat C1 a signaling mechanism, FIG. 5C illustrates an exemplary implementation of a signaling mechanism according to Embodiment 1 to enable O-RU Cat C1 a signaling mechanism.

FIG. 5D illustrates an exemplary implementation of a signaling mechanism according to Embodiment 1 to enable O-RU Cat C1 a signaling mechanism.

FIG. 5E illustrates an exemplary implementation of a signaling mechanism according to Embodiment 1 to enable O-RU Cat C1 a signaling mechanism.

FIG. 5F illustrates an exemplary implementation of a signaling mechanism according to Embodiment 1 to enable O-RU Cat C1 a signaling mechanism.

FIG. 5G illustrates an exemplary implementation of a signaling mechanism according to Embodiment 1 to enable O-RU Cat C1 a signaling mechanism.

FIG. 5H illustrates an exemplary implementation of a signaling mechanism according to Embodiment 1 to enable O-RU Cat C1 a signaling mechanism.

FIG. 6A is a flowchart of UL Split in O-RAN with Cat C2 O-RU.

FIG. 6B is a flowchart of UL Split in O-RAN with Cat C2 O-RU.

FIG. 6C is a flowchart of UL Split in O-RAN with Cat C2 O-RU.

FIG. 7A illustrates an exemplary implementation of a signaling mechanism according to Embodiment 2 to enable O-RU Cat C2 a signaling mechanism.

FIG. 7B illustrates an exemplary implementation of a signaling mechanism according to Embodiment 2 to enable O-RU Cat C2 a signaling mechanism.

FIG. 7C illustrates an exemplary implementation of a signaling mechanism according to Embodiment 2 to enable O-RU Cat C2 a signaling mechanism.

FIG. 8A is a flowchart of UL Split in O-RAN with Cat C3 O-RU.

FIG. 8B is a flowchart of UL Split in O-RAN with Cat C3 O-RU.

FIG. 8C is a flowchart of UL Split in O-RAN with Cat C3 O-RU.

FIG. 9A illustrates an exemplary implementation of a signaling mechanism according to Embodiment 3 to enable O-RU Cat C3 a signaling mechanism.

FIG. 9B illustrates an exemplary implementation of a signaling mechanism according to Embodiment 3 to enable O-RU Cat C3 a signaling mechanism.

FIG. 9C illustrates an exemplary implementation of a signaling mechanism according to Embodiment 3 to enable O-RU Cat C3 a signaling mechanism.

FIG. 10A shows an exemplary 5G NR DM-RS structure.

FIG. 10B shows an exemplary 5G NR DM-RS structure.

FIG. 10C shows an exemplary 5G NR DM-RS structure.

FIG. 10D shows an exemplary 5G NR DM-RS structure.

FIG. 10E shows an exemplary 5G NR DM-RS structure.

FIG. 11A shows a channel estimation technique that can be applied at the O-RU.

FIG. 11B shows a channel estimation technique that can be applied at the O-RU.

FIG. 11C shows a channel estimation technique that can be applied at the O-RU.

FIG. 11D shows a channel estimation technique that can be applied at the O-RU.

FIG. 11E is a flowchart showing channel estimation techniques that can be applied at the O-RU described with respect ot FIGS. 11A-11D.

DETAILED DESCRIPTION OF THE IMPLEMENTATIONS

Implementations as described herein provide methods to enable an efficient mMIMO system for O-RAN based RANs.

FIGS. 3A, 3B, and 3C illustrate innovative embodiments of UL functional splits O-RU categories. Three different O-RU categories, namely, O-RU Cat C1, C2, and C3, are as follows:

O-RU Cat C1 (FIG. 3A): O-RU performs a first level of DM-RS channel estimation on PUSCH/PUCCH and uses the result of this channel estimation to calculate the combining/digital beamforming matrix, and after performing precoding/digital beamforming on the received signal, transfers the resulting signal to O-DU for the rest of processing.

O-RU Cat C2 (FIG. 3B): O-RU performs both DM-RS channel estimation and equalization on PUSCH/PUCCH and transfers the equalized signal stream(s) along with the supplementary demodulation information to O-DU for the rest of the processing.

O-RU Cat C3 (FIG. 3C): O-RU performs DM-RS channel estimation, equalization, and demodulation on PUSCH/PUCCH and transfers the resulting demodulated signal to O-DU for the rest of the processing.

In order to mitigate the issues of UL 7-2x, an asymmetrical functional split between DL and UL is proposed. The DL processing follows the O-RAN split 7-2x (either Cat A or Cat B) to balance the tradeoff between O-RU complexity and fronthaul throughput, where the UL processing follows a new split architecture. Three different UL functional splits corresponding to three different innovative O-RU categories are summarized in Table 1.

TABLE 1

A summary of possible options for DL and UL functional splits

| DL | UL | Brief Description |
|---|---|---|
| Cat A | Cat C1 | O-RU performs "DM-RS based Channel Estimation" in the UL. |
| Cat A | Cat C2 | O-RU performs "DM-RS based Channel Estimation" and "Equalization" in the UL. |
| Cat A | Cat C3 | O-RU performs "DM-RS based Channel Estimation", "Equalization", and "Demodulation" in the UL. |
| Cat B | Cat C1 | O-RU performs "DM-RS based Channel Estimation" in the UL. |
| Cat B | Cat C2 | O-RU performs "DM-RS based Channel Estimation" and "Equalization" in the UL. |
| Cat B | Cat C3 | O-RU performs "DM-RS based Channel Estimation", "Equalization", and "Demodulation" in the UL. |

The following describes detailed processing steps for UL functional splits with O-RU Cat C1, O-RU Cat C2, O-RU Cat C3.

Embodiment 1: Processing Steps for UL Functional Split with O-RU Cat C1

Embodiment 1 describes the processing steps for UL functional split with O-RU Cat C1, in which O-RU performs a "DM-RS based Channel Estimation" in the UL. FIGS. 4A, 4B, 4C, and 4D are flowcharts of UL Split in O-RAN with Cat C1 O-RU.

As shown in FIGS. 4A, 4B, 4C and 4D, in this embodiment, O-RU performs the following steps to process the received signal:

As shown in FIG. 4A, at 1-1), prior to slot n, O-DU transfers "DM-RS information" to O-RU so that O-RU can obtain the DM-RS signal and perform channel estimation. Some options for the "DM-RS information" are as follows:

Option 1-1-A: "DM-RS configuration parameters" of the scheduled or paired UEs/layers. O-RU generates the "DM-RS sequence" using the "DM-RS configuration parameters" received from O-DU. The "DM-RS configuration parameters" are summarized in Table 4. Also, the details of the "DM-RS sequence" generation and mapping using the "DM-RS configuration parameters" are provided below under section Embodiment 6: 5G NR DM-RS.

Option 1-1-B: "DM-RS sequence" of the scheduled or paired UEs/layers.

As shown in FIG. 4A, at 1-2 (Optional) Prior to slot n, O-DU transfers the "DM-RS channel estimation method information" to O-RU to indicate the "channel estimation method" and possibly "details of the indicated channel estimation method". Exemplary channel estimation methods are listed below:

Least-squares (LS) channel estimation

Minimum mean-squared error (MMSE) channel estimation

Discrete Fourier transform (DFT) based channel estimation

Discrete cosine transform (DCT) based channel estimation

The above channel estimation methods are described in more detail in Embodiment 7: Channel Estimation. The "details of the indicated channel estimation method" depends on the indicated channel estimation method and may include any of the following:

RMS delay spread of the channel ($\tau_{RMS}$)

Maximum Doppler spread of the channel ($\Delta f_{max}$)

Initial SINR estimation ($SINR_0$)

MMSE matrix elements

Channel Estimation granularity in the frequency domain

Window type

Window size

Indication of the "channel estimation method" and/or "details of the indicated channel estimation method" can be done based on one of the following options:

Option 1-2-A: O-DU indicates the "channel estimation method" to the O-RU using a particular bitfield in the signaling from O-DU to O-RU. O-RU determines the channel estimation details, including parameters and processing steps based on its own implementation. An example of a mapping between the bitfield content and corresponding channel estimation methods is provided in Table 5.

Option 1-2-B: O-DU indicates "channel estimation method" and "details of the indicated channel estimation method" to the O-RU using particular bitfields in the signaling from O-DU to O-RU. O-RU uses a table, such as Table 5, to find the channel estimation method and uses other look-up tables, such as Table 6 to Table 9, to obtain the channel estimation details using these indications from O-DU. A summary of channel estimation methods and their corresponding look-up table(s) is provided in Table 10.

Option 1-2-C: O-DU provides "partial channel estimation details" to O-RU, using which O-RU calculates full channel estimation details. In this option, the "DM-RS channel estimation method information" includes the channel estimation method and its partial details as listed in Table 11 to Table 14. O-RU calculates the channel estimation details, such as MMSE matrix, CE granularity in the frequency-domain, and window size, based on the channel estimation method and its received details from O-DU. The details of these channel estimation calculations can be found in Embodiment 7: Channel Estimation.

Option 1-2-D: O-DU provides "full channel estimation details" to O-RU. In this option, the "DM-RS channel estimation method information" includes the channel estimation method and its full details as listed in Table 15. O-DU transfers the channel estimation details by either indicating bits in a bitfield for a particular parameter or directly transferring IQ/integer values of relevant parameters to O-RU.

As shown in FIG. 4B, at 1-3 (Optional) O-DU transfers "combining/digital beamforming matrix enhancement information" to O-RU prior to slot n. This information improves the quality of the combining/digital beamforming matrix when it is calculated by the O-RU. Some options for the "combining/digital beamforming matrix enhancement information" are as follows:

Option 1-3-A: "Combining/digital beamforming matrix enhancement information" includes SRS channel estimates of the scheduled or paired UEs/layers. Later in Step 1-6, O-RU combines SRS and DM-RS channel estimates using weighting coefficients. Options for the weighting coefficients of Option1-3-A:

Option 1-3-A-1: O-RU either uses pre-configured weighting coefficients or determines the weighting coefficients based on other parameters.

Option 1-3-A-2: O-DU provides the weighting coefficients to O-RU as part of "combining/digital beamforming matrix enhancement information".

Option 1-3-B: "Combining/digital beamforming matrix enhancement information" includes preliminary combining/digital beamforming matrix elements corresponding to the scheduled or paired UEs/layers. This preliminary combining/digital beamforming matrix is calculated at O-DU prior to slot n using SRS channel estimates. Later in Step 1-6, O-RU combines its own calculated combining/digital beamforming matrix elements with the preliminary combining/digital beamforming matrix using weighting coefficients. Options for the weighting coefficients of Option1-3-B:

Option 1-3-B-1: O-RU either uses pre-configured weighting coefficients or determines the weighting coefficients based on other parameters.

Option 1-3-B-2: O-DU provides the weighting coefficients to O-RU as part of "combining/digital beamforming matrix enhancement information".

As shown in FIG. 4B, at 1-4 O-RU estimates the UL channels of the UE(s) and/or layer(s) transmitted at the current slot n using the "DM-RS information" obtained in Step 1-1. Depending on whether the optional Step 1-2 is executed, one of the following options are taken by O-RU regarding the channel estimation method and its details:

Option 1-4-A: (Step 1-2 is not executed): O-RU uses a pre-configured channel estimation method and its details.

Option 1-4-B: (Step 1-2 is executed): O-RU uses "DM-RS channel estimation method information" provided by O-DU to obtain the channel estimation method and its details.

As shown in FIG. 4C, at 1-5 (Optional) O-DU indicates "combining/digital beamforming matrix calculation method" to O-RU. Some examples for the combining/digital beamforming matrix calculation method are as follows:

Conjugate combining

Zero forcing

MMSE

MMSE-IRC

Null-space dimension increase based

DFT-compression

An example of a mapping between the bitfield contents and corresponding combining/digital beamforming matrix calculation methods is provided in Table 16.

As shown in FIG. 4C, at 1-6 O-RU calculates the "combining/digital beamforming matrix" either based on the calculation method provided by O-DU in Step 1-5 (if Step 1-5 is executed) or based on a pre-configured method (if Step 1-5 is not executed). Depending on whether the optional Step 1-3 is executed, one of the following options are taken by O-RU:

Option 1-6-A (Step 1-3 is not executed): O-RU calculates the "combining/digital beamforming matrix" based on the estimated DM-RS channel(s).

Option 1-6-B (Step 1-3 with Option 1-3-A is executed): O-RU combines SRS channel estimates provided by O-DU with its own estimated DM-RS channel estimates using weighting coefficients. O-RU calculates the "combining/digital beamforming matrix" based on the combined DM-RS and SRS channel estimates.

Option 1-6-C(Step 1-3 with Option 1-3-B is executed): O-RU calculates the "combining/digital beamforming matrix" based on the estimated DM-RS channel(s), and using weighting coefficients, combines it with the SRS-based preliminary combining/digital beamforming matrix received from O-DU.

As shown in FIG. 4D, at 1-7, O-RU applies the calculated "combining/digital beamforming matrix" to the received signal in slot n and transfers the resulting signal to O-DU through the fronthaul link.

As shown in FIG. 4D, at 1-8, O-DU performs DM-RS channel estimation on the signal of slot n transferred from O-RU and subsequently performs UL MIMO processing by equalizing the channel using the estimated channel (with optional inter-cell interference rejection). Afterward, O-DU performs the rest of L1/L2 processing on the resulting signal.

FIGS. 5A, 5B, 5C, 5D, 5E, 5F, 5G, and 5H illustrate different variations of Embodiment 1 to enable O-RU Cat C1 through different signaling mechanisms.

Depending on the type of information provided by O-DU to O-RU, different implementations are described, as illustrated in FIGS. 5A to 5H and summarized in table 2

TABLE 2

| Implementations from embodiment 1 | | |
|---|---|---|
| Embodiment # | Executed steps from Embodiment 1 | Block diagram |
| 1-A | (1-1), (1-4), (1-6), (1-7), (1-8) | FIG. 5A |
| 1-B | (1-1), (1-4), (1-5), (1-6), (1-7), (1-8) | FIG. 5B |
| 1-C | (1-1), (1-2), (1-4), (1-6), (1-7), (1-8) | FIG. 5C |
| 1-D | (1-1), (1-2), (1-4), (1-5), (1-6), (1-7), (1-8) | FIG. 5D |
| 1-E | (1-1), (1-3), (1-4), (1-6), (1-7), (1-8) | FIG. 5E |
| 1-F | (1-1), (1-3), (1-4), (1-5), (1-6), (1-7), (1-8) | FIG. 5F |
| 1-G | (1-1), (1-2), (1-3), (1-4), (1-6), (1-7), (1-8) | FIG. 5G |
| 1-H | (1-1), (1-2), (1-3), (1-4), (1-5), (1-6), (1-7), (1-8) | FIG. 5H |

Embodiment 2: Processing Steps for UL Functional Split with O-RU Cat C2

Embodiment 2 describes the processing steps for UL functional split with O-RU Cat C2, in which O-RU performs the "DM-RS based Channel Estimation" and "Equalization" in the UL. FIGS. 6A, 6B, and 6C present a flowchart of UL Split in O-RAN with Cat C2 O-RU.

As shown in FIGS. 6A, 6B, and 6C, in this embodiment, O-RU performs the following steps to process the received signal:

As shown in FIG. 6A, at 2-1 (Mandatory) Prior to slot n, O-DU transfers "DM-RS information" to O-RU so that O-RU can obtain the DM-RS signal and perform channel estimation. Some options for the "DM-RS information" are as follows:

Option 2-1-A: "DM-RS configuration parameters" of the scheduled or paired UEs/layers. O-RU generates the "DM-RS sequence" using the "DM-RS configuration parameters" received from O-DU. These "DM-RS configuration parameters" are summarized in Table 4. Also, the details of the "DM-RS sequence" generation and mapping using the "DM-RS configuration parameters" are provided in Embodiment 6: 5G NR DM-RS.

Option 2-1-B: "DM-RS sequence" of the scheduled or paired UEs/layers.

As shown in FIG. 6A, at 2-2 (Optional) prior to slot n, O-DU transfers the "DM-RS channel estimation method information" to O-RU to indicate the "channel estimation method" and possibly "details of the indicated channel estimation method". Exemplary channel estimation methods are listed below:

Least-squares (LS) channel estimation
Minimum mean-squared error (MMSE) channel estimation
Discrete Fourier transform (DFT) based channel estimation
Discrete cosine transform (DCT) based channel estimation The details of the above channel estimation methods are described in Embodiment 7: Channel Estimation below. The "details of the indicated channel estimation method" depends on the indicated channel estimation method and may include any of the following:

RMS delay spread of the channel ($\tau_{RMS}$)
Maximum Doppler spread of the channel ($\Delta f_{max}$)
Initial SINR estimation ($SINR_0$)
MMSE matrix elements
Channel Estimation granularity in the frequency domain
Window type
Window size Indication of the "channel estimation method" and/or "details of the indicated channel estimation method" can be done based on one of the following options:

Option 2-2-A: O-DU indicates the "channel estimation method" to the O-RU using a particular bitfield in the signaling from O-DU to O-RU. O-RU determines the channel estimation details, including parameters and processing steps based on its own implementation. An example of a mapping between the bitfield content and corresponding channel estimation methods is provided in Table 5.

Option 2-2-B: O-DU indicates "channel estimation method" and "details of the indicated channel estimation method" to the O-RU using particular bitfields in the signaling from O-DU to O-RU. O-RU uses a table, such as Table 5, to find the channel estimation method and uses other look-up tables, such as Table 6 to Table 9, to obtain the channel estimation details using these indications from O-DU. A summary of channel estimation methods and their corresponding look-up table(s) is provided in Table 10.

Option 2-2-C: O-DU provides "partial channel estimation details" to O-RU, using which O-RU calculates full channel estimation details. In this option, the "DM-RS channel estimation method information" includes the channel estimation method and its partial details as listed in Table 11 to Table 14. O-RU calculates the channel estimation details, such as MMSE matrix, CE granularity in the frequency-domain, and window size, based on the channel estimation method and its received details from O-DU. The details of these channel estimation calculations can be found in Embodiment 7: Channel Estimation.

Option 2-2-D: O-DU provides "full channel estimation details" to O-RU. In this option, the "DM-RS channel estimation method information" includes the channel estimation method and its full details as listed in Table 15. O-DU transfers the channel estimation details by either indicating bits in a bitfield for a particular parameter or directly transferring IQ/integer values of relevant parameters to O-RU.

As shown in FIG. 6B, at 2-3 O-RU estimates the UL channels of the UE(s) and/or layer(s) transmitted at the current slot n using the "DM-RS information" obtained in Step 2-1. Depending on whether the optional Step 2-2 is executed, one of the following options are taken by O-RU regarding the channel estimation method and its details:

Option 2-3-A: (Step 2-2 is not executed): O-RU uses a pre-configured channel estimation method and its details.

Option 2-3-B: (Step 1-2 is executed): O-RU uses "DM-RS channel estimation method information" provided by O-DU to obtain the channel estimation method and its details.

As shown in FIG. 6B, at 2-4 (Optional) prior to slot n, O-DU transfers the "channel equalization information" to O-RU to indicate the "channel equalization method" and possibly further details of the channel equalization procedure through the "additional channel equalization information". Exemplary channel equalization methods are listed below:

ZF

MMSE

MMSE-IRC

The details of the channel equalization are described in Embodiment 8: Channel Equalization below. The "additional channel equalization information" of the demodulation procedure during the log-likelihood ratio (LLR) calculation can be provided in several ways. Based on the indicated "additional channel equalization information", which may be a part of the "channel equalization information", the supplementary demodulation information is calculated. Exemplary "additional channel equalization information" options are listed below:

Equalization Gain and Post-processed Noise plus Interference Power

Post-processed Noise plus Interference Power divided by Equalization Gain

Equalization Gain divided by Post-processed Noise plus Interference Power

Equalization Gain

Post-processed Noise plus Interference Power

Channel Estimates and Estimated DM-RS Noise plus Interference Power

Indication of the "channel equalization method" and "additional channel equalization information" can be done based on selecting one or both of the following options below:

Option 2-4-A: O-DU indicates the "channel equalization method" to the O-RU using a particular bitfield in the signaling from O-DU to O-RU. An example of a mapping between the bitfield content and corresponding channel equalization methods is provided in Table 17.

Option 2-4-B: O-DU indicates "additional channel equalization information" to the O-RU using particular bitfields in the signaling from O-DU to O-RU. Examples of mapping between the bitfield content and corresponding "additional channel equalization information", which determines the "supplementary demodulation information" calculation method, are provided in Table 18 and Table 19.

As shown in FIG. 6B, at 2-5 (Mandatory) O-RU equalizes the UL channels of the UE(s) and/or layer(s) transmitted at the current slot n. Depending on whether the optional Step 2-4-A is executed, one of the following options are taken by O-RU regarding the "channel equalization method information":

Option 2-5-A: (Step 2-4-A is not executed): O-RU uses a pre-configured channel equalization method and its details.

Option 2-5-B: (Step 2-4-A is executed): O-RU uses "channel equalization method information" provided by O-DU to obtain the channel equalization method and its details.

As shown in FIG. 6C, at 2-6 O-RU calculates the "supplementary demodulation information" and transfers it along with the equalized signal stream(s) to O-DU through the fronthaul link. Depending on whether the optional 2-4-B is executed, one of the following options are taken by O-RU regarding the "additional channel equalization information":

Option 2-6-A: (Step 2-4-B is not executed): O-RU uses a pre-configured "supplementary demodulation information" calculation method.

Option 2-6-B: (Step 2-4-B is executed): O-RU uses the "supplementary demodulation information" calculation method provided by O-DU.

As shown in FIG. 6C, at 2-7 O-DU performs demodulation on the signal of slot n transferred from O-RU and subsequently performs the rest of L1/L2 processing on the resulting signal.

FIGS. 7A, 7B, and 7C illustrate different variations of Embodiment 2 to enable O-RU Cat C2 through different signaling mechanisms, as summarized Table 2.

TABLE 3

Summary of selected embodiments from embodiment 2

| Embodiment # | Executed steps from Embodiment 2 | Block diagram |
|---|---|---|
| 2-A | (2-1), (2-3), (2-5), (2-6), (2-7) | FIG. 7A |
| 2-B | (2-1), (2-2), (2-3), (2-5), (2-6), (2-7) | FIG. 7B |
| 2-C | (2-1), (2-2), (2-3), (2-4), (2-5), (2-6), (2-7) | FIG. 7C |

Embodiment 3: Processing Steps for UL Functional Split with O-RU Cat C3

Embodiment 3 describes the processing steps for UL functional split with O-RU Cat C3, in which O-RU performs the "DM-RS based Channel Estimation", "Equalization", and "Demodulation" in the UL. FIGS. 8A, 8B, and 8C are a flowchart of UL Split in O-RAN with Cat C3 O-RU.

In this embodiment, O-RU performs the following steps to process the received signal:

As shown in FIG. 8A, at 3-1, prior to slot n, O-DU transfers "DM-RS information" to O-RU so that O-RU can obtain the DM-RS signal and perform channel estimation. Some options for the "DM-RS information" are as follows:

Option 3-1-A: "DM-RS configuration parameters" of the scheduled or paired UEs/layers. O-RU generates the "DM-RS sequence" using the "DM-RS configuration parameters" received from O-DU. These "DM-RS configuration parameters" are summarized in Table 4. Also, the details of the "DM-RS sequence" generation and mapping using the "DM-RS configuration parameters" are provided in Embodiment 6: 5G NR DM-RS.

Option 3-1-B: "DM-RS sequence" of the scheduled or paired UEs/layers.

As shown in FIG. 8A, at 3-2 (Optional) Prior to slot n, O-DU transfers the "DM-RS channel estimation method information" to O-RU to indicate the "channel estimation method" and possibly "details of the indicated channel estimation method". Exemplary channel estimation methods are listed below:

Least-squares (LS) channel estimation

Minimum mean-squared error (MMSE) channel estimation

Discrete Fourier transform (DFT) based channel estimation

Discrete cosine transform (DCT) based channel estimation

The details of the above channel estimation methods are described in Embodiment 7: Channel Estimation. The "details of the indicated channel estimation method" depends on the indicated channel estimation method and may include any of the following:

RMS delay spread of the channel ($\tau_{RMS}$)

Maximum Doppler spread of the channel ($\Delta f_{max}$)

Initial SINR estimation ($SINR_0$)

MMSE matrix elements

Channel Estimation granularity in the frequency domain

Window type

Window size

Indication of the "channel estimation method" and/or "details of the indicated channel estimation method" can be done based on one of the following options:

Option 3-2-A: O-DU indicates the "channel estimation method" to the O-RU using a particular bitfield in the signaling from O-DU to O-RU. O-RU determines the channel estimation details, including parameters and processing steps based on its own implementation. An example of a mapping between the bitfield content and corresponding channel estimation methods is provided in Table 5.

Option 3-2-B: O-DU indicates "channel estimation method" and "details of the indicated channel estimation method" to the O-RU using particular bitfields in the signaling from O-DU to O-RU. O-RU uses a table, such as Table 5, to find the channel estimation method and uses other look-up tables, such as Table 6 to Table 9, to obtain the channel estimation details using these indications from O-DU. A summary of channel estimation methods and their corresponding look-up table(s) is provided in Table 10.

Option 3-2-C: O-DU provides "partial channel estimation details" to O-RU, using which O-RU calculates full channel estimation details. In this option, the "DM-RS channel estimation method information" includes the channel estimation method and its partial details as listed in Table 11 to Table 14. O-RU calculates the channel estimation details, such as MMSE matrix, CE granularity in the frequency-domain, and window size, based on the channel estimation method and its received details from O-DU. The details of these channel estimation calculations can be found in Embodiment 7: Channel Estimation.

Option 3-2-D: O-DU provides "full channel estimation details" to O-RU. In this option, the "DM-RS channel estimation method information" includes the channel estimation method and its full details as listed in Table 15. O-DU transfers the channel estimation details by either indicating bits in a bitfield for a particular parameter or directly transferring IQ/integer values of relevant parameters to O-RU.

As shown in FIG. 8B, at 3-3 (Mandatory) O-RU estimates the UL channels of the UE(s) and/or layer(s) transmitted at the current slot n using the "DM-RS information" obtained in Step 3-1. Depending on whether the optional Step 3-2 is executed, one of the following options are taken by O-RU regarding the channel estimation method and its details:

Option 3-3-A: (Step 3-2 is not executed): O-RU uses a pre-configured channel estimation method and its details.

Option 3-3-B: (Step 3-2 is executed): O-RU uses "DM-RS channel estimation method information" provided by O-DU to obtain the channel estimation method and its details.

As shown in FIG. 8B, at 3-4 (Optional) Prior to slot n, O-DU transfers the "channel equalization method information" to O-RU to indicate the type and, possibly, further details of the channel equalization method to be adopted by O-RU. In the following, "channel equalization method" may refer to any of the following example channel equalization techniques:

ZF

MMSE

MMSE-IRC

An example of a mapping between the bitfield contents and the corresponding channel equalization method is provided in Table 17.

As shown in FIG. 8B, at 3-5 (Mandatory) O-RU equalizes the UL channels of the UE(s) and/or layer(s) transmitted at the current slot n. Depending on whether the optional Step 3-4 is executed, one of the following options are taken by O-RU regarding the "channel equalization method information":

Option 3-5-A: (Step 3-4 is not executed): O-RU uses a pre-configured channel equalization method and its details.

Option 3-5-B: (Step 3-4 is executed): O-RU uses "channel equalization method information" provided by O-DU to obtain the channel equalization method and its details.

As shown in FIG. 8C, at 3-6 (Mandatory) Prior to slot n, O-DU transfers "modulation information" to O-RU. Afterward, O-RU performs demodulation on the equalized signal in Step 3-5 during slot n and transfers the resulting signal to O-DU through the fronthaul link.

As shown in FIG. 8C, at 3-7 (Mandatory) O-DU performs descrambling on the signal of slot n transferred from O-RU and subsequently performs the rest of L1/L2 processing on the resulting signal.

FIGS. 9A, 9B, and 9C illustrate different variations of Embodiment 3 to enable O-RU Cat C3 through different signaling mechanisms, as shown in Table 4.

TABLE 4

Summary of selected embodiments from embodiment 3

| Embodiment # | Executed steps from Embodiment 2 | Block diagram |
|---|---|---|
| 3-A | (3-1), (3-3), (3-5), (3-6), (3-7) | FIG. 9A |
| 3-B | (3-1), (3-2), (3-3), (3-5), (3-6), (3-7) | FIG. 9B |
| 3-C | (3-1), (3-2), (3-3), (3-4), (3-5), (3-6), (3-7) | FIG. 9C |

Embodiment 4: Example Tables for the Signaling Mechanisms that Enables Asymmetrical Functional Splits FIGS. 10A, 10B, 10C, 10D, and 10E clarify the 5G NR DM-RS structures with examples for a better understanding. Example Tables 5-20 show exemplary parameters for the signaling mechanisms that enables asymmetrical functional splits as shown in FIGS. 10A, 10B, 10C, 10D, and 10E.

TABLE 4

DM-RS configuration parameters

| Purpose | Parameter | Brief Description | Value Range |
|---|---|---|---|
| Waveform Selection | Transform-Precoding | Enable/ disable transform precoding | {0, 1} |
| DMRS Sequence Generation | $N_{ID}^{n_{SCID}}$ | DMRS Scrambling Identity (for CP-OFDM) | {0, 1, . . . , 65535} |
| | $n_{SCID}$ | DMRS Scrambling Initialization | {0, 1} |
| | $N_{symb}^{slot}$ | Number of OFDM Symbols in a Slot | {12, 14} |
| | $n_{s,f}^{\mu}$ | Slot Number in a Radio Frame | {0, . . . , 159} |
| | l | Symbol Number | {0, 1, . . . , 13} |

TABLE 4-continued

| DM-RS configuration parameters | | | |
|---|---|---|---|
| Purpose | Parameter | Brief Description | Value Range |
| | | within a Slot | |
| | $n_{ID}^{RS}$ | DM-RS Scrambling Identity (for DFT-s-OFDM) | {0, 1, . . . , 65535} |
| | dmrsGH | Group Hopping | {0, 1} |
| | dmrsSH | Sequence Hopping | {0, 1} |
| DMRS Con-figuration | dmrs-Type | DMRS Con-figuration Type | {1, 2} |
| | maxLength | Single Symbol or Double Symbol | {1, 2} |
| | dmrs-TypeA-Position | DMRS Start Pos for Type A | {pos2, pos3} |
| | dmrs-Additional-Position | Additional DMRS Position | {0, 1, 2, 3} |
| | $\bar{p}$ | Antenna Port Index | {0, 1, . . . , 11} |

TABLE 5

An example look-up table for the channel estimation methods

| Bitfield | Channel estimation method |
|---|---|
| 00 | LS |
| 01 | MMSE |
| 10 | DFT based |
| 11 | DCT based |

TABLE 6

An example look-up table for MMSE channel estimation matrix elements.

| Bitfield | MMSE matrix |
|---|---|
| 000 | $\phi_1$ |
| 001 | $\phi_2$ |
| 010 | $\phi_3$ |
| 011 | $\phi_4$ |
| 100 | $\phi_5$ |
| 101 | $\phi_6$ |
| 110 | $\phi_7$ |
| 111 | $\phi_8$ |

TABLE 7

An example look-up table for the channel estimation granularity in the frequency domain.

| Bitfield | CE Granularity in the Frequency Domain [RBs] |
|---|---|
| 00 | $N_1$ |
| 01 | $N_2$ |

TABLE 7-continued

An example look-up table for the channel estimation granularity in the frequency domain.

| Bitfield | CE Granularity in the Frequency Domain [RBs] |
|---|---|
| 10 | $N_3$ |
| 11 | $N_4$ |

TABLE 8

An example look-up table for window type.

| Bitfield | Window type |
|---|---|
| 00 | Type 1 |
| 01 | Type 2 |
| 10 | Type 3 |
| 11 | Type 4 |

TABLE 9

An example look-up table for window size.

| Bitfield | Window size |
|---|---|
| 00 | Window size 1 |
| 01 | Window size 2 |
| 10 | Window size 3 |
| 11 | Window size 4 |

TABLE 10

Summary of relevant look-up tables for channel estimation.

| Channel estimation method | Relevant look-up table(s) |
|---|---|
| LS | Table 5, Table 7 |
| MMSE | Table 5, Table 6, Table 7 |
| DFT based | Table 5, Table 7, Table 8, Table 9 |
| DCT based | Table 5, Table 7, Table 8, Table 9 |

TABLE 11

A summary of channel estimation methods and their corresponding details for option 1-2-C (Example-1).

| Channel estimation method | CE Granularity in the Frequency Domain (Integer Values for #RBs) | $SINR_0$ (IQ Values) | $\tau_{RMS}$ (IQ Values) | $\Delta f_{max}$ (IQ Values) | Window type (Indicator for a row in a table) | Window size (Integer Values) |
|---|---|---|---|---|---|---|
| LS | ü | — | — | — | — | — |
| MMSE | ü | ü | ü | ü | — | — |
| DFT based | ü | — | — | — | ü | ü |
| DCT based | ü | — | — | — | ü | ü |

TABLE 12

A summary of channel estimation methods and their corresponding details for option 1-2-C (Example-2).

| Channel estimation method | $SINR_0$ (IQ Values) | $\tau_{RMS}$ (IQ Values) | $\Delta f_{max}$ (IQ Values) | Window type (Indicator for a row in a table) | Window size (Integer Values) |
|---|---|---|---|---|---|
| LS | — | ü | — | — | — |
| MMSE | ü | ü | ü | — | — |
| DFT based | — | ü | — | ü | ü |
| DCT based | — | ü | — | ü | ü |

TABLE 13

A summary of channel estimation methods and their corresponding details for option 1-2-C (Example-3).

| Channel estimation method | $SINR_0$ (IQ Values) | $\tau_{RMS}$ (IQ Values) | $\Delta f_{max}$ (IQ Values) |
|---|---|---|---|
| LS | — | ü | — |
| MMSE | ü | ü | ü |
| DFT based | — | ü | — |
| DCT based | — | ü | — |

TABLE 14

A summary of channel estimation methods and their corresponding details for option 1-2-C (Example-4).

| Channel estimation method | $\tau_{RMS}$ (IQ Values) | $\Delta f_{max}$ (IQ Values) |
|---|---|---|
| LS | ü | — |
| MMSE | ü | ü |
| DFT based | ü | — |
| DCT based | ü | — |

TABLE 15

A summary of channel estimation methods and their corresponding details for option 1-2-D.

| Channel estimation method | CE Granularity in the Frequency Domain (Integer Values for #RBs) | MMSE matrix (IQ Values) | Window type (Indicator for a row in a table) | Window size (Integer Values) |
|---|---|---|---|---|
| LS | ü | — | — | — |
| MMSE | ü | ü | — | — |
| DFT based | ü | — | ü | ü |
| DCT based | ü | — | ü | ü |

TABLE 16

An example look-up table for the combining/ digital beamforming matrix calculation methods

| Bitfield | Combining/digital beamforming matrix calculation method |
|---|---|
| 000 | Conjugate combining |
| 001 | Zero forcing |
| 010 | MMSE |
| 011 | MMSE-IRC |
| 100 | Null-space dimension increase based |
| 101 | DFT-compression |

TABLE 17

An example look-up table for the channel equalization methods

| Bitfield | Channel equalization method |
|---|---|
| 00 | Zero forcing |
| 01 | MMSE |
| 10 | MMSE-IRC |

TABLE 18

An example look-up table for the additional channel equalization information

| Bitfield | Supplementary Demodulation Information Calculation Method |
|---|---|
| 000 | Equalization Gain and Post-processed Noise plus Interference Power |
| 001 | Post-processed Noise plus Interference Power divided by Equalization Gain |
| 010 | Equalization Gain divided by Post-processed Noise plus Interference Power |

TABLE 18-continued

An example look-up table for the additional
channel equalization information

| Bitfield | Supplementary Demodulation Information Calculation Method |
|---|---|
| 011 | Equalization Gain |
| 100 | Post-processed Noise plus Interference Power |
| 101 | Channel Estimates and Estimated DM-RS Noise plus Interference Power |

TABLE 19

Another example look-up table for the additional
channel equalization information

| Bitfield | Supplementary Demodulation Information Calculation Method |
|---|---|
| 00 | Equalization Gain and Post-processed Noise plus Interference Power |
| 01 | Post-processed Noise plus Interference Power divided by Equalization Gain |

TABLE 19-continued

Another example look-up table for the additional
channel equalization information

| Bitfield | Supplementary Demodulation Information Calculation Method |
|---|---|
| 10 | Equalization Gain |
| 11 | Post-processed Noise plus Interference Power |

Embodiment 5: C-Plane and M-Plane Messages for the UL Functional Splits with O-RU Cat C1, O-RU Cat C2, O-RU Cat C3

M-plane embodiments for the O-RU to report its capabilities about the supported O-RU categories In one embodiment, the O-RU exposes its ability to support category C1, category C2, or category C3 to the SMO or the O-RU controller in the O-RAN module-cap.yang. One example of the RU-supported-category leaf under the RU-capabilities structure in the O-RAN-module-cap.yang can be shown as follows:

```
grouping ru-capabilities {
    description
        "Structure representing set of capabilities.";
    leaf ru-supported-category {
        type enumeration {
            enum CAT_A {
                description
                    "Informs that precoding is not supported in O-RU";
            }
            enum CAT_B {
                description
                    "Informs that precoding is supported in O-RU";
            }
            enum CAT_A_C1 {
                description
                    "Informs that precoding is not supported in O-RU for DL and DM-RS based
channel estimation is supported in the O-RU for UL";
            }
            enum CAT_A_C2 {
                description
                    "Informs that precoding is not supported in O-RU for DL and DM-RS based
channel estimation and equalization are supported in the O-RU for UL";
            }
            enum CAT_A_C3 {
                description
                    "Informs that precoding is not supported in O-RU for DL and DM-RS based
channel estimation, equalization, and demodulation are supported in the O-RU for
UL";
            }
            enum CAT_B_C1 {
                description
                    "Informs that precoding is supported in O-RU for DL and DM-RS based
channel estimation is supported in the O-RU for UL";
            }
            enum CAT_B_C2 {
                description
                    "Informs that precoding is supported in O-RU for DL and DM-RS based
channel estimation and equalization are supported in the O-RU for UL";
            }
            enum CAT_B_C3 {
                description
                    "Informs that precoding is supported in O-RU for DL and DM-RS based
channel estimation, equalization, and demodulation are supported in the O-RU for
UL";
            }
        }
        description
            "Informs about which category O-RU supports";
    }
}
```

M-Plane Embodiments to Cover DM-RS Based Channel Estimation Features Support at the O-RU The O-RU exposes its ability to support DM-RS-based channel estimation locally and the dependent features by supporting of the feature DMRS-BASED-CHANNEL-ES-TIMATION-SUPPORTED in o-ran-module-cap.yang module.

```
feature    DMRS-BASED-CHANNEL-ESTIMATION-
    SUPPORTED {
    Description
        "This is used to indicate O-RU's support for
            demodulation reference signal (DMRS)-based
            channel estimation.";
}
```

If feature DMRS-BASED-CHANNEL-ESTIMATION-SUPPORTED is true, the O-RU reports its support for the following dependent features:

```
dmrs-based-channel-estimation-configuration-type
    static-dmrs-based-channel-estimation-configura-
        tion-type
    dynamic-dmrs-based-channel-estimation-configura-
        tion-type
dmrs-generation-method
    dmrs-local-generation
    dmrs-sequence-reception
dmrs-channel-estimation-technique
    ls-channel-estimation
    mmse-channel-estimation
    dft-channel-estimation
    dct-channel-estimation
dmrs-channel-estimation-fh-method
    static-channel-estimation-type-only-indication-
        method
    static-full-id-based-channel-estimation-method
    real-time-channel-estimation-method
    partial-real-time-channel-estimation-method
combining-digital-bf-matrix-enhancement-information
    srs-channel-estimates
        weighting-coefficients-local-generation
        weighting-coefficients-reception
    preliminary-combining-digital-bf-matrix
        weighting-coefficients-local-generation
        weighting-coefficients-reception
combining-matrix-calculation-method
    conjugate-combining
    zero-forcing
    dft-compression
    null-space-dimension-increase-based
    mmse-irc-based
```

M-Plane Embodiments to Cover DM-RS Based Channel Estimation Features Support at the O-RU One example implementation in the o-ran-module-cap.yang can be described as follows.

```
grouping dmrs-based-channel-estimation-features {
    description
        "O-RU's capabilities related to supported DMRS-
            based channel estimation";
        container dmrs-base d-channel-estimation-con-
            figuration-type {
        description
            "O-RU's capabilities related to DMRS-based
                channel estimation configuration type.";
            leaf static-dmrs-based-channel-estimation-con-
                figuration-type {
            type boolean;
            description
```

```
            "O-RU supports static configurations, via
                M-plane, for the DMRS-based channel estima-
                tion parameters.";
            }
            leaf dynamic-dmrs-based-channel-estimation-
                configuration-type{
            type boolean;
            description
            "O-RU supports real-time configurations, via
                C-plane, for the DMRS-based channel estima-
                tion parameters.";
            }
        }
container dmrs-generation-method {
description
"O-RU's capabilities related to DMRS signal gen-
    eration. O-DU transfers DM-RS information to
    O-RU so that O-RU can obtain DM-RS signal
    and perform channel estimation";
    leaf dmrs-local-generation {
    type boolean;
    description
    "O-RU supports reception of the DM-RS con-
        figuration parameters of the scheduled or paired
        UEs/layers. O-RU supports local generation of
        the DM-RS sequence using the DM-RS con-
        figuration parameters received from O-DU.
"}
    }
    leaf dmrs-sequence-reception {
    type boolean;
    description
    "O-RU supports DMRS sequence reception
        from O-DU.";
    }
}
container dmrs-channel-estimation-technique {
description
"O-RU's capabilities related to supported channel
    estimation techniques";
    leaf ls-channel-estimation {
    type boolean;
    description
    "Least-squares (LS) channel estimation";
    }
    leaf mmse-channel-estimation {
    type boolean;
    description
    "Minimum mean-squared error (MMSE) chan-
        nel estimation";
    }
    leaf dft-channel-estimation {
    type boolean;
    description
    "Discrete Fourier transform (DFT) based chan-
        nel estimation";
    }
    leaf dct-channel-estimation {
    type boolean;
    description
    "Discrete cosine transform (DCT) based chan-
        nel estimation";
    }
}
container dmrs-channel-estimation-fh-method {
description
```

"O-RU's capabilities related to supported fron-
thaul indication methods of channel estimation
parameters";
leaf   static-channel-estimation-type-only-indi-
cation-method {
type boolean;
description
"Static channel estimation indication method
refers to the case where the O-DU only indi-
cates channel estimation type/method to the
O-RU. O-RU determines the channel estima-
tion details, including coefficients and process-
ing steps based on its own implementation";
}
leaf     static-full-id-based-channel-estimation-
method {
type boolean;
description
"static ID-based channel estimation method
refers to the case where the O-DU indicates the
channel estimation type/method as well as other
channel estimation parameters needed at the
O-RU. O-RU uses look-up tables to obtain the
channel estimation details";
}
leaf real-time-channel-estimation-method {
type boolean;
description
"real-time-channel-estimation-method refers to
the case where the O-DU provides full channel
estimation details to O-RU in real-time";
}
leaf       partial-real-time-channel-estimation-
method {
type boolean;
description
"Partial-real-time-channel-estimation-method
refers to the case where the O-DU provides
partial channel estimation parameters to O-RU,
using which O-RU calculates full channel esti-
mation details. In this option, the channel esti-
mation method information includes the chan-
nel estimation method and other parameters.
O-RU calculates the channel estimation details,
such as MMSE matrix, CE granularity in the
frequency-domain, and window size, based on
the channel estimation method and its received
details from O-DU.";
}
}
container   combining-digital-bf-matrix-enhance-
ment-information{
description
"O-RU's capabilities related to supporting of uti-
lizing combining/digital beamforming matrix
enhancement information, which improves the
quality of the combining/digital beamforming
matrix.";
container srs-channel-estimates {
description
"O-RU supports combining/digital beamforming
matrix   enhancement   information   which
includes SRS channel estimates of the sched-
uled or paired UEs/layers. The O-RU combines
SRS and DM-RS channel estimates using
weighting coefficients. Two options exist for the
weighting coefficients:";

leaf weighting-coefficients-local-generation {
type boolean;
description
"O-RU supports either using pre-configured
weighting coefficients or
determining the weighting coefficients based on
other parameters.";
}
leaf weighting-coefficients-reception {
type boolean;
description
"O-RU supports reception of the weighting
coefficients from the O-DU.";
}
}
container      preliminary-combining-digital-bf-
matrix {
description
"O-RU supports combining/digital beamforming
matrix    enhancement    information    which
includes preliminary combining/digital beam-
forming matrix elements corresponding to the
scheduled or paired UEs/layers. This prelimi-
nary combining/digital beamforming matrix is
calculated at O-DU prior to slot n using SRS
channel estimates. Later, the O-RU combines
its own calculated combining/digital beam-
forming matrix elements with the preliminary
combining/digital beamforming matrix using
weighting coefficients. Two options exist for the
weighting coefficients.";
leaf weighting-coefficients-local-generation {
type boolean;
description
"O-RU supports local generation of the weight-
ing coefficients";
}
leaf weighting-coefficients-reception {
type boolean;
description
"O-RU supports reception of the weighting
coefficients from the O-DU";
}
}
}
container combining-matrix-calculation-method {
description
"O-RU capabilities related to combining/digital
beamforming matrix calculation method.";
leaf conjugate-combining {
type boolean;
description
"O-RU's support for Conjugate combining
method.";
}
leafzero-forcing {
type boolean;
description
"O-RU's support for Zero-forcing combining
method";
}
leaf dft-compression {
type boolean;
description
"O-RU's support for Discrete Fourier transform
compression based combining method.";
}

```
        leaf null-space-dimension-increase-based {
        type boolean;
        description
        "O-RU's support for Null-space dimension
        increase based combining calculation method.";
        }
        leaf mmse-irc-based {
        type boolean;
        description
        "O-RU's support for Minimum mean square
        error—Interference     rejection     combining
        (MMSE-IRC)   based   combining   calculation
        method.";
        }
      }
    }
```

Another example implementation in the o-ran-uplane-conf.yang can be described as follows, where dependent features can be marked as read-write for capabilities reporting and configurations

```
    grouping dmrs-based-channel-estimation-features {
      description
        "Dependent features on DMRS-based channel esti-
          mation";
          container     dmrs-based-channel-estimation-con-
            figuration-type {
          description
          "DMRS-based channel estimation configuration
            type.";
            leaf static-dmrs-based-channel-estimation-con-
            figuration-type {
            type boolean;
            description
            "Static configurations, via M-plane, for the
            DMRS-based channel estimation parameters.";
            }
            leaf   dynamic-dmrs-based-channel-estimation-
            configuration-type{
            type boolean;
            description
            "Real-time configurations, via C-plane, for the
            DMRS-based channel estimation parameters.";
            }
          }
        container dmrs-generation-method {
        description
        "DMRS signal generation. O-DU transfers DM-
          RS information to O-RU so that O-RU can
          obtain DM-RS signal and perform channel esti-
          mation";
          leaf dmrs-local-generation {
          type boolean;
          description
          "O-RU's reception of the DM-RS configuration
          parameters of the scheduled or paired UEs/
          layers. O-RU's local generation of the DM-RS
          sequence using the DM-RS configuration
          parameters received from O-DU.";
          }
          leaf dmrs-sequence-reception {
          type boolean;
          description
          "O-RU's DMRS sequence reception from
          O-DU.";
          }
        }
        container dmrs-channel-estimation-technique {
```

```
        description
        "Supported channel estimation techniques";
          leaf is-channel-estimation {
          type boolean;
          description
          "Least-squares (LS) channel estimation";
          }
          leaf mmse-channel-estimation {
          type boolean;
          description
          "Minimum mean-squared error (MMSE) chan-
          nel estimation";
          }
          leaf dft-channel-estimation {
          type boolean;
          description
          "Discrete Fourier transform (DFT) based chan-
          nel estimation";
          }
          leaf dct-channel-estimation {
          type boolean;
          description
          "Discrete cosine transform (DCT) based chan-
          nel estimation";
          }
      }
    container dmrs-channel-estimation-fh-method {
    description
    "Fronthaul indication methods of channel estima-
      tion parameters";
      leaf    static-channel-estimation-type-only-indi-
      cation-method {
      type boolean;
      description
      "Static channel estimation indication method
      refers to the case where the O-DU only indi-
      cates channel estimation type/method to the
      O-RU. O-RU determines the channel estima-
      tion details, including coefficients and process-
      ing steps based on its own implementation";
      }
      leaf     static-full-id-based-channel-estimation-
      method {
      type boolean;
      description
      "static ID-based channel estimation method
      refers to the case where the O-DU indicates the
      channel estimation type/method as well as other
      channel estimation parameters needed at the
      O-RU. O-RU uses look-up tables to obtain the
      channel estimation details";
      }
      o leaf real-time-channel-estimation-method {
      type boolean;
      description
      "real-time-channel-estimation-method refers to
      the case where the O-DU provides full channel
      estimation details to O-RU in real-time";
      }
      leaf        partial-real-time-channel-estimation-
      method {
      type boolean;
      description
      "Partial-real-time-channel-estimation-method
      refers to the case where the O-DU provides
      partial channel estimation parameters to O-RU,
      using which O-RU calculates full channel esti-
``` mation details. In this option, the channel estimation method information includes the channel estimation method and other parameters. O-RU calculates the channel estimation details, such as MMSE matrix, CE granularity in the frequency-domain, and window size, based on the channel estimation method and its received details from O-DU.";

}

} container combining-digital-bf-matrix-enhancement-information { description

"O-RU's utilizing combining/digital beamforming matrix enhancement information, which improves the quality of the combining/digital beamforming matrix.";

container srs-channel-estimates { description

"Combining/digital beamforming matrix enhancement information which includes SRS channel estimates of the scheduled or paired UEs/layers. The O-RU combines SRS and DM-RS channel estimates using weighting coefficients. Two options exist for the weighting coefficients:";

leaf weighting-coefficients-local-generation { type boolean;

description

"O-RU uses pre-configured weighting coefficients or determines the weighting coefficients based on other parameters.";

} leaf weighting-coefficients-reception { type boolean;

description

"O-RU's reception of the weighting coefficients from the O-DU.";

}

} container preliminary-combining-digital-bf-matrix { description

"Combining/digital beamforming matrix enhancement information which includes preliminary combining/digital beamforming matrix elements corresponding to the scheduled or paired UEs/layers. This preliminary combining/digital beamforming matrix is calculated at O-DU prior to slot n using SRS channel estimates. Later, the O-RU combines its own calculated combining/digital beamforming matrix elements with the preliminary combining/digital beamforming matrix using weighting coefficients. Two options exist for the weighting coefficients.";

leaf weighting-coefficients-local-generation { type boolean;

description

"O-RU's local generation of the weighting coefficients";

} leaf weighting-coefficients-reception { type boolean;

description

"O-RU's reception of the weighting coefficients from the O-DU";

}

}

} container combining-matrix-calculation-method {description

"O-RU's combining/digital beamforming matrix calculation method.";

leaf conjugate-combining { type boolean;

description

"Conjugate combining method.";

} leaf zero-forcing { type boolean;

description

"Zero-forcing combining method";

} leaf dft-compression { type boolean;

description

"Discrete Fourier transform compression based combining method.";

} leaf null-space-dimension-increase-based { type boolean;

description

"Null-space dimension increase based combining calculation method.";

} leaf mmse-irc-based { type boolean;

description

"Minimum mean square error—Interference rejection combining (MMSE-IRC) based combining calculation method.";

}

}

}

C-Plane Embodiment Related to Real-Time DMRS Sequence Generation at the O-RU

DMRS Configuration Parameters

C-plane Embodiment: If dmrs-local-generation and dynamic-dmrs-based-channel-estimation-configuration-type features are supported by the O-RU and configured by the SMO/O-RU controller, the O-DU appends the UL C-plane message sent in the DL to the O-RU with the following section extension and includes the DM-RS configuration parameters to enable the O-RU to locally generate the DM-RS signal.

ExtType=21: Section description for DMRS sequence generation

This section extension applies to DMRS signal generation. This enables the O-DU to provide the DMRS configuration parameters at the O-RU to generate the DMRS signal locally. This section extension applies to section types 1 and 3.

TABLE 20

| Section Extension Type 21 | | | | | | | | |
|---|---|---|---|---|---|---|---|---|
| ef | | | | extType = 0 × 15 | | | 1 | Octet N |
| | | | | extLen | | | 1 | N + 1 |
| TP | scramblingInit | GH | SH | config Type | maxLen | pos | reserved | 1 | N + 2 |
| | | | | scramblingID[15:8] | | | 1 | N + 3 |
| | | | | scramblingID [7:0] | | | 1 | N + 4 |
| addPos[1:0] | | | antPortInd [3:0] | | | reserved | 1 | N + 5 |
| | | zero pad to 4-byte boundary | | | | | 1 | N + 6 |
| | | zero pad to 4-byte boundary | | | | | 1 | N + 7 |

TP (transformPrecoding)

Description: This parameter is used to indicate if Transform precoding is enabled or disabled. The default is that transform precoding is disabled.

Value range: {0b: Disabled; 1b: Enabled}.

Type: binary bit.

Field length: 1 bit.

Default Value: 0

Description of the remaining fields in the above section extension follows the same definitions in Table 2 above.

M-Plane Embodiment Related to Static DMRS Sequence Generation at the O-RU

M-plane Embodiment for static DMRS sequence generation: If dmrs-local-generation and static-dmrs-based-channel-estimation-configuration-type features are supported by the O-RU and configured by the SMO/O-RU controller, the SMO/O-RU controller statically configures the DM-RS parameters to enable the O-RU to locally generate the DM-RS signal and execute DMRS-based channel estimation.

```
list dmrs-based-channel-estimation-configuration {
if-feature mcap: DMRS-BASED-CHANNEL-ESTIMA-
    TION-SUPPORTED;
    key dmrs-ce-config-id;
    description
    "List of DMRS-based channel estimation configura-
        tions. An O-RU shall reject any configuration
    modification which exceed the maximum permitted
        configurations supported by
    the O-RU";
leaf dmrs-ce-config-id {
    type uint8;
    description
        "Supplementary parameter acting as key in list of
            DMRS based channel estimation configurations.";
}
    uses dmrs-based-channel-estimation-configuration;
}
grouping dmrs-based-channel-estimation-configuration {
    description
        "Set of parameters related to DMRS-based channel
            estimation configuration";
list dmrs-sequence-generation {
    key dmrs-sequence-id;
    min-elements 1;
    description
        "Provides configuration parameters by the O-RU to
            generate the DMRS sequence locally to be used
            for channel estimation.";
    leaf dmrs-sequence-id {
        type uint16;
        mandatory true;
        description
```

```
        "Supplementary parameter acting as key for dmrs-
            sequence list.";
}
leaf transform-recoding {
    type boolean{
    }
    mandatory true;
    description
        "This parameter enable or disable transform precod-
            ing. True means transform precoding is enabled.";
}
leaf dmrs-scrambling-id{
    type uint16{
    range 0 . . . 65535;
    }
    mandatory true;
    description
        "DMRS scrambling Identity.";
}
leaf dmrs-scrambling-initialization{
    type uint8{
    range 0,1;
    }
    mandatory true;
    description
        "DMRS scrambling initialization";
}
leaf number-of-ofdm-symbols-in-slot{
    type uint8{
    range 12, 14;
    }
    mandatory true;
    description
        "Number of OFDM symbols per slot";
}
leaf slot-index-in-radio-frame{
    type uint8{
    range 0 . . . 159;
    }
    mandatory true;
    description
        "DMRS slot index in radio frame";
}
leaf symbol-index-within-slot{
    type uint8{
    range 0 . . . 13;
    }
    mandatory true;
    description
        "Symbol index within a slot";
}
leaf dmrs-group-hopping{
    type uint8{
    range 0,1;
```

}
    mandatory true;
    description
        "DMRS group hopping";
}
leaf dmrs-sequence-hopping{
    type uint8{
        range 0,1;
    }
    mandatory true;
    description
        "DMRS sequence hopping";
}
leaf dmrs-configuration-type{
    type uint8{
        range 1,2;
    }
    mandatory true;
    description
        "DMRS configuration type";
}
leaf dmrs-max-length{
    type uint8{
        range 1,2;
    }
    mandatory true;
    description
        "DMRS maximum length: Single symbol or double
            symbol";
}
leaf dmrs-typeA-position{
    type uint8{
        range 2,3;
    }
    mandatory true;
    description
        "DMRS TypeA position: DMRS start position for
            Type A. 2 refers to pos2 and 3 refers to pos3";
}
leaf additional-dmrs-position{
    type uint8{
        range 0,1,2,3;
    }
    mandatory true;
    description
        "Additional DMRS position";
}

C-Plane Embodiment Related to O-DU Transmission in Real-Time DMRS Sequence to the O-RU C-plane Embodiment: If dmrs-sequence-reception and dynamic-dmrs-based-channel-estimation-configuration-type features are supported by the O-RU and configured by the SMO/O-RU controller, the O-DU appends the UL C-plane message sent in the DL to the O-RU with the following section extension and includes the DM-RS sequence to enable the O-RU to do DMRS-based channel estimation.

TABLE 22

| | Section Extension Type 22 | | |
|---|---|---|---|
| ef | extType = 0 × 16 | 1 | Octet N |
| | extLen | 1 | N + 1 |
| re | startRec (4 bits)    reserved | | |
| | udCompHdr (not always present) | 1 | N + 2 |
| | reserved (not always present) | | |

TABLE 22-continued

| | Section Extension Type 22 | | |
|---|---|---|---|
| | udCompLen (not always present) | | |
| | udCompParam (not always present) | | |
| | iSample ($1^{st}$ RE in the PRB) | 1 | N + 3 |
| | qSample ($1^{st}$ RE in the PRB) | 1 | N + 4 |
| | . . . | 1 | N + 5 |
| | iSample ($12^{th}$ RE in the PRB) | | |
| | qSample ($12^{th}$ RE in the PRB) | | |
| | udCompParam (not always present) | | |
| | iSample ($1^{st}$ RE in the PRB) | | |
| | qSample ($1^{st}$ RE in the PRB) | | |
| | . . . | 1 | N + 6 |
| | iSample ($12^{th}$ RE in the PRB) | 1 | N + 7 |
| | qSample ($12^{th}$ RE in the PRB) | | |

ExtType=22: Section Description for DMRS Sequence Transmission

This section extension applies to DMRS signal transmission. This enables the O-DU to provide the DMRS sequence needed at the O-RU to execute DMRS-based channel estimation. This section extension applies to section types 1 and 3.

re (Resource Element Indicator)

Description: This parameter is used to indicate if every RE is used or every other RE is used. The starting RE is defined by startRec Value range: {0b=every RE used; 1b=every other RE used}.

Type: binary bit.

Field length: 1 bit.

Default Value: 0b (every RE used)

startRec (start RE)

Description: This parameter is used to indicate the first RE within a PRB.

Value range: {0-11}.

Type: uint.

Field length: 4 bits.

Default Value: 0 iSample and qSample represent the I and Q samples, respectively of the DMRS signal.

C-Plane Embodiment Related to Real-Time Configuration of the O-RU by the O-DU for the Channel Estimation Method and Parameters If dynamic-dmrs-based-channel-estimation-configuration-type and real-time-channel-estimation-method features are supported by the O-RU and configured by the SMO/O-RU controller, the O-DU configures the O-RU in real time with the channel estimation method and needed parameters to enable the O-RU to do channel estimation locally.

ExtType=23: Section description for channel estimation

This section extension applies to channel estimation at the O-RU. This enables the O-DU to provide the channel estimation technique and relevant configuration parameters needed at the O-RU to locally perform channel estimation. This section extension applies to section types 1 and 3.

TABLE 23

| | Section Extension Type 23 | | | |
|---|---|---|---|---|
| ef | extType = 0 × 17 | | 1 | Octet N |
| | extLen | | 1 | N + 1 |
| chEstMeth | mmseMatrixId | chEstGranularity | 1 | N + 2 |
| windowType | windowSize | reserved | 1 | N + 3 | chEstMeth (Channel Estimation Method)

Description: This parameter is used to indicate the channel estimation method. The default is the LS method.

Value range: {00b: LS; 01b: MMSE; 10b: DFT based; 11b: DCT based}.

Type: unsigned integer.

Field length: 2 bits.

Default Value: 00 mmseMatrixId (MMSE Matrix ID)

Description: This parameter is used to indicate the channel estimation matrix ID. This field is feasible only if the chEstMeth=00b (i.e., LS channel estimation). For other channel estimation methods, the O-DU shall set this field to the default value and the O-RU shall ignore this field.

Value range: {000b: $\phi_1$-111b: $\phi_8$}.

Type: unsigned integer.

Field length: 3 bits.

Default Value: 000 chEstGranularity (Channel Estimation Granularity)

Description: This parameter is used to indicate the channel estimation granularity in the frequency domain.

Value range: {00b: $N_1$; 01b: $N_2$; 10b: $N_3$; 11b: $N_4$}.

Type: unsigned integer.

Field length: 2 bits.

Default Value: 00 windowType (Channel Estimation Window Type)

Description: This parameter is used to indicate the channel estimation window type. This field is feasible only if the chEstMeth=10b or 11b (i.e., DFT or DCT based channel estimation). For other channel estimation methods, the O-DU shall set this field to the default value and the O-RU shall ignore this field.

Value range: {00b: Type 1; 01b: Type 2; 10b: Type 3; 11b: Type 4}.

Type: unsigned integer.

Field length: 2 bits.

Default Value: 00 windowSize (Channel Estimation Window Size)

Description: This parameter is used to indicate the channel estimation window size. This field is feasible only if the chEstMeth=10b or 11b (i.e., DFT or DCT based channel estimation). For other channel estimation methods, the O-DU shall set this field to the default value and the O-RU shall ignore this field.

Value range: {00b: Size 1; 01b: Size 2; 10b: Size 3; 11b: Size 4}.

Type: unsigned integer.

Field length: 2 bits.

Default Value: 00

Embodiment 6: 5G NR DM-RS

In 5G NR, DM-RS is used for channel estimation as part of coherent demodulation of the physical channels (i.e., PUSCH/PDSCH). It is designed to support various use cases, channel conditions, and deployment scenarios. DM-RS configuration depends on other PHY layer parameters such as the resource allocation type and utilized waveform (i.e., CP-OFDM or DFT-s-OFDM), and these are detailed in the following parts. In order for O-RU to be able to perform DM-RS channel estimation, either DM-RS sequence or DM-RS configuration parameters, which are required to generate DM-RS sequence at O-RU, need to be provided by O-DU to O-RU. This part explains the latter option and lists the parameters with detailed instructions for DM-RS sequence generation, precoding, and mapping. FIGS. 11A, 11B, 11C, 11D, and 11E demonstrate the possible channel estimation techniques that can be applied at the O-RU.

DM-RS Sequence Generation:

For CP-OFDM

A length-31 Gold sequence is used as the DM-RS sequence for CP-OFDM (i.e., when transform precoding is disabled). This pseudo-random sequence, c(n), with a length of $M_{PN}$ is defined as follows:

$$c(n)=(x_1(n+N_C)+x_2(n+N_C))\mod 2$$

$$x_1(n+31)=(x_1(n+3)+x_1(n))\mod 2$$

$$x_2(n+31)=(x_2(n+3)+x_2(n+2)+x_2(n+1)+x_2(n))\mod 2$$

where n=0, 1, . . . , $M_{PN}$−1 and N, is 1600. The first m-sequence, $x_1(n)$, can be initialized with $x_1(0)=1$ and $x_1(n)=0$ for n=1, 2, . . . , 30. Also, the second m-sequence, $x_2(n)$ is initialized according to $$c_{init} = \sum_{i=0}^{30} x_2(i)2^i.$$

Using the pseudo-random sequence, the DM-RS sequence for CP-OFDM, r(n), can be generated as follows:

$$r(n) = \frac{1}{\sqrt{2}}(1 - 2\cdot c(2n)) + j\frac{1}{\sqrt{2}}(1 - 2\cdot c(2n + 1)).$$

The initialization of the random sequence is performed as follows:

$$c_{init} = \left(2^{17}\left(N_{symb}^{slot}n_{s,f}^{\mu} + l + 1\right)\left(2N_{ID}^{nSCID} + 1\right) + 2N_{ID}^{nSCID} + n_{SCID}\right) \mod 2^{31}$$

where l is the OFDM symbol number within the slot and $$n_{s,f}^{\mu}$$

is the slot number within a frame. Furthermore, $$N_{ID}^{nSCID}$$

denotes the DM-RS scrambling identity and $n_{SCID}$ represents DM-RS scrambling initialization parameter.

For DFT-s-OFDM

The Zadoff-Chu sequence is used as the DM-RS sequence for DFT-s-OFDM (i.e., when transform precoding is enabled). This low-PAPR sequence, $$r_{u,v}^{(\alpha,\delta)}(n),$$

is defined by a cyclic shift a of a base sequence $\bar{r}_{u,v}(n)$ as follows:

$$r_{u,v}^{(\alpha,\delta)}(n) = e^{j\alpha n}\bar{r}_{u,v}(n)$$

where n=0, 1, . . . , $M_{ZC}-1$ and $$M_{ZC} = mN_{sc}^{RB}/2^{\delta}$$

denotes the length of the sequence. Also, $$N_{sc}^{RB}$$

represents the number of subcarriers in a resource block. Multiple orthogonal sequences can be generated from a base sequence through different values of $\alpha$ and $\delta$. The base sequences, $\bar{r}_{u,v}(n)$, are divided into groups, where $\kappa \in \{0, 1, 2, \ldots, 29\}$ specifies the group number and $v \in \{0,1\}$ represents the base sequence number within the group.

The base sequence definition depends on the sequence length as follows:

1)

$$M_{ZC} \geq 36: \bar{r}_{u,v}(n) = x_q(n \bmod N_{ZC})$$

$$x_q(m) = e^{-j\frac{\pi qm(m+1)}{N_{ZC}}}$$

where $$q = \lfloor \bar{q} + \frac{1}{2} \rfloor + V(-1)^{\lfloor 2\bar{q} \rfloor}$$

$$\bar{q} = N_{ZC}(u+1)/31$$

The length $N_{ZC}$ is defined as the largest prime number, which is less than the base sequence length $M_{ZC}$.

2) When $M_{ZC} \in \{6,12,18,24\}$:

$$\bar{r}_{u,v}(n) = e^{j\varphi(n)\pi/4}$$

where n=0, 1, . . . , $M_{ZC}-1$ and the value of $\varphi(n)$ is provided by Tables 5.2.2.2-1 to 5.2.2.2-4 in TS 38.211.

3) When $$M_{ZC} = 30: \bar{r}_{u,v}(n) = e^{-j\frac{\pi(u+1)(n+1)(n+2)}{31}}$$

where n=0, 1, . . . , $M_{ZC}-1$.

Using the Zadoff-Chu sequence, the DM-RS sequence for DFT-s-OFDM, r(n), can be generated as follows:

$$r(n) = r_{u,v}^{(\alpha,\delta)}(n)$$

where $$n = 0, 1, \ldots, \left(M_{sc}^{PUSCH}\right)/2^{\delta} - 1.$$

The low-PAPR sequence parameters $\delta$ is given as 1 and the cyclic shift, $\alpha$, is set to 0 for a PUSCH transmission. The sequence group number, u, equals to $$\left(f_{gh} + n_D^{RS}\right) \bmod 30,$$

where $$n_{ID}^{RS}$$

denotes the DM-RS scrambling identity. Furthermore, the values of $f_{gh}$ and the base sequence number, v, are given as follows:

1) When neither group nor sequence hopping is enabled:

$$f_{gh}=0 \text{ and } v=0$$

2) When group hopping is enabled:

$$f_{gh} = \left(\sum_{m=0}^{7} 2^m c\left(8\left(N_{symb}^{slot}n_{s,f}^{\mu} + l\right) + m\right)\right) \bmod 30 \text{ and } v = 0$$

where the (pseudo-random sequence, c(i), should be initialized with $$c_{init} = \lfloor \left(n_{ID}^{RS}\right)/30 \rfloor.$$

3) When sequence hopping is enabled:

$$f_{gh} = 0 \text{ and } v = \begin{cases} c\left(N_{symb}^{slot}n_{s,f}^{\mu} + l\right) & \text{if } M_{ZC} \geq 6N_{sc}^{RB} \\ 0 & \text{Otherwise} \end{cases}$$

where the pseudo-random sequence, c(i), should be initialized with $$c_{init} = n_{ID}^{RS}.$$

DM-RS Precoding and Mapping to Physical Resources

The orthogonality of the DM-RS sequences that are allocated to the different antenna ports is achieved by multiplexing in time, frequency, and code domains. To realize this, the DM-RS sequence is multiplied with the orthogonal cover codes in time and frequency domains (i.e., $w_t(k)$ and $w_f(k)$ respectively). Also, shifts in the frequency domain are included to support more antenna ports. The DM-RS sequence, r(m) is mapped to an intermediate quantity $$a_{k,l}^{(\tilde{p}_j,\mu)}$$

as follows:

$$a_{k,l}^{(\tilde{p}_j,\mu)} = w_f(k')w_t(l')r(2n+k')$$

$$k = \begin{cases} 4n + 2k' + \Delta & \text{Configuration Type 1} \\ 6n + k' + \Delta & \text{Configuration Type 2} \end{cases}$$

$$k' = 0, 1$$

$$l = \bar{l} + l'$$

-continued $n = 0, 1, \ldots$ $j = 0, 1, \ldots, v - 1$ where $w_f(k')$, $w_t(l')$, and $\Delta$ are defined by Tables 6.4.1.1.3-1 and Tables 6.4.1.1.3-2 in TS 38.211. Also, $\tilde{p}_j$ represents the antenna port for transmission layer j. However, DFT-s-OFDM supports only single-layer transmission, and j is equal to 0 when transform-precoding is enabled.

DM-RS configuration type determines the DM-RS density in the frequency domain, which also impacts the available number of orthogonal sequences. DM-RS configuration Type 1 has a higher density in the frequency domain and provides a more accurate channel estimation. On the other hand, DM-RS configuration Type 2 has a lower density in the frequency domain, and it allows supporting more antenna ports. Type 1 can support up to 8 antenna ports, whereas Type 2 can support up to 12 antenna ports. These are illustrated in FIGS. 10A and 10B, along with the associated mapping and orthogonal cover codes obtained from Tables 6.4.1.1.3-1 and Tables 6.4.1.1.3-2 in TS 38.211.

The reference point for k depends on the waveform type. For CP-OFDM (i.e., when transform precoding is disabled), k is subcarrier 0 in the common resource block. On the other hand, for DFT-s-OFDM (i.e., when transform precoding is enabled), k is subcarrier 0 of the lowest-numbered RB of the scheduled PUSCH allocation.

The reference point of 1 and the position of the first DM-RS symbol ($l_0$) depends on the PUSCH mapping type and activation of the frequency hopping scheme. For PUSCH Mapping Type A, 1 is defined relative to the start of the slot if frequency hopping is disabled, and it is defined relative to the start of each hop if frequency hopping is enabled. $l_0$ is indicated by dmrs-TypeA-Position parameter, and it refers to either the third or fourth OFDM symbol in a slot. On the other hand, for PUSCH Mapping Type B, 1 is defined relative to the start of the scheduled PUSCH resources if frequency hopping is disabled, and it is defined relative to the start of each hop if frequency hopping is enabled. In this case, $l_0$ equals to 0; in other words, it refers to the first symbol in the scheduled data symbol duration. Exemplary DM-RS mappings are illustrated in FIGS. 10C and 10D for PUSCH Mapping Type A and PUSCH Mapping Type B accordingly.

The position(s) of the DM-RS symbols is provided by $\bar{l}$ parameter and it depends on the PUSCH mapping type, activation of the frequency hopping scheme, and the number of additional DM-RS symbols. Up to 4 DM-RS symbols (i.e., up to 3 additional positions) in a slot are possible for high mobility scenarios. Exemplary DM-RS allocations with additional positions are presented in FIG. 10E. The position(s) of the DM-RS symbols ($\bar{l}$), the time-domain index (l'), and the supported antenna ports $\tilde{p}_j$ are provided by Tables 6.4.1.1.3-3 through 6.4.1.1.3-6 in TS 38.211

In the following step, the intermediate quantity, $$\tilde{a}_{k,l}^{(\tilde{p}_j,\mu)},$$

is precoded with W, multiplied with the amplitude scaling factor $$\beta_{PUSCH}^{DMRS}$$

and mapped to the physical resources as follows:

$$\begin{bmatrix} a_{k,l}^{(0,\mu)}(m) \\ \vdots \\ a_{k,l}^{(p_v-1,\mu)}(m) \end{bmatrix} = \beta_{PUSCH}^{DMRS} W \begin{bmatrix} \tilde{a}_{k,l}^{(0,\mu)}(m) \\ \vdots \\ \tilde{a}_{k,l}^{(\tilde{p}_v-1,\mu)}(m) \end{bmatrix}$$

where $$\beta_{PUSCH}^{DMRS} = 10^{-\frac{\beta_{DMRS}}{20}}$$

and $\beta_{DMRS}$ is given by Table 6.2.2-1 in TS 38.214. The required $\beta_{DMRS}$ value is signaled with the number of DM-RS CDM groups without data parameter. Also, W is given by Table 6.3.1.5-1 to Table 6.3.1.5.-7 in TS 38.211. The required precoding matrix is signaled through the TPMI index parameter.

The DM-RS sequence can either be sent from O-DU to O-RU or the DM-RS configuration parameters, which are required to re-generate the DM-RS sequence in the O-RU, can be transmitted from O-DU to O-RU.

Embodiment 7: Channel Estimation

In an OFDM system with N subcarriers, the received signal in the frequency domain can be expressed as follows:

$$Y = XH + Z$$

where Y is received signal vector, X is a diagonal matrix where each diagonal element represents a reference signal (such as DM-RS) in subcarrier k, H is the channel vector, and Z is the noise vector.

FIG. 11 E is flow chart showing 4 exemplary implementations for DM-RS channel estimation techniques, described in more detail with respect to FIGS. 11A-11D. Examples of DM-RS channel estimation techniques that O-RU can use include the following:

Frequency-Domain Channel Estimation Techniques:

1) Least-Squares (LS) Channel Estimation

FIG. 11A illustrates an LS channel estimation. After extracting the DM-RS symbols of the received signal in the frequency domain, the LS channel estimation can be expressed as follows:

$$H_{LS}(k_i, l_j, r_m, t_n) = \frac{Y_{RS}(k_i, l_j, r_m, t_n)}{X_{DMRS}(k_i, l_j, r_m, t_n)}$$

where $k_i$ represents the subcarrier index, $l_j$ represents the symbol index, $r_m$ is the receiver antenna index, and to is the DM-RS transmission port index. If the DM-RS belongs to code-division multiplexing (CDM) group of size L with an orthogonal cover code (OCC), the channel estimate can be de-spreaded as follows:

$$\hat{H}'_{LS}(DMRS_g, r_m, t_n) = \sum_{i,j=1}^{2} \frac{H_{LS}(k_i, l_j, r_m, t_n) c_{ij}(t_n)}{L}$$

where $c_{ij}(t_n)$ represents the code in symbol i, subcarrier j, and DM-RS transmission port n. Also, L is the size of the RE group where the 2-length OCC is applied. When single DM-RS is used, L is equal to 2, and when double DM-RS is used, L is equal to 4.

The channel estimates, $\hat{H}'_{LS}(DMRS_g, r_m, t_n)$, in a given RB can be interpolated in the time and frequency domains to obtain channel estimates over data symbol. Also, these channel estimates can be averaged for an initial channel estimate as follows:

$$\hat{H}_{LS}(n_{RB}, n_s, r_m, t_n) = \sum_{g=1}^{G} \frac{\hat{H}'_{LS}(DMRS_g, r_m, t_n)}{G}$$

where $n_{RB}$ represents the RB index, $n_s$ shows the slot index, $DMRS_g$ denotes the DM-RS RE group index, and G is the total number of DM-RS RE groups in a given RB. Depending on the complexity and channel conditions, the channel estimates belong to multiple RBs can be averaged as well.

2) Minimum Mean-Square Error (MMSE) Channel Estimation

FIG. 11B illustrates an MMSE channel estimation. Considering, a channel estimate of $\hat{H}$, the MMSE finds a better linear estimate (i.e., $W\hat{H}$) that minimizes the minimum square error (MSE), which is calculated as $E\{\|H-\hat{H}\|^2\}$. Without loss of generality, the LS channel estimate ($\hat{H}_{LS}$) can be used as an initial estimate, and the MMSE channel estimate can be expressed as follows:

$$\hat{H}_{MMSE} = W\hat{H}_{LS} = R_{H\hat{H}_{LS}}\left(R_{HH} + \frac{\sigma_Z^2}{\sigma_x^2}\right)^{-1}\hat{H}_{LS}$$

where $$\frac{\sigma_Z^2}{\sigma_x^3}$$

denotes the $$\frac{1}{SNR}$$

and R is the cross-correlation matrix. The expression inside the parenthesis (i.e., $$R_{HH} + \frac{\sigma_Z^2}{\sigma_x^2}I$$

is called as the MMSE matrix and can be denoted with $\phi$. The elements of $R_{H\hat{H}_{LS}}$ and $R_{HH}$ are given as follows:

$$E\{h_{k,l}\hat{h}*_{k',l'}\} = E\{h_{k,l}h*_{k',l'}\} = r_f(k-k')r_t(l-l')$$

Assuming an exponentially decaying multipath power delay profile, the frequency-domain correlation can be stated as follows:

$$r_f(k) = \frac{1}{1 + j2\pi\tau_{RMS}k\Delta f}$$

where $\tau_{RMS}$ denotes the RMS delay spread of the channel, and $\Delta f$ is the subcarrier spacing. Also, assuming a fading channel with Jake's spectrum, the time-domain correlation can be expressed as follows:

$$r_t(l) = J_0(2\pi f_{D_{max}}lT_s)$$

where $f_{D_{max}}$ is the maximum Doppler spread of the channel, $T_s$ is the OFDM symbol duration, and $J_0$ is the first kind of the $0^{th}$-order Bessel function. Alternatively, a sinc function can be adapted to represent the frequency and time domain correlations as well, and the elements of $R_{H\hat{H}_{LS}}$ and $R_{HH}$ can also be formulated as follows:

$$r_f(k-k')r_t(l-l') = sinc(2\tau_{RMS}\Delta f(k-k'))sinc(2\pi f_{D_{max}}T_s(l-l'))$$

After calculating W, the MMSE channel estimation can be performed as below:

$$\hat{H}'_{MMSE}(k,l,r,t) = W(k,l;k',l')\hat{H}_{LS}(k',l',r,t)$$

Considering the DM-RS structure, the MMSE channel estimation in the vicinity of a group of REs, where a 2-length OCC is applied, can be calculated as follows:

$$H'_{MMSE}(DMRS_g(k_{i'},l_{j'}),r_m,t_n) = W(k_{i'}l_{j'};k_{i'},l_{j'})\hat{H}_{LS}(DMRS_g(k_{i'},l_{j'}),r_m,t_n)$$

where $k_{i'}$ and $l_{j'}$ show the subcarrier and symbol indices of the DM-RS RE group. Also, these channel estimates can be averaged for an initial channel estimate as follows:

$$\hat{H}_{MMSE}(n_{RB}, n_s, r_m, t_n) = \sum_{i,j,g=1}^{I,J,G} \frac{\hat{H}'_{MMSE}(DMRS_g(k_i, l_j), r_m, t_n)}{I \times J \times G}$$

where $n_{RB}$ represents the RB index, $n_s$ shows the slot index, I and J represents the total number of subcarriers and symbols that are used in this averaging operation. Depending on the complexity and channel conditions, the channel estimates belong to multiple RBs can be averaged as well. Accordingly, the noise power can be estimated as follows:

$$\hat{Z}(k_i, l_j, r_m) =$$
$$Y_{RS}(k_i, l_j, r_m) - \sum_n X_{DMRS}(k_i, l_j, t_n)c_{ij}(t_n)\hat{H}'_{MMSE}(DMRS_g(k_i, l_j), r_m, t_n)$$

$$\hat{\sigma}_Z^2 = mean(\hat{Z}\hat{Z}^H)$$

where the mean operation is defined over all receiver antennas and DM-RS REs.

Time-Domain Channel Estimation:

1) Discrete Fourier Transform (DFT) based Channel Estimation

A DFT-based channel estimation is illustrated in FIG. 11C. The performance of channel estimation (LS or MMSE) can be improved with a DFT-based channel estimation technique by filtering the noise outside the maximum delay of the channel. Considering the complexity of the system, the LS channel estimate ($\hat{H}_{LS}$) can be used as an initial estimate, and it can be converted to the time domain with an IDFT operation as follows:

$$\hat{h}_{LS}^{DFT}(n_i, l_j, r_m, t_n) = IDFT\{\hat{H}'_{LS}(k_i, l_j, r_m, t_n)\}$$

Afterward, a window (e.g., rectangular) can be applied to filter the noise outside the maximum delay of the channel as follows:

$$\hat{h}^{DFT}_{filtered}(n_i, l_j, r_m, t_n) = \left\{ \begin{array}{cc} \hat{h}^{DFT}_{LS}(n_i, l_j, r_m, t_n) & 0 \le n_i \le w \\ 0 & \text{otherwise} \end{array} \right\}$$

where w denotes the window length. To improve the performance further, the channel taps that are below a certain threshold value are set to 0. This threshold value can be calculated by the average energy of the channel taps outside the window. The thresholding operation is performed as follows:

$$\hat{h}^{DFT}_{thresholded}(n_i, l_j, r_m, t_n) = \left\{ \begin{array}{cc} \hat{h}^{DFT}_{LS}(n_i, l_j, r_m, t_n) & P_{n_i} \le \text{Threshold} \\ 0 & \text{otherwise} \end{array} \right\}$$

where $P_{n_i}$ represents the tap power at $n_i$. Also, the noise power can be estimated $$\left( \text{i.e., } \hat{\sigma}^2_z \right)$$

by taking the average power of all taps that are set to 0. Following this operation, the time-domain estimate is transformed to the frequency domain by the DFT operation.

$$\hat{H}'_{DFT}(k_i, l_j, r_m, t_n) = DFT\left\{ \hat{h}^{DFT}_{thresholded}(n_i, l_j, r_m, t_n) \right\}$$

These channel estimates can be averaged for an initial channel estimate as follows:

$$\hat{H}_{DFT}(n_{RB}, n_s, r_m, t_n) = \sum_{i,j}^{I,J} \frac{\hat{H}'_{DFT}(k_i, l_j, r_m, t_n)}{I \times J}$$

Depending on the complexity and channel conditions, the channel estimates belong to multiple RBs can be averaged as well.

2) Discrete Cosine Transform (DCT) Based Channel Estimation

A DCT based channel estimation is illustrated in FIG. 11D.

The performance of channel estimation (LS or MMSE) can be improved with a DCT-based channel estimation technique by filtering the noise outside the maximum delay of the channel, similar to the DFT-based estimation. However, the DCT-based estimation provides better power concentration and lower aliasing error than the DFT-based interpolation. Considering the complexity of the system, the LS channel estimate ($\hat{H}_{LS}$) can be used as an initial estimate, and it can be converted to the transform domain with a DCT operation as follows:

$$\hat{h}^{DCT}_{LS}(n_i, l_j, r_m, t_n) = DCT\left\{ \hat{H}'_{LS}(k_i, l_j, r_m, t_n) \right\}$$

Afterward, a window (e.g., rectangular) can be applied to filter the noise outside the maximum delay of the channel as follows:

$$\hat{h}^{DCT}_{filtered}(n_i, l_j, r_m, t_n) = \left\{ \begin{array}{cc} \hat{h}^{DCT}_{LS}(n_i, l_j, r_m, t_n) & 0 \le n_i \le w \\ 0 & \text{otherwise} \end{array} \right\}$$

where w denotes the window length. To improve the performance further, the channel taps that are below a certain threshold value are set to 0. This threshold value can be calculated by the average energy of the channel taps outside the window. The thresholding operation is performed as follows:

$$\hat{h}^{DCT}_{thresholded}(n_i, l_j, r_m, t_n) = \left\{ \begin{array}{cc} \hat{h}^{DCT}_{LS}(n_i, l_j, r_m, t_n) & P_{n_i} \le \text{Threshold} \\ 0 & \text{otherwise} \end{array} \right\}$$

where $P_{n_i}$ represents the tap power at $n_i$. Following this operation, it is transformed to the frequency domain by the IDCT operation.

$$\hat{H}'_{DCT}(k_i, l_j, r_m, t_n) = IDCT\left\{ \hat{h}^{DCT}_{threshold}(n_i, l_j, r_m, t_n) \right\}$$

These channel estimates can be averaged for an initial channel estimate as follows:

$$\hat{H}_{DCT}(n_{RB}, n_s, r_m, t_n) = \sum_{i,j}^{I,J} \frac{\hat{H}'_{DCT}(k_i, l_j, r_m, t_n)}{I \times J}$$

Depending on the complexity and channel conditions, the channel estimates belong to multiple RBs can be averaged as well, similar to the other channel estimation techniques that are described previously.

Embodiment 8: Channel Equalization

Examples of channel equalization techniques that O-RU can use include the following:

A. Zero-Forcing (ZF) Equalizer

In a MIMO OFDM system, the received data symbols in the frequency domain can be expressed as follows:

$$Y_{DS}(k, r) = X(k, t)H(k, r, t) + Z(k, r)$$

$$H(k, r, t) =$$
$$\begin{bmatrix} H(k, 0, 0) & H(k, 0, 1) & \cdots & H(k, 0, N_{tx} - 1) \\ H(k, 1, 0) & H(k, 1, 1) & \cdots & H(k, 1, N_{tx} - 1) \\ \vdots & \vdots & \ddots & \vdots \\ H(k, N_{rx} - 1, 0) & H(k, N_{rx} - 1, 1) & \cdots & H(k, N_{rx} - 1, N_{tx} - 1) \end{bmatrix}$$

where $Y_{DS}$ represents the frequency domain data symbols, X shows the transmitted signal, H is the estimated channel response, Z is the noise, k denotes the subcarrier index, r shows the receiver antenna index, t represents the DM-RS transmission port index, $N_{tx}$ is the number of DM-RS transmission ports and $N_{rx}$ is the number of receiver antennas.

The MIMO ZF equalization matrix W is calculated as follows:

$$W = (H^H H)^{-1} H^H$$

Correspondingly, the equalized data symbol of a user ($\hat{Y}_{DS}$) can be expressed as follows:

$$\hat{Y}_{DS} = WY_{DS}(k,r) = (H^H H)^{-1} H^H Y_{DS}(k,r)$$

B. Minimum Mean-Square Error (MMSE) Equalizer

Considering the same system model in part a, the MIMO MMSE equalization matrix W is calculated as follows:

$$W = \left(H^H H + \sigma_z^2 I_{N_t}\right)^{-1} H^H$$

where $$\sigma_z^2$$

represents the estimated noise power. Correspondingly, the equalized data symbol of a user ($\hat{Y}_{DS}$) can be expressed as follows:

$$\hat{Y}_{DS} = W\, Y_{DS}(k,r) = \left(H^H H + \sigma_z^2 I_{N_t}\right)^{-1} H^H Y_{DS}(k,r)$$

C. MMSE-Interference Rejection Combiner (MMSE-IRC) Equalizer

Considering an interference component in the system model that is described in part a, the received data symbols in the frequency domain can be expressed as follows:

$$Y_{DS}(k,r) = X(k,t)H(k,r,t) + Z(k,r) + Q(k,r)$$

where Q denotes the sum of interference from all interference users. The MIMO MMSE-IRC equalization matrix W is calculated as follows:

$$W = H^H \left(HH^H + R_{nn}\right)^{-1}$$

$$R_{nn} = \frac{1}{N_{DMRS}} \sum R_{IpN}$$

$$R_{IpN} = (Y_{DS} - HX_{DMRS})(Y_{DS} - HX_{DMRS})^H$$

where $R_{IpN}$ represents the covariance matrix of interference plus noise and $N_{DMRS}$ denotes the number of DM-RS subcarriers in an RB. An interpolation operation in the time/frequency domains is required to calculate the covariance matrix in the scheduled subcarriers. Correspondingly, the equalized data symbol of a user ($\hat{Y}_{DS}$) can be expressed as follows:

$$\hat{Y}_{DS} = W\, Y_{DS}(k,r) = H^H (HH^H + R_{nn})^{-1} Y_{DS}(k,r)$$

The demodulation procedure requires "additional channel equalization information" during the log-likelihood ratio (LLR) calculation, and it can be provided in several ways. A universal solution, which is independent of the equalization method, can be providing one of the following options:

a) Equalization Gain and Post-processed Noise plus Interference Power (i.e., after equalization operation)

b) Post-processed Noise plus Interference Power divided by Equalization Gain c) Equalization Gain divided by Post-processed Noise plus Interference Power The equalization gain can be calculated as follows:

$$\gamma = \text{Real}\{\text{diag}(WH)\}$$

where $\gamma$ is the equalization gain, W denotes the equalization matrix, and H represents the estimated channel response. The post-processed noise plus interference power refers to the noise plus interference power that is obtained after the equalization procedure. Also, it should be noted that in the case of options (b) and (c), the equalized signal should be normalized by either equalization gain or post-processed noise plus interference power, respectively.

When the MMSE equalizer is used, only "equalization gain" can be sufficient as the "additional channel equalization information", whereas only "post-processed noise plus interference power" is required when ZF equalizer is used. Furthermore, these values, which are used during the LLR calculation operation, can be calculated from the channel estimates and estimated DM-RS noise plus interference power as well.

Embodiment 9: Combining/Digital Beamforming Matrix Calculation

In the following, we provide a brief description of example combining/digital beamforming matrix calculation methods which can be used in any of the embodiments in this disclosure. In all of these me, the UL channel between the UEs and BS is denoted as H, which is a matrix of size $N_{RX} \times N_{UE}$ where $N_{RX}$ is the number of RX antennas at BS and $N_{UE}$ is the number of UEs or layers being simultaneously transmitted over the same resources on the PUSCH slot. It is noted that H is an estimation of the UL channel, for example, based on SRS or DM-RS or a combination thereof or a linearly predicted UL channel based on SRS channel estimation.

a) Conjugate combining: In this method, the combining/digital beamforming matrix is calculated using $H^H$.

b) Zero forcing: In this method, the combining/digital beamforming matrix is calculated using $(H^H H)^{-1} H^H$.

c) MMSE: In this method, the combining/digital beamforming matrix can be calculated in two alternative forms:

$$\left(H^H H + \sigma_Z^2 I_{N_{UE}}\right)^{-1} H^H \text{ or } H^H \left(HH^H + \sigma_Z^2 I_{N_{RX}}\right)^{-1} \text{ where } \sigma_Z^2$$

is the estimated noise power.

d) MMSE-IRC: In this method, the combining/digital beamforming matrix is calculated using $H^H(HH^H + R_{nn})^{-1}$ where $R_{nn}$ the covariance matrix of interference plus noise.

e) Null-space dimension increase based: In this method, the singular-value decomposition (SVD) of the channel subspace of the desired UEs and the intra-site interfering UEs, if any, is first calculated, and its null-space is characterized. A sufficient number N of singular vector(s) are selected in the null-space so that $N + N_{UE} = L$ where L is the total number of streams to be transferred from RU to DU. Then, the combining/digital beamforming matrix is constructed as a vertical concatenation of $H^H$ and the selected singular vectors.

f) DFT compression: In this method, the energy of each row of W×H is calculated and sorted in decreasing order of energy, where W is the two-dimensional Discrete-Fourier Transform (DFT) matrix. Then, the combining/digital beamforming matrix is constructed as the L rows of W which correspond to the first L rows in the sorted list, where L is the total number of streams to be transferred from RU to DU.

ACRONYMS

3GPP: Third generation partnership project
BS: Base Station
CA: Carrier Aggregation
CAPEX: Capital Expenditure
CBRS: Citizens Broadband Radio Services
CC: Component carrier
COTS: Commercial off-the-shelf
CP: cyclic prefix
C-plane: Control plane
C-RAN: cloud radio access network
CU: Central unit
DCI: downlink control indicator
DL: downlink
DU: Distribution unit
eAxC ID: Extended Antenna-Carrier identifier: a data flow for a single antenna (or spatial stream) for a single carrier in a single sector.
eNB: Evolved Node B (applies to LTE)
FDD: Frequency-division duplex
FEC: forward error correction
FH: Fronthaul
FFT: Fast Fourier Transform
gNB: g NodeB (applies to NR)
iFFT: inverse Fast Fourier Transform
HARQ: hybrid automatic repeat request
LTE: long term evolution
LTE-A: LTE Advanced
M-plane: Management plane
MCS: modulation and coding scheme
MIMO: multiple input, multiple output
MMSE-IRC: Minimum mean square error—interference rejection combining
MMSE-MRC: Minimum mean square error—maximum-ratio combining
mmWave: millimeter wave
MNO: Mobile network operator
NR: New radio
OAM: Operation and management
O-DU: O-RAN Distributed Unit
O-RU: O-RAN Radio Unit
O-RAN: Open RAN (Basic O-RAN specifications are prepared by the O-RAN alliance)
OPEX: Operating Expense
PBCH: Physical Broadcast Channel
PCFICH: Physical Control Format Indicator Channel
PDCCH: Physical downlink Control Channel
PDCP: Packet Data Convergence Protocol
PDSCH: physical downlink shared channel
PHICH: Physical Hybrid ARQ Indicator Channel
PHY: physical layer
LPHY: lower physical layer
UPHY: upper physical layer
PUCCH: Physical Uplink Control Channel
PUSCH: Physical Uplink Shared Channel
QAM: quadrature amplitude modulation
QPSK: Quadrature Phase Shift Keying
RACH: random access channel
PRACH: physical random access channel
RF: radio frequency interface
RLC: Radio Link Control
RRC: Radio Resource Control
RRM: Radio resource management RRU: Remote radio unit
RU: Radio Unit
RS: reference signal
RSSI: received signal strength indicator
RPC: Remote procedure call
SMO: Service Management and Orchestration
S-plane: Synchronization plane
SCell: Secondary cell
SIMO: single input, multiple output
SINR: signal-to-interference-plus-noise ratio
SRS: Sounding reference signal
SSS: Secondary Synchronization Signal
TB: transport block
TTI: Transmission Time Interval
TDD: Time division duplex
U-plane: User plane
UCI: Uplink Control Information
UE: user equipment
UL: uplink
UL DMRS: uplink demodulation reference signal
ULSCH: Uplink Shared Channel
vBBU: Virtualized baseband unit
VNF: Virtual Network Function

Definitions

Channel: the contiguous frequency range between lower and upper frequency limits.

C-plane: Control Plane: refers specifically to real-time control between O-DU and O-RU, and should not be confused with the UE's control plane DL: DownLink: data flow towards the radiating antenna (generally on the LLS interface)

LLS: Lower Layer Split: logical interface between O-DU and O-RU when using a lower layer (intra-PHY based) functional split.

M-Plane: Management Plane: refers to non-real-time management operations between the O-DU and the O-RU O-CU: O-RAN Control Unit—a logical node hosting PDCP, RRC, SDAP and other control functions O-DU: O-RAN Distributed Unit: a logical node hosting RLC/MAC/High-PHY layers based on a lower layer functional split.

O-RU: O-RAN Radio Unit: a logical node hosting Low-PHY layer and RF processing based on a lower layer functional split. This is similar to 3GPP's "TRP" or "RRH" but more specific in including the Low-PHY layer (FFT/iFFT, PRACH extraction).

OTA: Over the Air

S-Plane: Synchronization Plane: refers to traffic between the O-RU or O-DU to a synchronization controller which is generally an IEEE 1588 Grand Master (however, Grand Master functionality may be embedded in the O-DU).

U-Plane: User Plane: refers to IQ sample data transferred between O-DU and O-RU

UL: UpLink: data flow away from the radiating antenna (generally on the LLS interface)

REFERENCES

ORAN-WG4.MP.0-v06.00: O-RAN Fronthaul Working Group Management Plane Specification, Release 06.00.

ORAN-WG4.CUS-plane.0-v06.00: O-RAN Fronthaul Working Group Control, User, and Synchronization Plane Specification, Release 06.00.

The invention claimed is:

1. An Open Radio Access Network (O-RAN) system, comprising:

a baseband unit (BBU) having an O-RAN centralized unit (O-CU) and an O-RAN distributed unit (O-DU);

an O-RAN radio unit (O-RU) remote from the BBU; and a fronthaul interface between the O-RU and the BBU;

wherein a functional split of O-RAN functions respectively assigned to O-RU and O-DU for the fronthaul interface between the BBU and the O-RU is different for downlink (DL) and uplink (UL), and wherein the system is configured such that i) demodulation reference signal (DM-RS)-based channel estimation is performed by the O-DU in the DL and by the O-RU in the UL, and ii) equalization is performed by the O-DU in the DL and by the O-RU in the UL.

2. The system according to claim 1, wherein the system is configured such that the O-DU transfers DM-RS information to the O-RU, the DM-RS information including DM-RS configuration parameters of the scheduled or paired UEs/layers are received by the O-RU, and the O-RU generates a DM-RS sequence using the DM-RS configuration parameters received from O-DU.

3. The system according to claim 2, wherein the system is configured such that the O-RU estimates the UL channels of the UE(s) and/or layer(s) transmitted at a current slot n using the DM-RS information.

4. The system according to claim 3, wherein the system is configured such that the O-RU equalizes the UL channels of the one or more UEs, the one or more layers, or both transmitted at a current slot n.

5. The system according to claim 4, wherein the system is configured such that the O-RU calculates a supplementary demodulation information and transfers the supplementary demodulation information along with an equalized signal stream to the O-DU.

6. The system according to claim 5, wherein the system is configured such that the O-DU performs a demodulation on a signal of slot n transferred from the O-RU and a L1/L2 processing on the demodulated signal.

7. The system according to claim 1, wherein the system is configured such that iii) demodulation is performed by the O-DU in the DL and by the O-RU in the UL.

8. The system according to claim 7, wherein the system is configured such that the O-DU transfer DM-RS information to the O-RU, the DM-RS information including DM-RS configuration parameters of the scheduled or paired UEs/layers are received by the O-RU, and the O-RU generates a DM-RS sequence using the DM-RS configuration parameters received from O-DU.

9. The system according to claim 8, wherein the system is configured such that the O-RU estimates the UL channels of the UE(s) and/or layer(s) transmitted at a current slot n using the DM-RS information.

10. The system according to claim 9, wherein the system is configured such that the O-RU equalizes the UL channels of the one or more UEs, the one or more layers, or both, transmitted at a current slot n.

11. The system according to claim 10, wherein the system is configured such that, prior to a slot n, the DU transfers modulation information to the RU and the O-RU performs demodulation on an equalized signal.

12. A method of operating an Open Radio Access Network (O-RAN) system, comprising:

providing a baseband unit (BBU) having an O-RAN centralized unit (O-CU) and an O-RAN distributed unit (O-DU);

providing an O-RAN radio unit (O-RU) remote from the BBU; and providing a fronthaul interface between the O-RU and the BBU;

wherein a functional split of O-RAN functions respectively assigned to O-RU and O-DU for the fronthaul interface between the BBU and the O-RU is different for downlink (DL) and uplink (UL), and wherein i) demodulation reference signal (DM-RS)-based channel estimation is performed by the O-DU in the DL and by the O-RU in the UL, and ii) equalization is performed by the O-DU in the DL and by the O-RU in the UL.

13. The method according to claim 12, wherein iii) demodulation is performed by the O-DU in the DL and by the O-RU in the UL.

* * * * *